United States Patent [19]

Noguchi et al.

[11] Patent Number: 5,706,496

[45] Date of Patent: Jan. 6, 1998

[54] FULL-TEXT SEARCH APPARATUS UTILIZING TWO-STAGE INDEX FILE TO ACHIEVE HIGH SPEED AND RELIABILITY OF SEARCHING A TEXT WHICH IS A CONTINUOUS SEQUENCE OF CHARACTERS

[75] Inventors: Naohiko Noguchi, Yokohama; Yuji Kanno, Tokyo; Kazuaki Kurachi, Tokyo; Mitsuaki Inaba, Tokyo, all of Japan

[73] Assignee: Matsushita Electric Industrial Co., Ltd., Osaka, Japan

[21] Appl. No.: 601,656

[22] Filed: Feb. 14, 1996

[30] Foreign Application Priority Data

Mar. 15, 1995 [JP] Japan ................................. 7-056021

[51] Int. Cl.$^6$ ..................................................... G06F 17/30
[52] U.S. Cl. .......................................... 395/603; 395/605
[58] Field of Search ................................... 395/603, 605, 395/606

[56] References Cited

U.S. PATENT DOCUMENTS

| | | | |
|---|---|---|---|
| 4,495,566 | 1/1985 | Dickinson et al. | 364/200 |
| 4,674,066 | 6/1987 | Kucera | 364/900 |
| 5,519,857 | 5/1996 | Kato et al. | 395/603 |
| 5,600,835 | 2/1997 | Garland et al. | 395/605 |
| 5,606,690 | 2/1997 | Hunter et al. | 395/605 |

OTHER PUBLICATIONS

"Information Retrieval; Data Structures and Algorithms" by W. B. Frakes et al; Prentice Hall; pp., 29–43.

"A Fast Full–Text Search Method for Japanese Text Database" by C. Kikuchi; The Transactions of the Institute of Electronics, Information and Communication Engineering, vol. J75–D–I, No. 9; 1992; pp., 836–846 (w/English translation).

*Primary Examiner*—Thomas G. Black
*Assistant Examiner*—Donald Min
*Attorney, Agent, or Firm*—Lowe, Price, LeBlanc & Becker

[57] ABSTRACT

A new type of text search apparatus, capable of finding all occurrence positions of a search string that is an arbitrary character string, within a text which is written as a continous sequence of characters, utilizes for text position reference purposes in an index file, words which each occur (at least once within the text) as the maximum length word, referred to as an extension word, among a set of arbitrarily predefined dictionary words extending from a specific character position. Each such occurrence of a word as an extension word defines one of a set of text position elements, with that set covering all of the character positions of the text. The index file also includes a table which relates each of the extension words to the respective positions at which each of the partial character strings of the word occur within the word. Each occurrence of an arbitrary search string within the text can thereby be expressed as either a partial character string within a single text position element, or as a sequence of partial character strings within a set of sequentially occurring text position elements, so that all such occurrences can be found by utilizing the index file.

19 Claims, 67 Drawing Sheets

| TEXT POSITION ELEMENTS FOR FIRST COVER WORD w1 | TEXT POSITION ELEMENTS FOR SECOND COVER WORD w2 | TEXT POSITION ELEMENTS FOR THIRD COVER WORD w3 |
|---|---|---|
| ed_11 | ed_21 | ed_31 |
| ed_12 | ed_22 | ed_32 |
| ed_13 | ed_23 | ed_33 |
| ed_14 | ed_24 | ed_34 |

FIRST STAGE

Li = {[ed.11], [ed.12], [ed.13], [ed.14]}

```
ed_11        ed_21       ed_31
ed_12   ✕    ed_22       ed_32
ed_13        ed_23       ed_33
ed_14 ──── ed_24         ed_34
```

SECOND STAGE

Li = {[ed_11, ed_23], [ed_12, ed_21], [ed_14, ed_24]}

```
ed_11        ed_21       ed_31
ed_12        ed_23       ed_32
                         ed_33
ed_14 ──── ed_24         ed_34
```

Li = {[ed_11, ed_23, ed_31], [ed_12, ed_21, ed_34]}

CEIDX = {[ed_11, ed_23, ed_31], [ed_12, ed_21, ed_34]} q1 = cd_11 (FIRST TEXT POSITION VALUE FOR SEARCH STRING, OBTAINED BASED ON ed_11)

q2 = cd_12 (SECOND TEXT POSITION VALUE FOR SEARCH STRING, OBTAINED BASED ON ed_12)

Q = {q1, q2}

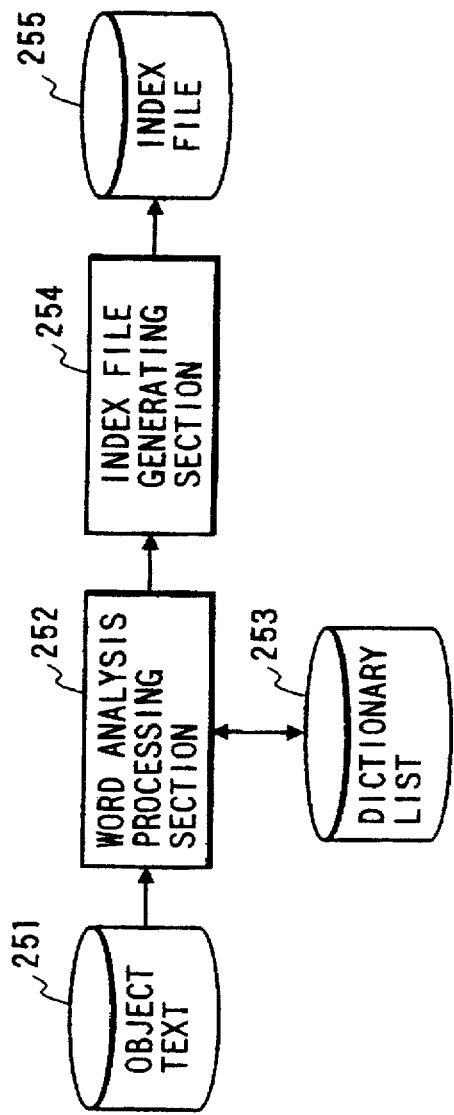

FIG. 3

DICTIONARY LIST the
he
heed
edit
it
to
or
won
on

FIG. 4 PRIOR ART

INDEX FILE

| DICTIONARY WORD | TEXT POSITION VALUES |
|---|---|
| the | 1 |
| edit | 4 |
| it | 13 |
| or | 8 |
| won | 10 |

FIG. 5 PRIOR ART

INDEX FILE

| BI-GRAM | TEXT POSITION VALUES |
|---|---|
| th | 1 |
| he | 2 |
| ed | 3 |
| di | 4 |
| it | 5, 13 |
| to | 6 |
| or | 7 |
| rw | 8 |
| wo | 9 |
| on | 10 |
| ni | 11 |

FIG. 9

COMPLETE TABLE OF TEXT POSITION ELEMENTS

| DICTIONARY WORD | TEXT POSITION VALUES |
|---|---|
| t | 1, 7, 14 |
| the | 1 |
| h | 2 |
| he | 2 |
| heed | 2 |
| e | 3, 4 |
| edit | 4 |
| editor | 4 |
| d | 5 |
| i | 6, 13 |
| it | 6, 13 |
| t | 7, 14 |
| to | 7 |
| o | 8, 11 |
| or | 8 |
| on | 11 |
| r | 9 |
| w | 10 |
| won | 10 |
| n | 12 |

FIG. 10

DICTIONARY LIST d
e
edit
editor
he
heed
i
it
on
or
r
t
the
to
won
n

FIG. 11

TEXT POSITION TABLE 21

| EXTENSION WORD | CORRESPONDING ARRAY OF TEST POSITION ELEMENTS |
|---|---|
| the | (the, 1) |
| heed | (heed, 2) |
| editor | (editor, 4) |
| won | (won, 10) |
| it | (it, 13) |

FIG. 12A
EXTENSION WORD CORRESPONDENCE TABLE 22

| PARTIAL CHARACTER STRING | (EXTENSION WORD/INTRA-WORD POSITION VALUE) COMBINATIONS |
|---|---|
| t | (the, 1) (editor, 4) (it, 2) |
| th | (the, 1) |
| the | (the, 1) |
| h | (the, 2) (heed, 1) |
| he | (the, 2) (heed, 1) |
| hee | (heed, 1) |
| heed | (heed, 1) |
| e | (the, 3) (heed, 2) (heed, 3) |
| ee | (heed, 2) |
| eed | (heed, 2) |
| ed | (editor, 1) (heed, 3) |
| edi | (editor, 1) |
| edit | (editor, 1) |
| edito | (editor, 1) |
| editor | (editor, 1) |
| d | (heed, 4) (editor, 2) |
| di | (editor, 2) |
| dit | (editor, 2) |
| dito | (editor, 2) |
| ditor | (editor, 2) |
| i | (editor, 3) (it, 1) |
| it | (editor, 3) (it, 1) |
| ito | (editor, 3) |
| itor | (editor, 3) |
| to | (editor, 4) |
| tor | (editor, 4) |
| o | (editor, 5) (won, 2) |
| or | (editor, 5) |
| r | (editor, 6) |
| w | (won, 1) |
| wo | (won, 1) |
| won | (won, 1) |
| on | (won, 2) |
| n | (won, 3) |

FIG. 12B

EXTENSION WORD CORRESPONDENCE TABLE 22'

| PARTIAL CHARACTER STRING | (EXTENSION WORD/INTRA-WORD POSITION VALUE) COMBINATIONS |
|---|---|
| d | (heed, 4) (editor, 2) |
| e | (the, 3) (heed, 2) (heed, 3) |
| h | (the, 2) (heed, 1) |
| i | (editor, 3) (it, 1) |
| n | (won, 3) |
| o | (editor, 5) (won, 2) |
| r | (editor, 6) |
| t | (the, 1) (editor, 4) (it, 2) |
| w | (won, 1) |
| edit | (editor, 1) |
| editor | (editor, 1) |
| he | (the, 2) (heed, 1) |
| heed | (heed, 1) |
| it | (editor, 3) (it, 1) |
| on | (won, 2) |
| or | (editor, 5) |
| the | (the, 1) |
| to | (editor, 4) |
| won | (won, 1) |

FIG. 12C

EXTENSION WORD CORRESPONDENCE TABLE 22'

| PARTIAL CHARACTER STRING | (EXTENSION WORD/INTRA-WORD POSITION VALUE) COMBINATIONS |
|---|---|
| d | (heed, 4) (editor, 2) |
| e | (the, 3) (heed, 2) (heed, 3) |
| h | (the, 2) (heed, 1) |
| i | (editor, 3) (it, 1) |
| n | (won, 3) |
| o | (editor, 5) (won, 2) |
| r | (editor, 6) |
| t | (the, 1) (editor, 4) (it, 2) |
| w | (won, 1) |

FIG. 13

TEXT EXAMPLE: ........r e a s o n a b l e t o t a l........

TEXT
CHARACTER
NUMBERS          ........50..52..54..56..58..60..62..64........

EXTENSION
WORDS                          r e a s o n a b l e
                                           l e t
                                                 t o t a l

SEARCH STRING
EXAMPLE:                                a b l e t o

COVER WORDS: W1                         a b l e
             W2                               l e t
             W3                                   t o

TEXT POSITION ELEMENT KEYED TO EXTENSION WORD
OF FIRST COVER WORD "able" :    (reasonable, 50)

TEXT POSITION ELEMENT KEYED TO EXTENSION WORD
OF SECOND COVER WORD "let" :    (let, 58)

TEXT POSITION ELEMENT KEYED TO EXTENSION WORD
OF THIRD COVER WORD "to" :    (total, 60)

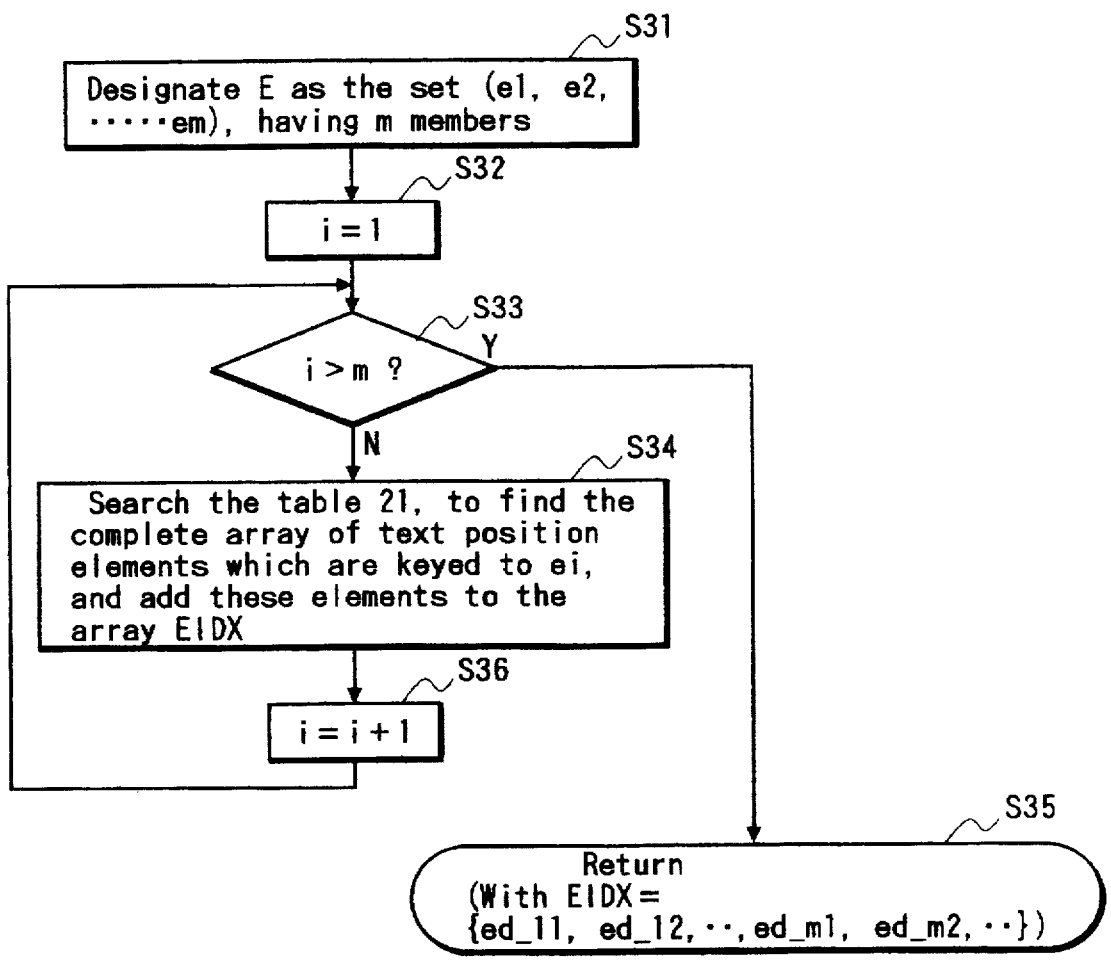

FIG. 23

| TEXT POSITION ELEMENTS FOR FIRST COVER WORD w1 | TEXT POSITION ELEMENTS FOR SECOND COVER WORD w2 | TEXT POSITION ELEMENTS FOR THIRD COVER WORD w3 |
|---|---|---|
| ed_11 | ed_21 | ed_31 |
| ed_12 | ed_22 | ed_32 |
| ed_13 | ed_23 | ed_33 |
| ed_14 | ed_24 | ed_34 |

FIRST STAGE

Li = {[ed.11], [ed.12], [ed.13], [ed.14]}

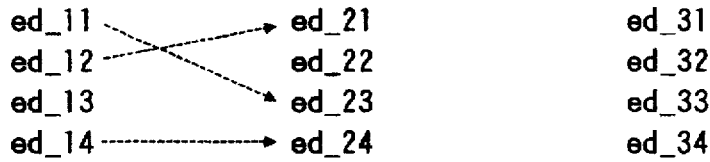

SECOND STAGE

Li = {[ed_11, ed_23], [ed_12, ed_21], [ed_14, ed_24]}

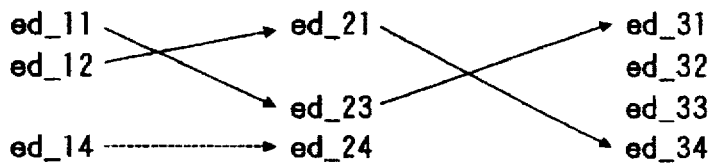

Li = {[ed_11, ed_23, ed_31], [ed_12, ed_21, ed_34]}

CEIDX = {[ed_11, ed_23, ed_31], [ed_12, ed_21, ed_34]} q1 = cd_11 (FIRST TEXT POSITION VALUE FOR SEARCH STRING, OBTAINED BASED ON ed_11)

q2 = cd_12 (SECOND TEXT POSITION VALUE FOR SEARCH STRING, OBTAINED BASED ON ed_12)

TABLE 1

| SECTION | EXTENSION WORD |
|---|---|
| 1 | LIST OF WORDS WHICH BEGIN WITH "a" |
| 2 | LIST OF WORDS WHICH BEGIN WITH "b" |
| . | . |
| . | . |
| . | . |
| . | . |
| 26 | LIST OF WORDS WHICH BEGIN WITH "z" |

FIG. 28B

TABLE 2

| SECTION | EXTENSION WORD |
|---|---|
| 1 | LIST OF WORDS WHICH END WITH "a" |
| 2 | LIST OF WORDS WHICH END WITH "b" |
| . | . |
| . | . |
| . | . |
| . | . |
| 26 | LIST OF WORDS WHICH END WITH "z" |

FIG. 28C

TABLE 3

| SECTION | EXTENSION WORD |
|---|---|
| 1 | (LIST OF WORDS HAVING "a" AS SECOND CHARACTER) |
|  | (LIST OF WORDS HAVING "a" AS THIRD CHARACTER) |
|  | (LIST OF WORDS HAVING "a" AS FOURTH CHARACTER) |
|  | ⋮ |
| 2 | (LIST OF WORDS HAVING "b" AS SECOND CHARACTER) |
|  | (LIST OF WORDS HAVING "b" AS THIRD CHARACTER) |
|  | (LIST OF WORDS HAVING "b" AS FOURTH CHARACTER) |
|  | ⋮ |
| 3 ⋮ | ⋮ |
| 26 | (LIST OF WORDS HAVING "z" AS SECOND CHARACTER) |
|  | (LIST OF WORDS HAVING "z" AS THIRD CHARACTER) |
|  | (LIST OF WORDS HAVING "z" AS FOURTH CHARACTER) |
|  | ⋮ |

FIG. 29

| EXTENSION WORD | ARRAY OF TEXT POSITION VALUES |
|---|---|
| . | . |
| . | . |
| . | . |
| credit | (34, 66, 620, .....) |
| creditor | (10, 54, 831, .....) |
| . | . |
| . | . |
| . | . |
| . | . |
| editor | (276, 351, 383, ...) |
| editorial | (68, 84, 525, .....) |
| editorship | (120, 287, 862, ...) |
| . | . |
| . | . |
| . | . |

300

ARRAYS OF TEXT POSITION VALUES FOR WORD "edit"

(36, 68, 622, ......)
(12, 56, 833, ......)
(276, 351, 383, .....)
(68, 84, 525, .....)
(120, 287, 862, ...)

MERGED, SORTED FINAL ARRAY OF TEXT POSITION VALUES FOR WORD "edit"

TEXT POSITION TABLE
(LOW OCCURRENCE WORDS)

| GROUP NUMBER | FIRST WORD IN GROUP | ARRAY OF TEXT POSITION ELEMENTS OF GROUP |
|---|---|---|
| 1 | ace | {($ig11$, $p11$), ($ig12$, $p12$), ......} |
| 2 | burial | {($ig21$, $p21$), ($ig22$, $p22$), ........} |
| . | . | . |
| . | . | . |
| . | . | . |

FIG. 31

TABLE A

HIGH-OCCURRENCE WORDS
LISTED IN DICTIONARY SEQUENCE

| FIRST CHARACTER OF WORD | WORD | HIGH-OCCURRENCE WORD NUMBER |
|---|---|---|
| a | a**** | 1 |
| | a** | 2 |
| | a***** | 3 |
| | . | . |
| | . | . |
| | . | . |
| b | b*** | 46 |
| | b* | 47 |
| | b**** | 48 |
| | . | . |
| | . | . |
| | . | . |
| c | c** | 68 |
| | c**** | 69 |
| | c*** | 70 |
| | . | . |
| | . | . |
| | . | . |

301 indicates the "a" group; 302 indicates the "b" group.

FIG. 32

TABLE B

HIGH-OCCURRENCE WORDS LISTED IN INVERSE DICTIONARY SEQUENCE

| LAST CHARACTER OF WORD | WORD | HIGH-OCCURRENCE WORD NUMBER |
|---|---|---|
| a | ****a | 41 |
|   | *a | 23 |
|   | *****a | 3 |
|   | . | . |
|   | . | . |
|   | . | . |
| b | ***b | 21 |
|   | *b | 16 |
|   | ****b | 82 |
|   | . | . |
|   | . | . |
|   | . | . |
| c | **c | 93 |
|   | ****c | 6 |
|   | ***c | 17 |
|   | . | . |
|   | . | . |
|   | . | . |
| . | . | . |
| . | . | . |
| . | . | . |

FIG. 33

TABLE C

SINGLE-CHARACTER INTRA-WORD POSITION TABLE

| CHARACTER | INTRA-WORD POSITION VALUE | WORD | HIGH-OCCURRENCE WORD NUMBER, OR GROUP/INTRA-GROUP NUMBER PAIR |
|---|---|---|---|
| a | 2 | *a*<br>*a***<br>*a**<br>.<br>.<br>. | 131<br>(13, 17)<br>34<br>.<br>.<br>. |
| a | 3 | **a*<br>a*<br>.<br>.<br>. | 129<br>53<br>.<br>.<br>. |
| a<br>.<br>.<br>. | 4<br>.<br>.<br>. | ***a*<br>.<br>.<br>. | (9, 25)<br>.<br>.<br>. |
| b<br>.<br>.<br>.<br>b | 2<br>.<br>.<br>.<br>3 | *b*<br>.<br>.<br>.<br>b | 182<br>.<br>.<br>.<br>293 |
| .<br>.<br>.<br>.<br>.<br>.<br>. | .<br>.<br>.<br>.<br>.<br>.<br>. | .<br>.<br>.<br>.<br>.<br>.<br>. | .<br>.<br>.<br>.<br>.<br>.<br>. |
| z<br>.<br>.<br>.<br>. | 2<br>.<br>.<br>.<br>. | *z*<br>.<br>.<br>.<br>. | 174<br>.<br>.<br>.<br>. |

FIG. 36

TABLE 63

TABLE OF INITIAL CHARACTERS OF HIGH-OCCURRENCE WORDS IN DICTIONARY SEQUENCE TABLE

| CHARACTER NUMBER | CHARACTER | DICTIONARY SEQUENCE HIGH-OCCURRENCE WORD NUMBER | (WORD) |
|---|---|---|---|
| 1 | a | 1 | a |
| 2 | b | 13 | b |
| 3 | c | 20 | can |
| . | . | . | . |
| . | . | . | . |
| . | . | . | . |
| 17 | p | 57 | pad |
| 18 | q | 64 | quantum |
| 19 | r | 69 | r |
| . | . | . | . |
| . | . | . | . |
| . | . | . | . |

FIG. 37

TABLE 64
HIGH-OCCURRENCE WORDS LISTED IN DICTIONARY SEQUENCE

| DICTIONARY SEQUENCE HIGH-OCCURRENCE WORD NUMBER | EXTENSION WORD |
|---|---|
| 1 | a |
| 2 | aback |
| 3 | abacks |
| 4 | abdicate |
| 5 | action |
| 6 | across |
| 7 | adult |
| 8 | allow |
| 9 | alter |
| 10 | aportion |
| 11 | aquifer |
| 12 | axe |
| 13 | b |
| 14 | babe |
| 15 | bend |
| 16 | biggest |
| 17 | bloc |
| 18 | books |
| 19 | bundle |
| 20 | can |
| 21 | careful |
| 22 | century |
| 23 | chores |
| 24 | cm |
| ... | ... |
| 56 | ox |
| 57 | pad |
| 58 | peace |
| 59 | pencils |
| 60 | portrait |
| 61 | pour |
| 62 | purpose |
| 63 | pursuits |
| 64 | pylon |
| 65 | quantum |
| 66 | quart |
| 67 | question |
| 68 | quota |
| 69 | quotient |
| 70 | r |
| 71 | radical |
| ... | ... |

FIG. 38

TABLE 65

TABLE OF FINAL CHARACTERS OF HIGH-OCCURRENCE WORDS IN INVERSE DICTIONARY SEQUENCE TABLE

| CHARACTER NUMBER | CHARACTER | INVERSE DICTIONARY SEQUENCE HIGH-OCCURRENCE WORD NUMBER | (WORD) |
|---|---|---|---|
| 1 | a | 1 | a |
| 2 | b | 4 | b |
| 3 | c | 11 | mac |
| 4 | d | 13 | pad |
| 5 | e | 32 | e |
| 6 | f | 38 | if |
| . | . | . | . |
| . | . | . | . |
| . | . | . | . |
| 11 | k | 54 | k |
| 12 | l | 58 | l |
| 13 | m | 62 | cm |
| 14 | n | 66 | n |
| . | . | . | . |
| . | . | . | . |
| . | . | . | . |
| . | . | . | . |
| . | . | . | . |

FIG. 39A

TABLE 66
HIGH-OCCURRENCE WORDS LISTED IN INVERSE DICTIONARY SEQUENCE

| INVERSE DICTIONARY SEQUENCE HIGH OCCURRENCE WORD NUMBER | EXTENSION WORD | CORRESPONDING DICTIONARY SEQUENCE HIGH OCCURRENCE WORD NUMBER |
|---|---|---|
| 1 | a | 1 |
| 2 | extra | . |
| 3 | data | . |
| 4 | b | 13 |
| 5 | tab | . |
| 6 | slab | . |
| 7 | rob | . |
| 8 | sob | . |
| 9 | rub | . |
| 10 | tub | . |
| 11 | mac | . |
| 12 | bloc | 17 |
| 13 | pad | 57 |
| 14 | farad | . |
| . | . | . |
| 32 | e | . |
| 33 | babe | 14 |
| 34 | peace | 57 |
| 35 | bundle | 19 |
| 36 | abdicate | 4 |
| 37 | true | . |
| 38 | if | . |
| . | . | . |
| 54 | k | . |
| 55 | aback | 2 |
| 56 | clock | 28 |
| 57 | truck | . |
| 58 | l | . |
| 59 | radical | 70 |
| 60 | install | . |
| 61 | dull | . |
| 62 | careful | 21 |
| 63 | cm | . |
| 64 | ram | . |
| 65 | from | . |
| 66 | drum | . |

FIG. 39B

TABLE 66 (CONTINUED)

HIGH-OCCURRENCE WORDS LISTED IN INVERSE DICTIONARY SEQUENCE

| INVERSE DICTIONARY SEQUENCE HIGH OCCURRENCE WORD NUMBER | EXTENSION WORD | CORRESPONDING DICTIONARY SEQUENCE HIGH OCCURRENCE WORD NUMBER |
|---|---|---|
| 66 | n | . |
| 67 | tan | . |
| 68 | ten | . |
| 69 | then | . |
| 70 | action | 5 |
| 71 | pylon | 63 |
| 72 | o | . |
| . | . | . |
| . | . | . |
| . | . | . |
| . | . | . |
| . | . | . |
| . | . | . |

FIG. 40

TABLE 67

TABLE OF INITIAL CHARACTERS OF LOW-OCCURRENCE WORDS IN DICTIONARY SEQUENCE TABLE

| CHARACTER NUMBER | CHARACTER | DICTIONARY SEQUENCE LOW-OCCURRENCE WORD NUMBER | (WORD) |
|---|---|---|---|
| 1 | a | 1 | abandon |
| 2 | b | 8 | bald |
| 3 | c | 12 | cave |
| 4 | d | 19 | dactylogram |
| . | . | . | . |
| . | . | . | . |
| . | . | . | . |
| 16 | p | 63 | panic |
| 17 | q | 68 | quadratic |
| . | . | . | . |
| 19 | s | 47 | spurious |
| . | . | . | . |
| . | . | . | . |
| . | . | . | . |

FIG. 41

TABLE 68

LOW-OCCURRENCE WORDS LISTED IN DICTIONARY SEQUENCE

| DICTIONARY SEQUENCE LOW OCCURRENCE WORD NUMBER | LOW OCCURRENCE WORD | GROUP NUMBER | $\begin{pmatrix}\text{INTRA-GROUP}\\\text{NUMBER}\end{pmatrix}$ |
|---|---|---|---|
| 1 | abandon | 1 | 1 |
| 2 | acrimonious | 1 | 2 |
| 3 | acupuncture | 1 | 3 |
| 4 | adverse | 1 | 4 |
| 5 | appeal | 1 | 5 |
| 6 | astringent | 1 | 6 |
| 7 | axial | 1 | 7 |
| 8 | bald | 1 | 8 |
| 9 | bilateral | 1 | 9 |
| 10 | botulism | 2 | 1 |
| 11 | buzz | 2 | 2 |
| 12 | cave | 2 | 3 |
| 13 | centripetal | 2 | 4 |
| 14 | cinder | 2 | 5 |
| 15 | cipher | 2 | 6 |
| 16 | collateral | 2 | 7 |
| 17 | crux | 2 | 8 |
| 18 | cuniform | 2 | 9 |
| 19 | dactylogram | 3 | 1 |
| . | . | . | . |
| . | . | . | . |
| 63 | panic | 6 | 5 |
| 64 | panoply | 6 | 6 |
| 65 | photogenic | 6 | 7 |
| 66 | purulent | 6 | 8 |
| 67 | python | 6 | 9 |
| 68 | quadratic | 7 | 1 |
| 69 | quintessential | 7 | 2 |
| 70 | quota | 7 | 3 |
| 71 | quotient | 7 | 4 |
| . | . | . | . |
| . | . | . | . |

FIG. 42

TABLE 69

TABLE OF FINAL CHARACTERS OF LOW-OCCURRENCE WORDS IN INVERSE DICTIONARY SEQUENCE TABLE

| CHARACTER NUMBER | CHARACTER | INVERSE DICTIONARY SEQUENCE HIGH-OCCURRENCE WORD NUMBER | (WORD) |
|---|---|---|---|
| 1 | a | 1 | scoria |
| 2 | b | 3 | grab |
| 3 | c | 6 | panic |
| 4 | d | 9 | road |
| 5 | e | 14 | lace |
| 7 | g | 24 | grog |
| 12 | l | 65 | appeal |
| 13 | m | 71 | gram |
| 14 | n | 75 | elan |
| . | . | . | . |
| . | . | . | . |
| . | . | . | . |
| . | . | . | . |

FIG. 43

TABLE 70
LOW-OCCURRENCE WORDS LISTED IN INVERSE DICTIONARY SEQUENCE

| INVERSE DICTIONARY SEQUENCE LOW OCCURRENCE WORD NUMBER | LOW OCCURRENCE WORD | GROUP NUMBER | INTRA-GROUP NUMBER |
|---|---|---|---|
| 1 | scoria | 1 | 1 |
| 2 | mantra | 1 | 2 |
| 3 | grab | 1 | 3 |
| 4 | lob | 1 | 4 |
| 5 | rub | 1 | 5 |
| 6 | panic | 1 | 6 |
| 7 | photogenic | 1 | 7 |
| 8 | quadratic | 1 | 8 |
| 9 | road | 1 | 9 |
| 10 | thread | 2 | 1 |
| 11 | reed | 2 | 2 |
| 12 | bald | 2 | 3 |
| 13 | mud | 2 | 4 |
| 14 | lace | 2 | 5 |
| 15 | acupuncture | 2 | 6 |
| 16 | adverse | 2 | 7 |
| 17 | cave | 2 | 8 |
| 18 | grove | 2 | 9 |
| 19 | leaf | 3 | 1 |
| . | . | . | . |
| . | . | . | . |
| 65 | appeal | 6 | 7 |
| 66 | bilateral | 6 | 8 |
| 67 | collateral | 6 | 9 |
| 68 | axial | 7 | 1 |
| 69 | pool | 7 | 2 |
| 70 | foul | 7 | 3 |
| 71 | gram | 7 | 4 |
| 72 | uniform | 7 | 5 |
| 73 | cuniform | 7 | 6 |
| 74 | botulism | 7 | 7 |
| 75 | elan | 7 | 8 |
| 76 | python | 7 | 9 |
| . | . | . | . |

FIG. 44A

TABLE 71

SINGLE-CHARACTER INTRA-WORD POSITION TABLE

| CHARACTER | INTRA-WORD POSITION VALUE | EXTENSION WORD | WORD NUMBER OR GROUP/INTRA-GROUP NUMBERS |
|---|---|---|---|
| a | 2 | careful | 21 |
|   |   | babe | 14 |
|   |   | radical | 70 |
|   |   | pad | 57 |
|   |   | . | |
|   |   | . | |
|   |   | bald | (1, 8) |
|   |   | dactylogram | (3, 1) |
|   |   | panic | (6, 5) |
|   |   | panoply | (6, 6) |
|   |   | . | . |
|   |   | . | . |
|   | 3 | aback | 2 |
|   |   | abacus | 3 |
|   |   | peace | 57 |
|   |   | quart | 65 |
|   |   | . | |
|   |   | . | |
|   |   | abandon | (1, 1) |
|   |   | grab | (1, 3) |
|   |   | quadratic | (1, 8) |
|   |   | road | (1, 9) |
|   |   | gram | (7, 4) |
|   |   | elan | (7, 8) |
|   |   | . | |
|   |   | . | |
|   | 4 | . | |
|   |   | . | |
|   |   | . | |
| b | 2 | . | |
| . |   | . | |
| . |   | . | |
| . |   | . | |
| c | 2 | action | 5 |
|   |   | across | 6 |
|   |   | . | |
|   |   | . | |
|   |   | acrimonious | (1, 2) |

FIG. 44B

TABLE 71 (CONTINUED)

| CHARACTER | INTRA-WORD POSITION VALUE | EXTENSION WORD | WORD NUMBER OR GROUP/INTRA-GROUP NUMBERS |
|---|---|---|---|
| | | acupuncture ⋮ | (1, 3) ⋮ |
| c ⋮ | 3 ⋮ | ⋮ | ⋮ |
| | | ⋮ | ⋮ |
| ⋮ | ⋮ | ⋮ | ⋮ |
| i | 2 | cinder<br>cipher<br>⋮ | (2, 5)<br>(2, 6)<br>⋮ |
| | 3 | quintessential<br>axial<br>⋮ | (7, 2)<br>(1, 7)<br>⋮ |
| | 4 | abdicate<br>action<br>aquifer<br>radical<br>⋮<br>acrimonious<br>cuniform<br>panic<br>⋮ | 4<br>5<br>11<br>70<br>⋮<br>(1, 2)<br>(2, 9)<br>(6, 5)<br>⋮ |

FIG. 45

TABLE 72

TEXT POSITION TABLE (HIGH-OCCURRENCE WORDS)

| DICTIONARY SEQUENCE HIGH-OCCURRENCE WORD NUMBER | HIGH OCCURRENCE WORD | ARRAY OF TEXT POSITION VALUES |
|---|---|---|
| 1 | a | (10, 25, 148, .. ...., 721, 930) |
| 2 | aback | (22, 81, .. ......., 733, 851) |
| 3 | abacus | (18, 65, .. ......, 860, 974) |
| . | . | . |
| . | . | . |
| . | . | . |
| 66 | question | (63, 201, ... ....., 783, 804) |
| . | . | . |
| . | . | . |
| . | . | . |
| . | . | . |

FIG. 46

TABLE 73

TEXT POSITION TABLE
(LOW-OCCURRENCE WORDS, DICTIONARY SEQUENCE)

| GROUP NUMBERS OF DICTIONARY SEQUENCE LOW OCCURRENCE WORDS | WORD NUMBER OF INITIAL WORD OF GROUP | INITIAL WORD OF GROUP | ARRAY OF TEXT POSITION ELEMENTS FOR GROUP |
|---|---|---|---|
| 1 | 1 | abandon | [(1, 8), ......, (3, 950)] |
| 2 | 10 | botulism | [(4, 69), ....., (1, 981)] |
| . . . | . . . | . . . | . . . |
| 7 | 68 | quadratic | [(2, 31), ......, (9, 901)] |
| . . . | . . . | . . . | . . . |

FIG. 47  TABLE 74

TEXT POSITION TABLE
(LOW-OCCURRENCE WORDS, INVERSE DICTIONARY SEQUENCE)

| GROUP NUMBERS OF INVERSE DICTIONARY SEQUENCE LOW OCCURRENCE WORDS | WORD NUMBER OF INITIAL WORD OF GROUP | INITIAL WORD OF GROUP | ARRAY OF TEXT POSITION ELEMENTS FOR GROUP |
|---|---|---|---|
| 1 | 1 | scoria | [(2, 75), ...... ......(7, 903)] |
| 2 | 10 | thread | [(4, 69), ...... ......(1, 981)] |
| ... | ... | ... | ... |
| 7 | 68 | axial | [(2, 31), ...... ......(9, 962)] |
| ... | ... | ... | ... |

FIG. 51

| DICTIONARY SEQUENCE HIGH-OCCURRENCE WORD NUMBER | EXTENSION WORD |
|---|---|
| . | . |
| . | . |
| . | . |
| . | . |
| . | . |
| 95 | c |
| 96 | cab |
| . | . |
| . | . |
| . | . |
| . | . |
| 151 | change |
| 152 | channel |
| . | . |
| . | . |
| . | . |
| 176 | chug |
| 177 | cinder |
| 178 | cite |
| . | . |
| . | . |
| . | . |
| 203 | cyborg |
| 204 | dace |
| . | . |
| . | . |
| . | . |
| . | . |
| . | . |

RANGE A: 95–203

RANGE B: 151–176

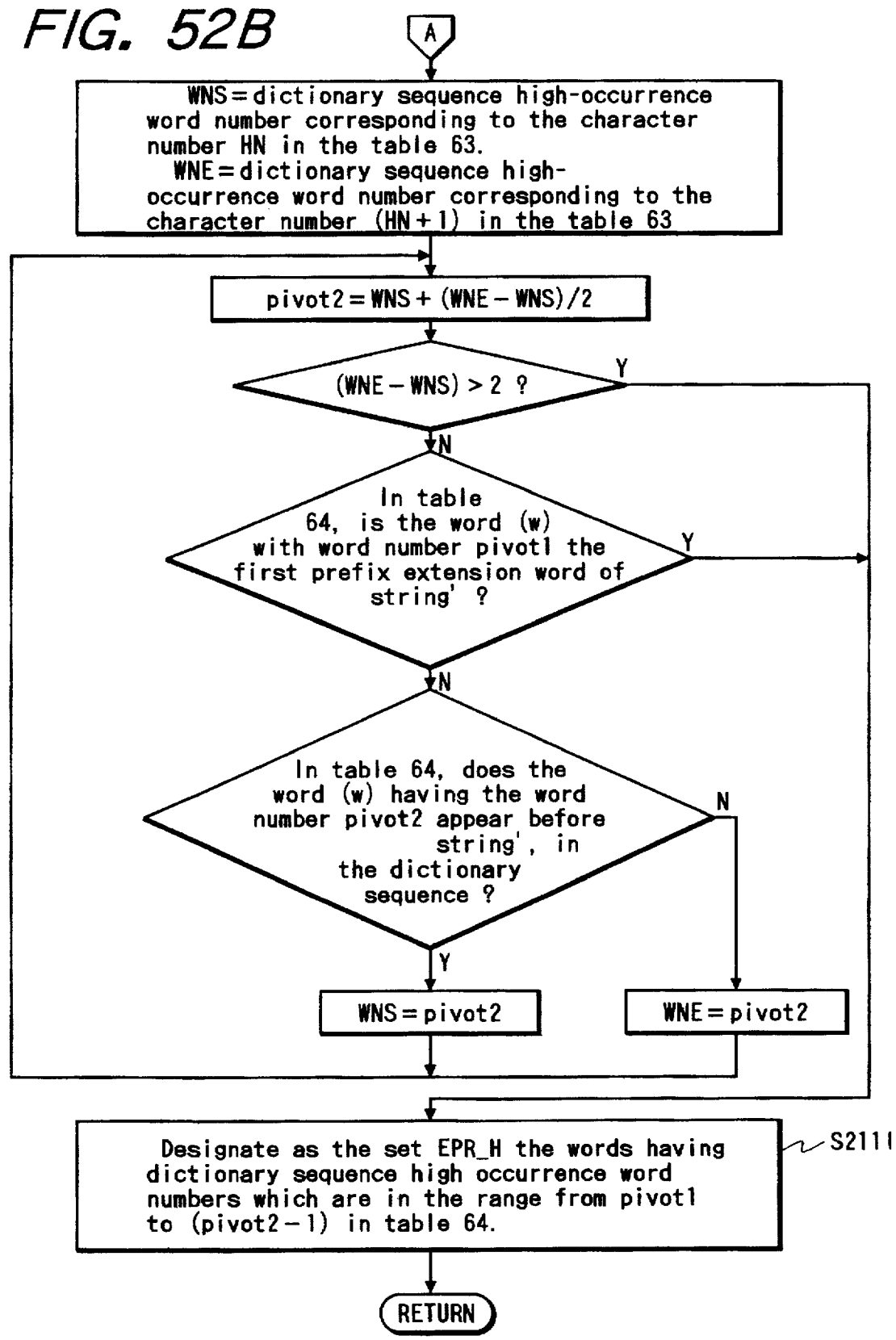

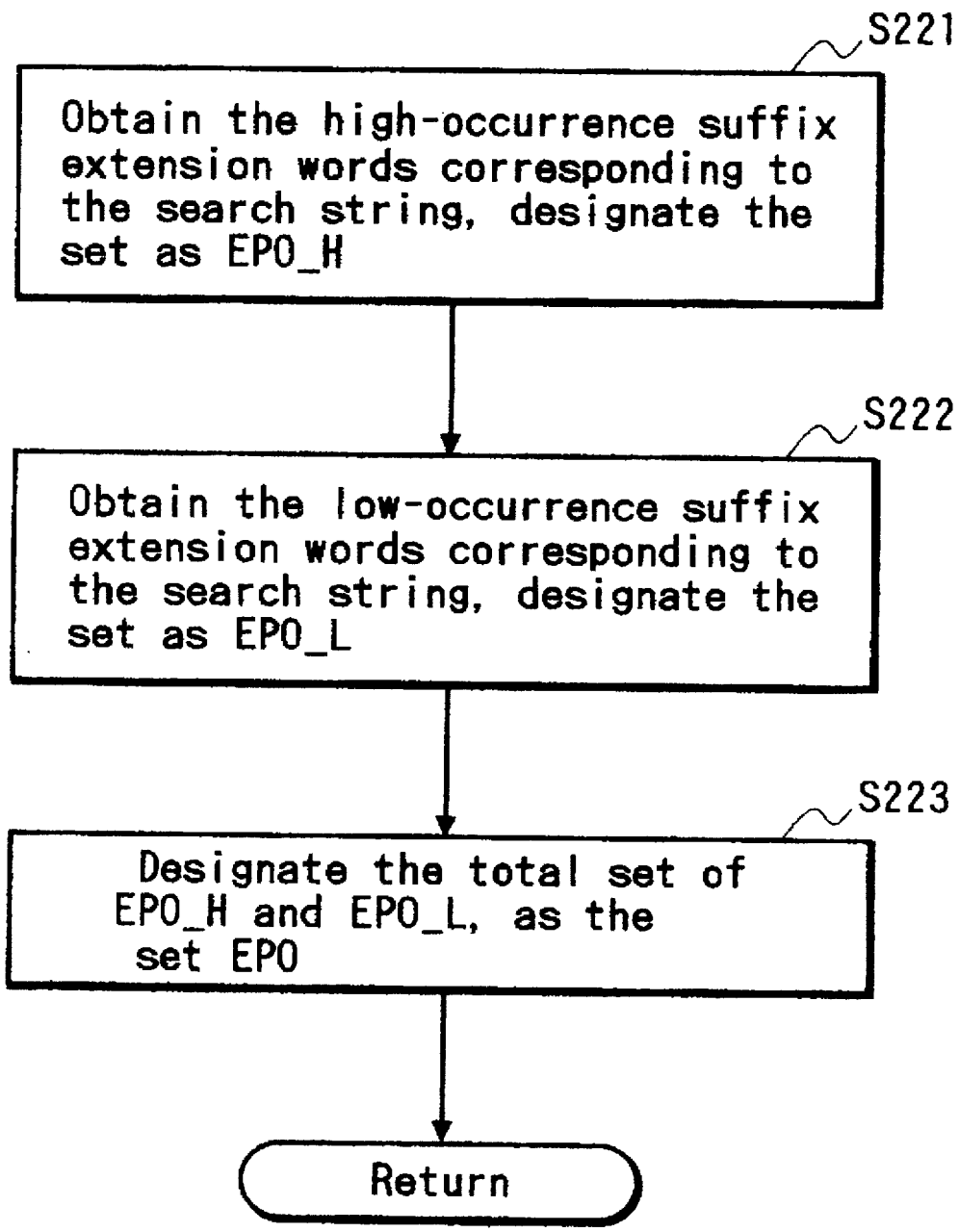

FULL-TEXT SEARCH APPARATUS UTILIZING TWO-STAGE INDEX FILE TO ACHIEVE HIGH SPEED AND RELIABILITY OF SEARCHING A TEXT WHICH IS A CONTINUOUS SEQUENCE OF CHARACTERS

BACKGROUND OF THE INVENTION

1. Field of the Invention

The present invention relates to a text search apparatus for use in searching a text which is stored in an electronic storage apparatus, to an index file which is a basic component of the text search apparatus, and to an apparatus for generating the index file.

In particular, the invention relates to a text search apparatus which is capable of locating all positions of any arbitrary character string appearing within a continuous-sequence text, i.e. a text having no delimiting spaces between successive words.

More specifically, the invention relates to a text search apparatus whereby high search speed and complete reliability of searching can be achieved when searching a continuous-sequence text, and whereby only a moderate amount of data storage capacity is required.

Such a text search apparatus is applicable to data bases which contain large amounts of text information, as well as to relatively short text documents which are stored in general types of word processors or office computers used for text processing.

In the following description of prior art examples and of embodiments of the invention, text examples utilizing the lower-case English alphabet character set will be employed. In the case of a language such as English, the character set is small. However it should be understood that the invention can be advantageously applied to languages such as Japanese or Chinese for example, wherein the character set may contain several thousand characters, and wherein a high proportion of these characters will in themselves constitute meaningful words.

2. Description of Prior Art

In recent years, there has been an increasing tendency to store large amounts of text information using electronic types of storage medium. Such text information relates for example to electronic mail, electronic catalogs, electronic publishing, data bases, etc. As a result of the development of such large amounts of text storage, there is an increasing requirement for improved types of text search apparatus whereby parts of the stored text can be rapidly located, and in particular, whereby respective positions of occurrence of any arbitrary word or character string within the stored text can be rapidly obtained.

In general, prior to executing a text search, the user specifies the search conditions by a character string, generally referred to as the search condition string. That may simply consist of a specific character string that is to be located, or may also include further information for specifying one or more conditions which are to be applied to the search. It will be assumed for simplicity of description in the following that the search condition string consist only of the character string which is to be found, and it will be referred to simply as the search string. Various types of text search method have been proposed in the prior art, which are described for example in "Information Retrieval; Data Structures and Algorithms" by Frakes and Baez-Yates, Prentice Hall, pages 29 to 43. Three basic types are as follows:

(1) Full-text scanning method
(2) Signature file method
(3) Index file (inversion file) method Search method (1) above is a full-text search method in which the entire text which is to be searched (referred to in the following as the object text) is scanned sequentially, character by character, to compare each character string in the text with the search string. Each time a text string is found which satisfies the conditions expressed by the search string, the corresponding position within the stored text is outputted, as a search result. However due to the slow speed of searching, such a method is not suitable for searching through very large amounts of stored text.

With method (2) above, files which are referred to as signature files are prepared beforehand, from the object text and are used as auxiliary files during a text search. A pre-search of these files is executed prior to performing the actual text search. As a result of the pre-search operation it may be found for example, that the desired text portion will not be found within certain of the stored documents. Thus, it is only necessary to search through the remaining stored documents, and hence the search speed can be increased by comparison with the full-text scanning method (1) above. However it is necessary to prepare and store the signature files, which may occupy a total amount of memory capacity that may be 10% to 15% of the main text storage capacity.

With method (3) above, an index file is prepared (sometimes referred to as an inverted file), in which all of the words of the object text (i.e. those words which have been found beforehand by applying some form of word analysis processing) are listed in sorted form, together with information linking each word to each of the locations in the text where the word appears. Since the words listed in the index file are arranged in sorted sequence, they can be rapidly scanned to obtain the location or locations of a desired word within a document, so that a high speed of searching can be achieved.

To establish such an index file it is necessary to first find all occurrences of each word which appears within the stored text. These words are then used to form the index file, with each word being linked to a set of text position values which point to one or more locations within the object text. Thereafter, to find the location(s) of any word within the object text it is only necessary to search the index file. Thus, a substantially higher speed of searching can be achieved than is possible with a full-text scanning method.

If the amount of object text which is to be searched is large, then the index file text search method has the disadvantage that it is necessary to store a very large amount of data in the index file, which may be substantially more data than that constituting the text that is to be searched. Thus the storage capacity requirements may be considerable.

As can be understood from the above, each of the prior art types of full-text search methods has respective advantages and disadvantages, so that an optimum method must be selected on the basis of the particular requirements of a specific application. However when the primary consideration is to achieve a high speed of searching, the index file method (3) above is to be preferred.

With a language in which respective words of a text are delimited by intra-word spaces, such as a European language, it is comparatively easy to prepare a prior art type of index file as described above. However there are various continuous-sequence languages, i.e. languages in which words in a text are not delimited by spaces, such as Chinese or Japanese. This presents special problems with respect to text searching. When constructing an index file for a text which is written in such a continuous-sequence language it is first necessary to divide the sequence of characters constituting the object text into a sequence of words, as accurately as possible. That is done by finding respective character strings which have been predefined as being words and which occur in the text, for example using a technique such as morpheme analysis in conjunction with a standard dictionary. A list of such words which appear in the text can thereby be prepared. The conventional type of index file can then be constructed, as described above, using these words. It is necessary to update the contents of the index file when changes are made in the object text.

An individual who understands the context of the text contents can read such a text and can in general accurately separate out respective words based upon the context, in spite of the absence of intra-word spacing. However that is not possible for a machine intelligence to achieve accurately at the present state of technology. As a result, if the words for the index file are selected by a machine intelligence, some words which appear in the text (i.e. character strings which were intended by the writer of the text to be understood as discrete words) may be omitted from the index file.

The problems imposed by searching a continuous-sequence text are basically different from those of a text in a language such as English. Taking for example a text containing a portion "... he made them appoint...", which in continuous-sequence form becomes "... hemadethemappoint...", it is possible that a machine intelligence might extract the words "he", "made", "the", "map", and "point", while omitting "them" and "appoint".

In the following, an example of a prior art type of index file will be described, for use in a full-text search apparatus which is applicable to a language in which inter-word spaces are omitted. It will be assumed that the apparatus should enable searching for any arbitrarily selected word which occurs within the object text. FIG. 1 is a basic block system diagram of an apparatus for constructing such an index file. In FIG. 1, numeral 251 denotes a text (stored in an electronic storage medium) which is to be searched, and which will be referred to as the object text. A word analysis processing section 252 separates the object text into sequential words, using a method such as analysis of morphemes, based on a dictionary list 253 (i.e. a list of strings which have been predefined as words). An index file generating section 254 then registers each of the words which are found in the text, together with of values indicating the respective positions within the object text where the word appears (such values being referred to in the following as text position values), as respective entries in an index file 255.

An example of the operation of such an apparatus will be described referring to the simple object text example of FIG. 2. It will be assumed, for the purposes of description, that the object text is formed from the English lower-case alphabetic letters, and consists of the character sequence "theeditorwonit" which, as a result of word analysis processing of the object text by a machine intelligence, might be divided the sequence of words "the edit or won it" or "the editor won it". In the first case, the resultant index file 255 would be as shown in FIG. 4, assuming that each text position value is expressed as the position of the initial letter of each word within the object text.

In that case, it would not be possible to find the position of occurrence (within the text portion shown) of the word "editor", by using such an index file.

Thus, due to the shortcomings of word analysis techniques for dividing a text into units of words, such an index file will not provide accurate results in locating all words which occur within the object text.

Furthermore, it is not possible to use such an index file to locate respective positions of occurrence within the object text of arbitrary character strings (such as "orwo" in the example "theeditorwonit") which do not appear in the dictionary list, and so will not be registered in the index file.

In order to overcome the above problems, a new type of index file has been proposed for application to Japanese texts. In such an index file, rather than utilizing dictionary words as position-specified units in the index file, fixed-length character strings referred to as n-grams (i.e. each formed of n characters) are used, which successively overlap within the object text. The n-grams are typically single characters, or pairs of characters (referred to as bi-grams). That method has been described in "The Transactions of the Institute of Electronics, Information and Communication Engineering", Vol J75-D-I, No. 9, pp. 836–846 (1992), published in Japan. The resultant index file consists of the ordered set of n-grams which appear in the object text, together with information linking each n-gram to each of the positions where it appears within the text. In order to search for any arbitrary character string in the object text, it is only necessary to examine the index file to find an n-gram which is identical to the desired character string, or a set of two or more n-grams occurring at sequential positions in the object text, which (arranged in successively overlapping form) constitute the desired character string. The position of the desired character string within the object text is then defined by the position of the first n-gram of that set.

An example of an index file constructed using bi-grams is shown in FIG. 5, for the case of the previously utilized text example. As shown, the object text is divided into sequentially overlappping character pairs, i.e. "th", "he", "ed", "di", ... "on", "ni", "it". The index file consists of a table showing the respective positions of occurrence of these character pairs within the object text. Using such an index file, if for example it is desired to find the character string "it", then the two positions at which that string appears in the object text are obtained directly from the index file. If it is desired to find the character string "tor", then that string is first divided into successive pairs of bi-grams, i.e. "to", and "or". The index file is then searched to find each location in the object text where "to" occurs. The index file is then again searched to find locations of occurrence of the second bi-gram "or". For each bi-gram "or" thus found, i.e. which begins with the character "o", a check is made as to whether the (initial character) position of that bi-gram within the object text immediately succeeds the (initial character) position of any of the bi-grams "to". If such a combination of sequentially overlapping bi-grams is found, then the location (or locations) of the desired three-letter string "tor" within the object text has been determined, i.e. is obtained as the position (7) of the first bi-gram "to". Obviously the method can be applied to search for character strings of greater length.

It can thus be understood that the above method can be used to search for any arbitrarily selected character string, within a text or text portion which consists of successive characters which are not delimited into words by spaces.

However such a method has a basic disadvantage of a low search speed, if the size of the object text is substantial. One reason for this is that even if the character string being searched for is a dictionary word, (when searching for a word which is longer than the n-gram length) it is necessary to execute the above-described operations of dividing the required character string into n-grams, then searching the index file to find a set of n-grams which satisfy the requisite conditions. It can be understood that the number of occurrences of certain n-grams within a large text may be very great, so that considerable time may be required to complete each search operation.

Furthermore the conventional full-text search method (3) described above which employs an index file containing dictionary words, although providing a high speed of searching, also requires a very large data storage capacity, unless the size of the object text is small. Moreover as described above, complete accuracy of text searching cannot be ensured, when such a method is applied to a continuous-sequence text.

There is therefore a requirement for an improved text search apparatus which is applicable to a continuous-sequence text, whereby:
(a) a high speed of searching is achieved,
(b) it is possible to find, with complete reliability, any arbitrarily selected character string which appears at one or more positions within the text, and
(c) the data storage capacity requirements are moderate.

SUMMARY OF THE INVENTION

It is an objective of the present invention to overcome the problems of the prior art set out above, by providing a text search apparatus utilizing a new type of index file, and an apparatus for constructing such an index file. The text search apparatus enables a high speed of searching to be achieved, while ensuring that any character string which appears within the object text can be found with complete reliability. That reliability of text searching is attained even when the text search apparatus is applied to a text written in a continuous-sequence language such as Japanese or Chinese.

Moreover with such a text search apparatus, by comparison with prior art types of text search method which utilize an index file, the amount of storage capacity required to implement the index file can be moderate, so that it becomes practicable to apply the apparatus of the invention to searching in large amounts of text.

With the prior art text search apparatus of FIG. 1 described above, the index file contains a set of elements (i.e. text position elements) each of which relates a word (from the dictionary list) which has been found to occur in the text, to a position of occurrence of that word in the text. Ideally, such an element is registered for each occurrence of each dictionary word. However with an index file of a text search apparatus according to the present invention, a new type of text position element is utilized, which can be considered as a "maximum size" text position element. A set of such text position elements, which sequentially cover all of the character positions of the object text, is obtained by successively examining each text character position, to find if a dictionary word extends from that position which satisfies the conditions:
(a) it is the longest dictionary word extending from that character position, and
(b) no dictionary word extends beyond that longest dictionary word from any preceding text character position.

Such "longest dictionary words" are referred to herein as extension words. Since each extension word may consist of a plurality of sequential dictionary words, the total number of text position elements required to cover all of the character positions in the object text can be minimized, so that data storage requirements are reduced.

The index file of such a text search apparatus basically consists of two sections. The first of these, the text position table section, contains at least one table containing a plurality of arrays of text position elements, each array being keyed to a specific extension word. (Unless otherwise stated, the term "text position element" is used in the following description and the appended claims to signify a text position element which is keyed to an extension word).

In order to ensure that such a set of text position elements can be derived which will cover every character position within the object text, and to ensure that the index file will enable the text position of any arbitrary character string to be found, the following relationship must exist between the dictionary list and the object text before the set of text position elements is derived: for each character position in the object text, at least one dictionary word begins from that character position. It is possible in some cases that this necessary condition may be satisfied by a pre-existing dictionary list, however it may be necessary to augment such an existing dictionary list. If the above conditions for the dictionary list and extension words are met, then:
(1) the complete set of text position elements covers all of the character positions in the object text, and
(2) at every occurrence of a dictionary word in the object text, the word is either a partial character string within a text position element, or is itself the extension word of a text position element.

The second basic section of the index file is an extension word correspondence table section. This stores information expressing, for each character string which occurs in the object text and is a partial character string of any extension word, the set of extension words which each contain that dictionary word as a partial character string, and the respective intra-word positions of the character string within these extension words.

Thus, to obtain each of the occurrence positions of a search string within the object text the text search apparatus obtains, from the extension word correspondence table section of the index file, each of the extension words of which the search string is a partial character string, and information specifying the intra-word positions of the search string within each of these extension words. The apparatus then obtains, from the text position table section of the index file, each of the arrays of text position elements corresponding to these extension words. That information is then combined with the intra-word position information to obtain a set of positions of occurrence of the search string. If the search string is a dictionary word, then all of its occurrence positions have thereby been found. Such processing will be referred to as primary search processing.

If the search string is not a dictionary word, then it is not certain that at each of its occurrences within the object text, it will always occur within a text position element (i.e. it may extend between two sequential text position elements). In that case, it is necessary to execute further search processing, referred to in the following as secondary search processing.

First, a set of dictionary words is derived, which extend sequentially from the leading character to the final character of the search string, and are referred to as cover words. The respective sets of extension words corresponding to these cover words are then obtained from the extension word correspondence table section, then the respective sets of text position elements for each of these extension words are obtained from the text position table section and examined, to find those sequences of text position elements within which the search string appears. The respective positions of occurrence of the search string where the string extends between a plurality of text position elements, can thereby be obtained. The occurrences position information thus obtained is then combined with the occurrence position information obtained from the primary search processing, to obtain all of the occurrence positions of the search string within the object text.

More specifically, the invention provides a text search apparatus operable for deriving a set of text position values expressing all positions of occurrence within an object text of a character string which is specified as a search string, the object text being formed of a finite number of characters which are respective members of a predetermined character set, the apparatus comprising:

a dictionary list having registered therein a predetermined list of dictionary words or identifiers of the dictionary words, each of the dictionary words being a string of characters from the character set, text position table means comprising a plurality of text position elements each expressing a combination of one of the dictionary words which appears within the object text, or an identifier of the dictionary word, in conjunction with a text position value of the dictionary word, each dictionary word of a text position element in the text position table being an extension word which is a maximum length word within a set of dictionary words each extending from a leading character position of the text position element;

extension word position correspondence table means having registered therein information expressing, for each of respective partial character strings of the extension words, a corresponding set of extension words and respective positions of the partial character string within each of the corresponding extension words, extension word assessment means for obtaining from the extension word correspondence table means a first set of extension words each containing the search string as a partial character string and intra-word position information indicating respective positions of the search string within the words of the first set of extension words, text position element look-up means for obtaining first sets of text position elements from the text position table means, each set of the first sets of text position elements being keyed to a corresponding extension word of the first set of extension words, total set formation means for operating on the first sets of text position elements in conjunction with the intra-word position information, to obtain a first set of text position values of the search string, and cover word assessment means for determining a specific sequence of cover words extending from a leading character to a final character of the search string, each of the cover words other than a final cover word of the sequence being a dictionary word, the final cover word being a dictionary word or a leading partial character string of a dictionary word, wherein the extension word assessment means obtains from the extension word position correspondence table means respective second sets of extension words corresponding to the cover words and intra-word information expressing respective positions of each of the cover words within each of the extension words of the corresponding one of the second sets of extension words, the text position element look-up means obtains from the text position table means, for each extension word of each set in the second sets of extension words, a corresponding second set of the text position elements;

the cover word assessment means executes comparison processing of the second sets of text position elements to select groups of sequentially occurring text position elements, each of the groups containing the cover word sequence extending continuously from within a leading text position element of the group, and wherein the total set formation means obtains, based on respective leading text position elements of the groups in conjunction with the intra-word information from the extension word assessment means, a second set of text position values of the search string, and combines that second set with the first set of text position values to obtain a complete set of text position values of the search string, expressing all positions of occurrence of the search string within the object text.

The apparatus may also include means for modifying the dictionary list in accordance with the object text, to satisfy the above-mentioned necessary condition.

With such a text search apparatus, the partial character strings (of respective extension words) which are registered in the extension word position correspondence table means preferably comprise all of the partial character strings of the extension words. This provides maximum speed of searching.

Alternative, the partial character strings in the extension word position correspondence table means can comprise respective ones of all of the dictionary words which are individual characters and occur within the object text. This will minimize the storage capacity required to implement that table.

As another alternative, the partial character strings in the extension word position correspondence table means can comprise respective ones of all of the dictionary words which occur within the object text. This provides a compromise between the requirements for high search speed and moderate data storage capacity.

With such a text search apparatus, the text position table means comprises at least one text position table having table entries assigned to respective ones of the extension words, each of the table entries preferably comprising an extension word in conjunction with an array of text position values (specifying respective intra-text occurrence positions of that extension word) from all of the text position elements which are keyed to the extension word, the text position values being arranged in sequence of increasing magnitude.

BRIEF DESCRIPTION OF THE DRAWINGS

FIG. 1 is a general block diagram of an example of a prior art type of text search apparatus;

FIG. 2 shows a simple example of an object text;

FIG. 3 shows an example of a dictionary list corresponding to the text example of FIG. 2;

FIG. 4 shows an example of an index file for use with a prior art type of text search apparatus, as applied to the text example of FIG. 2, in which text position values of dictionary words are registered;

FIG. 5 shows another example of an index file for use with a second prior art type of text search apparatus, as applied to the text example of FIG. 2, in which text position values of bi-grams are registered;

FIG. 9 shows a complete table of text position values for each dictionary word and character which appears in the text example of FIG. 2;

FIG. 10 shows a dictionary list, for the text example of FIG. 2, for use with the first text search apparatus embodiment;

FIG. 11 shows an example of a text position table, consisting of arrays of text position elements that are keyed to respective extension words, which constitutes the text position table section of the index file of the first text search apparatus embodiment;

FIG. 12A shows an example of an extension word correspondence table, which relates each partial character string of each extension word to respective intra-word positions within the corresponding extension words, for the first text search apparatus embodiment;

FIG. 12B shows an example of an extension word correspondence table for use with a modified version of the first text search apparatus embodiment;

FIG. 12C shows an example of an extension word correspondence table for use with another modified version of the first text search apparatus embodiment;

FIG. 13 is an example for illustrating an occurrence of a search string extending between sequential text position elements, showing the relationship between the search string and a corresponding sequence of cover words;

FIG. 15 shows the contents of a second step in the flow diagram of FIGS. 14A, 14B;

FIG. 16 is a flow diagram showing the contents of a third step in the flow diagram of FIGS. 14A, 14B, for obtaining the set of text position elements which each contain the search string;

FIG. 23 illustrates processing performed by the flow diagram of FIG. 21 to find each group of sequential text position elements within which the cover word sequence occurs;

FIGS. 28A, 28B, 28C are conceptual diagrams for illustrating the basic principles of an extension word correspondence table section of the index file used in a second embodiment of a text search apparatus according to the present invention;

FIG. 29 illustrates the merging and sorting processing which must be applied to the text position values of a search string that are obtained from a plurality of arrays of text position elements keyed to respectively different extension words;

FIG. 30 illustrates the configuration of an example of a text position table utilized in the index file of the second text search apparatus embodiment, for low-occurrence extension words, in which each entry consist of an array of sequentially occurring text position elements which are keyed to respectively different extension words;

FIG. 31 illustrates the basic configuration of a table of high occurrence words listed in dictionary sequence, used in the extension word correspondence table section of the second text search apparatus embodiment;

FIG. 32 illustrates the basic configuration of a table of high occurrence words listed in inverse dictionary sequence, used in the extension word correspondence table section of the second text search apparatus embodiment;

FIG. 33 illustrates the basic configuration of a single-character intra-word position table, used in the extension word correspondence table section of the second text search apparatus embodiment, which specifies the relationship between each character which occurs within an extension word other than as the leading or final character, and the corresponding extension words and intra-word position values;

FIG. 36 is a partial example of a table of initial characters of high occurrence words which appear in a dictionary sequence list; 10 FIG. 37 is a table constituting the dictionary sequence list of high occurrence words corresponding to the table of FIG. 36;

FIG. 38 is a partial example of a table of final characters of high occurrence words which appear in an inverse dictionary sequence list;

FIGS. 39A, 39B form a table constituting the inverse dictionary sequence list of high occurrence words corresponding to the table of FIG. 38;

FIG. 40 is a partial example of a table of initial characters of low occurrence words which appear in a dictionary sequence list;

FIG. 41 is a table constituting the dictionary sequence list of low occurrence words corresponding to the table of FIG. 40;

FIG. 42 is a partial example of a table of final characters of low occurrence words which appear in an inverse dictionary sequence list;

FIG. 43 is a table constituting the inverse dictionary sequence list of low occurrence words corresponding to the table of FIG. 42;

FIGS. 44A, 44B constitute a partial example of a single-character intra-word position table which is used in the extension word correspondence table section of the second text search apparatus embodiment in conjunction 10 with the tables of FIGS. 36 to 43;

FIG. 45 is a partial example of a text position table of high occurrence words, used in the text position table section of the second text search apparatus embodiment, in which each entry expresses an array of text position elements which are keyed to a specific extension word;

FIG. 46 is a partial example of a text position table of low occurrence words, used in the text position table section of the second text search apparatus embodiment, in which each entry expresses an array of text position elements which are keyed to respectively different low occurrence words, for a specific group of low occurrence words which are listed sequentially in the table of FIG. 41;

FIG. 47 is a partial example of a text position table of low occurrence words, used in the text position table section of the second text search apparatus embodiment, in which each entry expresses an array of text position elements which are keyed to respectively different low occurrence words, for a specific group of low occurrence words which are listed sequentially in the table of FIG. 43;

FIG. 51 is a diagram for assistance in describing a method of locating a set of extension words having the search string as a prefix portion, within a serially numbered list of extension words;

FIGS. 52A, 52B constitute a flow diagram of an algorithm for locating a set of high occurrence words which each have the search string as a prefix portion, based on the method illustrated in FIG. 51;

FIG. 55 is a flow diagram showing the contents of a second step in the flow diagram of FIG. 49, for obtaining all extension words having the search string as a suffix portion;

DESCRIPTION OF PREFERRED EMBODIMENTS

Figure 6:
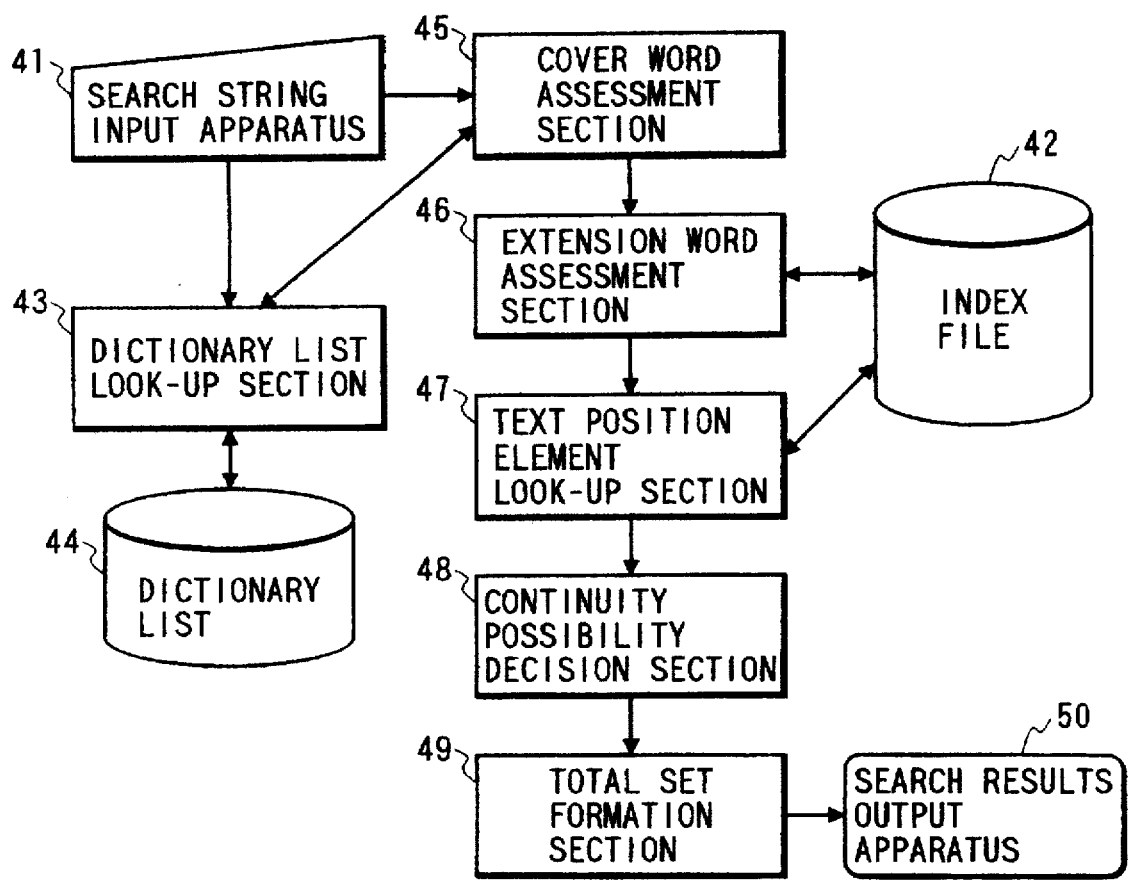
FIG. 6 is a general block diagram of a first embodiment of a text search apparatus according to the present invention.

FIG. 6 is a conceptual block diagram of a first embodiment of a text search apparatus according to the present invention, and FIGS. 15A, 15B constitute a flow diagram for describing an algorithm which is executed by the apparatus to perform a text search to find the intra-text positions of a character string. In FIG. 6, the functions of the text search apparatus are indicated as being performed by various sections of the apparatus. However in practice, most of these functions can of course be implemented by a computer apparatus which is programed to execute the search algorithm described hereinafter.

As shown in FIG. 6, the text search apparatus has a search string input apparatus 41 which can consist of data input devices such as a keyboard, mouse, etc. The apparatus further includes an index file 42, which is held in an electronic data storage medium, a dictionary list 44 which is similarly stored, and a search result output apparatus 50, consisting of a data output device such as a display terminal. The apparatus moreover includes a dictionary list look-up section 43, a cover word assessment section 45, an extension word assessment section 46, a text position element search section 47, a continuity possibility assessment section 48, and a total set combining section 49. The character strings which are registered in the dictionary list will be referred to as the dictionary words, in the following. In its initial state (prior to generating an index file for a specific object text, as described hereinafter) the dictionary list can be an arbitrarily determined list of strings which have been predefined as dictionary words. However in order to completely achieve all of the objectives of the present invention, it may be necessary to augment the dictionary list, in accordance with the contents of the object text. Specifically, it is necessary to ensure the following. For each character position of the object text, there must exist at least one dictionary word which begins from that character position. However with a language such as Japanese or Chinese, having thousands of characters which may be used, it is possible that a text may contain one or more (rarely used) characters which are not registered in an ordinary dictionary. For that reason as described in detail hereinafter, before generating the index file, the object text is preferably examined to locate any character position in the text which does not meet the condition that at least one dictionary word begins from that character position. If such a position is found in the text, then a string which begins from that character position is registered as a new word in the dictionary list.

Figure 7:
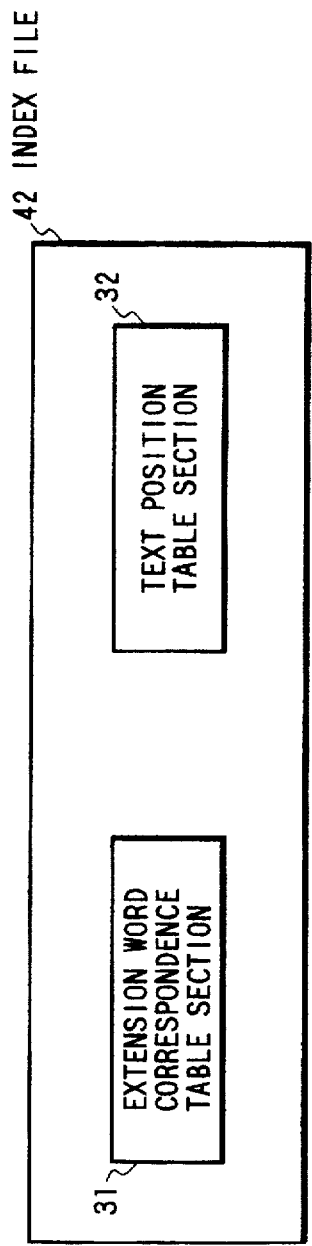
FIG. 7 is a general block diagram illustrating the basic structure of an index file utilized in a text search apparatus according to the present invention, formed of an extension word correspondence table section and a text position table section.

The essence of the invention lies in the contents of the index file 42. That consists of two basic sections, as shown in FIG. 7, i.e. an extension word correspondence table section 31 and a text position table section 32. It is an essential feature of the invention that certain occurrences in the object text of specific dictionary words are utilized for text position reference purposes. Specifically, when a dictionary word occurs, beginning at a certain character position within the object text, such that it is the longest dictionary word among the set of dictionary words which extend from that character position, and there is no dictionary word which begins at a character position preceding the first-mentioned character position and which extends beyond the final character of the first-mentioned dictionary word, then that longest dictionary word is designated as an extension word, and the combination of that extension word and the intra-text position of the leading character of the word is designated as a text position element which is keyed to that extension word. In general, a plurality of text position elements will be keyed to a single extension word. It can be understood that each extension word consists of a single dictionary word, which may have one or more multi-character dictionary words as partial character strings thereof.

It will be assumed that respective character positions in the object text have been assigned sequential identifying numbers, referred to herein as text character numbers. The text position of a character string will be assumed to be specified by the text character number of the leading character of that character string. That text character number of the leading character will be referred to as the text position value of the character string.

The extension words are selected by executing an algorithm (described hereinafter) for sequentially examining each of the character positions of the object text to find, for each character position, the longest dictionary word of the set of dictionary words which begin from that character position. If that longest dictionary word (referred to in the following as the maximum-length word for that character position) extends beyond all maximum-length words which have been found for the preceding character positions, then that maximum-length word is selected as an extension word with respect to that position in the text. All of the text position elements of the object text are expressed by the contents of the text position table section 32 of the index file 43.

Figure 8:
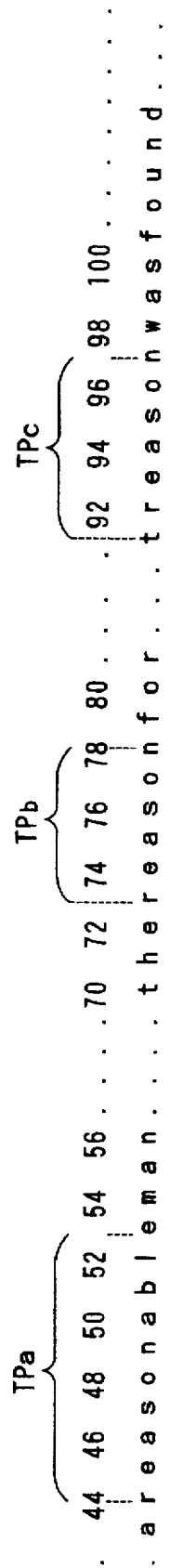
FIG. 8 illustrates the basic concept of text position elements.

The basic concepts of text position elements and extension words are illustrated in the text example shown in FIG. 8. It will be assumed that the dictionary list includes the words "reasonable", "reason", "treason", "son", and "on", and that the portions "areasonableman", "thereasonfor" and "treasonwasfound" occur within the object text at the positions shown. In that case, the set of text character positions numbered 44 to 53 constitute a text position element which is keyed to the extension word "reasonable" (containing the dictionary words "reason", "son", etc.), and the set of positions numbered 73 to 78 constitute a text position element which is keyed to the extension word "reason", for example.

The second basic section of the index file is the extension word correspondence table section 31, which expresses intra-word position relationships between each extension word and all of the partial character strings of that extension word. The basic use can be understood from the example of FIG. 8 in which three text position element examples are designated as TPa, TPb an TPc. For example, the leading character of the string "son" is positioned at the fourth character position within the extension word "reason", i.e. it is displaced by three character positions from the initial character of "reason". Hence, one text position of "son" is obtained from the text position element (reason, 73), i.e. $TP_b$. That text position is obtained as (73+3)=76. The displacement of the leading character of a partial character string of an extension word from the leading character of that extension word will be referred to as the intra-word position value of that string with respect to that extension word.

The term "sequential" as applied herein to words or text position elements should be understood to have the specific significance of "words (or text position elements) which occur either immediately consecutively, or sequentially but partially overlapping". In that sense, for example, the words "bore" and "red" occur sequentially within the word "bored", while "editor" and "won" occur sequentially in the text portion "editorwon".

The basic operation of the first embodiment will be described in more detail in the following, using the aforementioned text example "theeditorwonit". It will be assumed first that the dictionary list is as shown in FIG. 10. More specifically, FIG. 10 shows an example of a set of character strings, listed as respective dictionary words, whereby the aforementioned necessary condition is satisfied in relation to the object text of FIG. 2, i.e. at least one dictionary word begins from each character position in the text.

The text position table 21 of FIG. 11 is generated (by an apparatus described in detail hereinafter) by examining successive character positions in the object text as follows, for the case of the text example of FIG. 2. Firstly, the set of dictionary words extending from the first character position of the text is [t, the]. The maximum-length word of that set is "the", and so this is selected as the extension word of a first text position element, which can be expressed in the form (the, 1). The set of dictionary words extending from the second character position of the text is [he, heed]. In that case, the string "heed" satisfies the necessary conditions for being an extension word, i.e.:

(a) it is the maximum-length word (of the set of dictionary words which begin from the second character position), and (b) no word, beginning from a preceding character position, extends beyond "heed".

Hence, (heed, 2) is selected as the second text position element. By repeating such operations, the set of text position elements of the text position table 21 shown in FIG. 11 is obtained. The table 21 is an example of the contents of the text position table section 32 of the index file 42 of this embodiment, for the text example of FIG. 2. Each entry in the text position table 21 consists of an array of text position elements, each array being keyed to a specific extension word, although in this very simple example each array has only a single member, such as the arrays (it, 5), and (heed, 2). Each array is preferably arranged in order of successively increasing text position values.

FIG. 12A shows an example of the contents of the extension word correspondence table section 31 of the index file 42 of this embodiment, consisting of an extension word correspondence table 22. Again, the simple text example of FIG. 2 is assumed. In the table 22, each table entry consists of a character string which is a partial character string of at least one extension word, in conjunction with the corresponding set of (extension word/intra-word position value) combinations. The entry for the character string "he" in table 22, for example, indicates that this string is a partial character string of each of the extension words "the" and "heed", and has the respective intra-word position values of 2 and 1 with respect to these extension word, signifying that the amounts of position difference between the leading character of "he" and the respective leading characters of these extension words are 1 and 0 character positions respectively.

FIG. 9 shows a table of the complete set of intra-text position values for all of the dictionary words which appear in the example text. It can be understood that the set of text position elements of table 21 is a sub-set of the complete set of FIG. 9.

The principles of using the text position table 21 and extension word correspondence table 22 are as follows, assuming the simple text example "theeditorwonit" of FIG. 2 is searched. If for example the text position value of the string "or" is to be found, then the extension word correspondence table 22 is first examined to find the corresponding entry therein, and so obtain each of the extension words which contain the required string as a partial character string, and the intra-word position value of the required string with respect to each of these extension words. In this case, there is the single extension word "editor", and the intra-word position value is 5. The array of text position elements corresponding to that extension word is then found from the text position table 21. In this case, there is the single text position element (editor, 4). The text position value of the required string is obtained as:

{text position value of extension word+intra-word position value of string within that extension word−1}, i.e. (5+4−1)=8.

Furthermore, as described above, the dictionary list 44 is assumed to be configured such as to satisfy the aforementioned condition "for each character position of the object text, there exists at least one dictionary word which begins from that position".

In that case, it becomes possible to find the text position value of any occurrence of an arbitrary search string where that string extends between two successive text position elements within the text.

As a specific example, it will be assumed that the position of the string "orwo" is to be found. In that case, the string is first examined, beginning from its leading character, to find the longest dictionary word which extends from that character position, i.e. "or", with such a dictionary word being referred to in the following as a cover word, in relation to the search string. There is no dictionary word corresponding to the final two characters "wo", and so these will be considered to constitute a provisional "longest word" extending from the "w" position in the search string. The extension word correspondence table 22 is then examined to find each of the extension words which contain "or" (in this case, the single extension word "editor"), and each of the extension words which contain "wo" (in this case, the single extension word "won"). The cover words are determined by the cover word assessment section 45 in FIG. 6. Each of the text position elements corresponding to these extension words are then obtained from the extension word correspondence table 22, in order to find any sequential occurrences of these or partially overlapping occurrences of these text position elements such that the string "orwon" is formed. These operations are performed by the extension word assessment section 46 and text position element look-up section 47 of FIG. 6. Since "or" begins from the fifth character position in the extension word "editor" and "wo" begins from the first character position in the extension word "won", and since (from the text position table 21) it is found that there is a text position element keyed to "editor" which begins from text position value 4, and a text position element keyed to "won" which begins from the text position value 10, it is found that the search string "orwo" has an occurrence beginning from the text position value of the string "or", which is 8, as derived above. That is to say, an occurrence of the string "orwo" has been found as a string which extends between the consecutively occurring text position elements (editor, 4) and (won, 10). That operation is performed by the continuity possibility decision section 48 of FIG. 6.

It should be noted that it is inherent to the above operation that when deriving the cover word sequence for a search string, if a final character string is encountered which is not a dictionary word or sequence of dictionary words (as is the case with "wo" in the above example) then that character string must be an initial partial character string of a dictionary word. In that case, the final character string is considered as a final cover word of the cover word sequence, i.e. a pseudo-word.

It is equally possible to apply such a technique to find the text position value of a search string which extends between two partially overlapping text position elements. For example, it is clear that it is similarly possible to find the text position value of the string "eedi" in the text example of FIG. 2, which extends between the overlapping text position elements (heed, 2) and (editor, 4). In that case, the cover word sequence would be "e", "e", "d" and "i", each of which is registered as a word in the dictionary list of FIG. 10.

The basic operations performed in a text search by the first embodiment of the invention are as follows. First the search string is supplied, from the search string input apparatus 41 in FIG. 6. The extension word correspondence table 22 in the index file 42 is then searched, by the extension word assessment section 46, to find if there is an entry for the search string in that table. That will be the case if the search string is a dictionary word, or is a character string which is not a dictionary word but which occurs (at least once within the object text) as a partial character string of an extension word which is keyed to a text position element. If that is the case, then the set of corresponding extension words is obtained by the extension word assessment section 46 from the extension word correspondence table 22. The text position table 21 of the index file 42 is then searched (by the text position element search section 47) to find, for each member of that set of corresponding extension words, the corresponding array of text position elements. The extension word assessment section 46 then obtains from table 22 of the index file 42 the respective intra-word position values of the search string with respect to each of the corresponding extension words. The total set formation section 49 thereby obtains all of the text position values for the search string, i.e. based on respective combinations of an extension word text position element and an intra-word position value within that text position element. The total set formation section 49 then examins the respective arrays of text position values for the search string which have thereby been obtained from respective extension words, merges these into a single array (while eliminating any duplicated text position values), and then sorts the resultant set of text position values into a single sequential array (i.e. in order of increasing magnitude). That completes the primary search processing, which locates each occurrence of the search string as an extension word which is keyed to a text position element or as a partial character string of such an extension word.

A decision is then made as to whether the search string is a dictionary word. If so, there is no possibility that the search string can extend over two or more sequential text position elements. The text position values obtained are supplied to the search results output apparatus 50, and this terminates the search processing.

As explained above, if it is judged that the search string is not a single dictionary word, it is necessary to execute the secondary search processing to find any possible positions of occurrence where the search string extends over two or more text position elements. This search processing begins by finding a sequence of dictionary words which, when arranged in a specific sequence (directly consecutive or partially overlapping), constitute the search string, i.e. the aforementioned cover words. The sequence of cover words is preferably found by successively examining each of the character positions of the search string, from the first character, to find the set of dictionary words each of which begins from that character position, and selecting as a cover word any word in that set which satisfies the conditions:

(a) it is the longest word of the set, i.e. is the maximum-length word for that character position, and, (b) it extends beyond any dictionary word which begins from a preceding character position within the search string, and (c) it terminates at or before the final character of the search string.

A word which satisfies these conditions is designated as a cover word for the character position from which it begins. However when the point is reached at which the final cover word of the sequence is to be obtained, it may be found that there is no dictionary word which satisfies the above conditions. For example, if the search string were to be "itorwo", in the text example of FIG. 2, and assuming that the character "w" is not registerd in the dictionary list, although the string "won" is a dictioary word, then after the successive cover words "it", "to", "or" have been obtained based on the above conditions, it will be found that there is no word which meets these conditions, extending from the "w" position within the search string. In such a case, the final string "wo" is treated as a pseudo-word which constitutes the final cover word of the sequence. It can be understood that in such a case, the pseudo-word will always be a leading partial character string of at least one dictionary word, and hence of at least one extension word.

The above processing is executed by the cover word assessment section 45. If for example the search string is "rwon", in the case of the object text "theeditorwonit", then the single dictionary word "r" is obtained as the longest word for the first character position of the search string, the set of words "w" and "won" is obtained for the second character position, the set of words "o" and "on" is obtained for the third character position, and "n" is obtained for the final character position. For that reason, the set of cover words "r" and "won" will be obtained for the search string.

That set of cover words is then examined, to find respective sets of extension words corresponding to them. This is performed by the extension word assessment section 46, by searching in the extension word correspondence table 22. The respective sets of text position elements corresponding to these extension words are then obtained by the text position element search section 47, from the text position table 21. The respective sets of text position elements of the extension words are then examined, by the continuity possibility decision section 48, to find each occurrence of a condition whereby a text position element keyed to an extension word of the first cover word of the sequence can link to a text position element which is keyed to an extension word of the second cover word in the sequence of cover words (i.e. is immediately followed by, or is followed by in a partially overlapping manner, by that text position element of the second cover word). For each such linkage that is found, the pair of text position elements is examined to find if the first and second cover words occur sequentially within that pair of text position elements. The text position elements keyed to the extension words of the third cover word are then examined to find if any of these can be similarly connected to the previously found linkages, and so on. Each occurrence within the object text is thereby found of a linked sequence of text position elements within which the cover words appear in the sequence which covers the search string. The corresponding positions of the search string within the object text are then obtained based on the respective first text position elements of the linked sequences which have been found.

For example, if the search string is "orwon", for the object text "theeditorwonit", with the cover words being "or" and "won", then respective single-member sets of text position elements for the cover words "or" and "won" are obtained, as "editor, 4" and "won, 10". From Table 22, it is found that "or" occurs from the fifth character within the extension word "editor", while "wo" begins from the first character position within the extension word "won". It is thereby found that there is an occurrence of "or" at the text position value (5+4−1) =8, and an occurrence of "wo" with the text position value (10+1−1)=10. Thus the above linkage conditions are satisfied for the text position elements "editor, 4" and "won, 10", i.e. it has been found that the search string extends between these two text position elements. The text position value of the search string is then obtained as that of the first of the two cover words "or" and "won", i.e. is obtained as 8.

It will be apparent that the above operation would be similar if the final cover word were a pseudo-word, such as "wo", rather than a complete dictionary word. In that case, the extension word correspondence table would be used to find all of the extension words which begin with "wo". However (in the normal case in which the object text and index file contain large numbers of words), such a pseudo-word may be be linked to a greater number of text position elements than is a dictionary word. For example, while "won" might correspond to the extension word "wonderful", "wo" might correspond to extension words such as "wonderful", "woman", "worry", etc.

In the above example, text positions are obtained where the search string is found to extend between two directly consecutive text position elements. However the apparatus will similarly obtain each occurrence of a search string which extends over two partially overlapping sequential text position elements.

Furthermore it will be apparent that the operation will find any occurrences where the search string extends over more than two sequential text position elements.

Thus, the entire set of text occurrence positions of the search string, where that string extends between two or more sequentially occurring text position elements, can be obtained by the secondary search processing. The respective arrays of text position values for the search string which have thereby been obtained are then merged into a single set of text position values, which is then sorted into a sequential array of text position values, by the total set formation section 49, and that array of text position values is then merged with the array of text position values found by the primary search processing, with the resultant set of text position values then being sorted into a sequential array, by the total set formation section 49. The results are supplied to the search results output section 50.

The above process is further illustrated in the example of FIG. 13, in which it is assumed that the object text includes a character sequence "reasonabletotal" extending from character positions 50 to 64, with the search string being "ableto", and the sequence of cover words "able" "let" and "to" being obtained. In this case, the cover words partially overlap, as shown.

The operation of the first text search apparatus embodiment will be described more specifically referring to the flow diagram of FIGS. 14A, 14B. This shows a basic algorithm which is executed by the apparatus to find each occurrence within the object text of an arbitrarily determined search string which is supplied by the user via the search condition input apparatus 41. Firstly, in step S1, the search string is supplied. The search string has N characters, with respective character positions within that string being numbered 0 to (N−1). Step S2 is then executed, in which the extension word assessment section 46 searches the extension word correspondence table 22 of the index file 42, to find a table entry which corresponds to the search string. If such an entry is found, then the corresponding set of E extension words is obtained from that entry, with the set being designated as having m members (e1 to em). In addition, the extension word assessment section 46 obtains the respective intra-word position values of the search string with respect to each of the extension words of the set E. Next, in step S3, the text position element look-up section 47 searches the text position table 21 to find the respective sets of text position elements which correspond to each of the extension words (e1, e2, ... en) of set E. The total set EIDX of these sets of text position elements thus consists of the set (ed__11, ed__12, ... ) obtained for the first extension word e1 of the set E, the set (ed__21, ed__22, ... ) obtained for the second extension word e2 of the set E, and so on.

Step S4 is then executed, in which the text position elements of the set EIDX, in conjunction with the respective intra-word position values of the search string with respect to these, are used by the total set formation section 49 (i.e. in merging and sorting processing as described above) to obtain a set of text position value for the search string. The resultant set of text position values is designated as P={p1, p2, ... pk'}, i.e. having k' members. That completes the primary search processing.

Step 5 is then executed, in which a decision is made as to whether the search string is a dictionary word Specifically, the dictionary list look-up section 43 searches the dictionary list, to find if the search string is listed therein. It will be assumed that the specific function of judging whether or not a character string is a dictionary word is also performed by the dictionary list look-up section 43. If the search string is found to be a dictionary word, then this signifies that all of its positions of occurrence in the object text are specified by the set P, and so after outputting the set P to the search results output apparatus 50, processing is terminated.

If it is found in step S5 that the search string is not a dictionary word, then it is necessary to execute the secondary search processing, to find any positions where the search string occurs in the object text as a string which extends between two or more extension words. First, step S7 is executed, in which a set of cover words for the search string is obtained by the cover word assessment section 45, as described above, with that set being designated as the set C={w1, w2, ... wr}. Respective sets of extension words corresponding to each of these cover words are then obtained by the cover word assessment section 45, from the extension word correspondence table 22 of the index file 42, in step S8. The set of extension words obtained for the first cover word w1 will be designated as E1 (=extension word__11, extension word__12, ... ). The total set of the sets E1, E2, ... is designated as Ei. As a simple example, if the search string is "ableperson", the cover words obtained for the string might be "able", and "person", and the set E1 of first extension words(extension word__11, extension word__12) might be "notable" and "valuable" respectively, while the second extension words might be "personality" and "persons", as extension word__21 and extension word__22 respectively of the set E2.

Next, in step S9, the respective arrays of text position elements corresponding to the extension words in the set Ei are obtained by the text position element look-up section 47, from the text position table 21 of the index file 42. The total set of the various arrays of text position elements is designated as EIDX, and the respective members of that total set are designated as EIDX1, EIDX2, etc.

Step S10 is then executed, in which the text position elements of set EIDXi are assessed by the continuity possibility decision section 48, to find each occurrence in the text of a set of those text position elements which satisfy the conditions that (a) they occur sequentially (i.e. directly consecutively, or partially overlapping, as described above), and
(b) the required sequence of cover words occurs within them.

These sets of extension word text position elements which satisfy these conditions are designated as CED1, CED2, etc., as members of an overall set CEIDX.

The purpose of the operations executed in step S11 is to obtain each of the text position values of the search string. As described hereinabove, this is achieved by obtaining (using tables 22 and 21) the position of the initial cover word of the cover word sequence within each of the sets of text position elements CED1, CED2, etc., i.e. by obtaining the amount of offset between the initial character of that first cover word and the initial character of a set of sequential text position elements, from table 22, then obtaining the text position value of the leading text position element of that set, from table 21.

In step S11, the respective first extension word text position elements of the groups CED1, CED2, etc. of the set CEIDX are first extracted. From each of these text position elements, the corresponding text position value of the search string is obtained, based on that text position element and the intra-word position value of the leading cover word (and hence of the search string) with respect to the extension word of that text position element. The set of values thus obtained is designated as Q (={q1, q2, ... }), and specifies all of the text position values for the search string. The set Q is produced and combined with the set P, by merging and sorting processing as described above, and operation is then terminated.

Figure 14A:
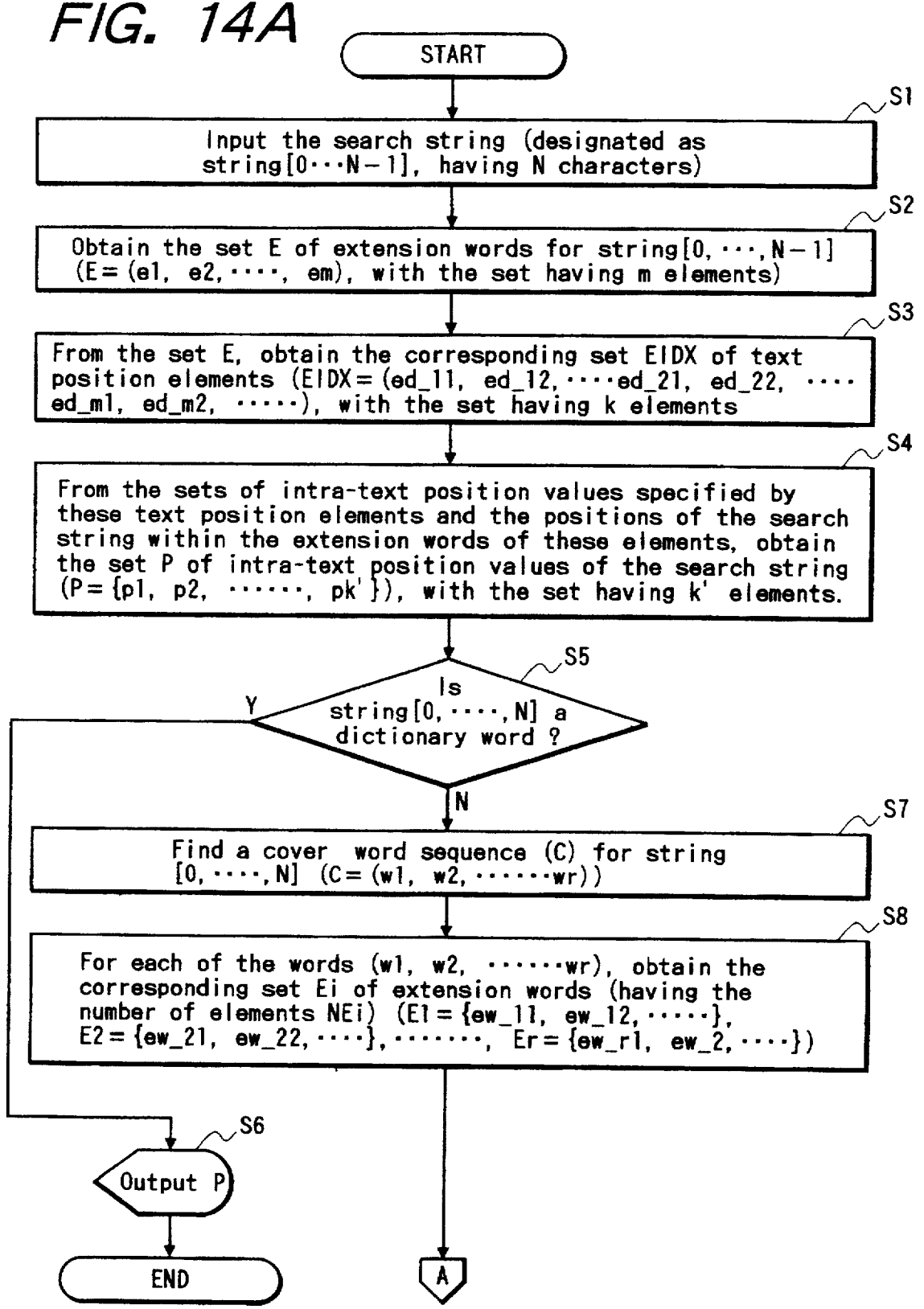
FIGS. 14A, 14B constitute a flow diagram of an algorithm which is executed by the first text search apparatus embodiment, to perform a text search.
Figure 14B:
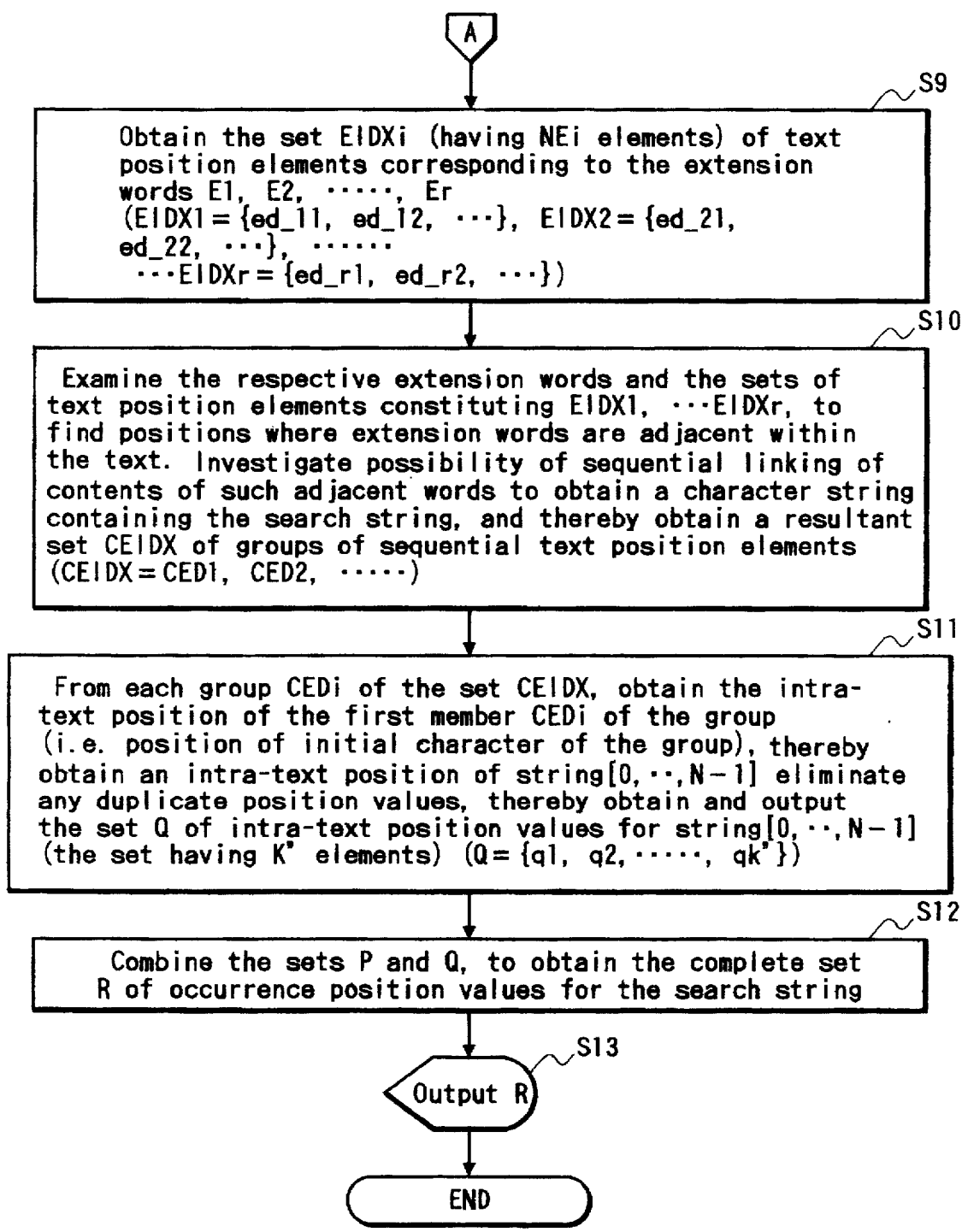

FIG. 15 shows details of the contents of step S2 of the flow diagram of FIGS. 14A, 14B of this embodiment. As shown, the extension word correspondence table 22 is searched to find the set E of extension words which correspond to the search string.

FIG. 16 is a flow diagram showing details of the contents of step S3 of the flow diagram of FIGS. 14A, 14B. As shown, this includes a step S34 in which, for each of the members (e1, e2, etc.) of the set of extension words E, i.e. for the $i^{th}$ member (ei) of that set, the array of text position elements {ed__i1, ed__i2, ... } corresponding to that extension word are obtained (from the entry for the extension word ei in the text position table. 21). With the number of members of the set E being designated as m, the step S34 is executed successively m times. At each execution, the array of text position elements obtained for extension word ei is added to the set EIDX.

Figure 17:
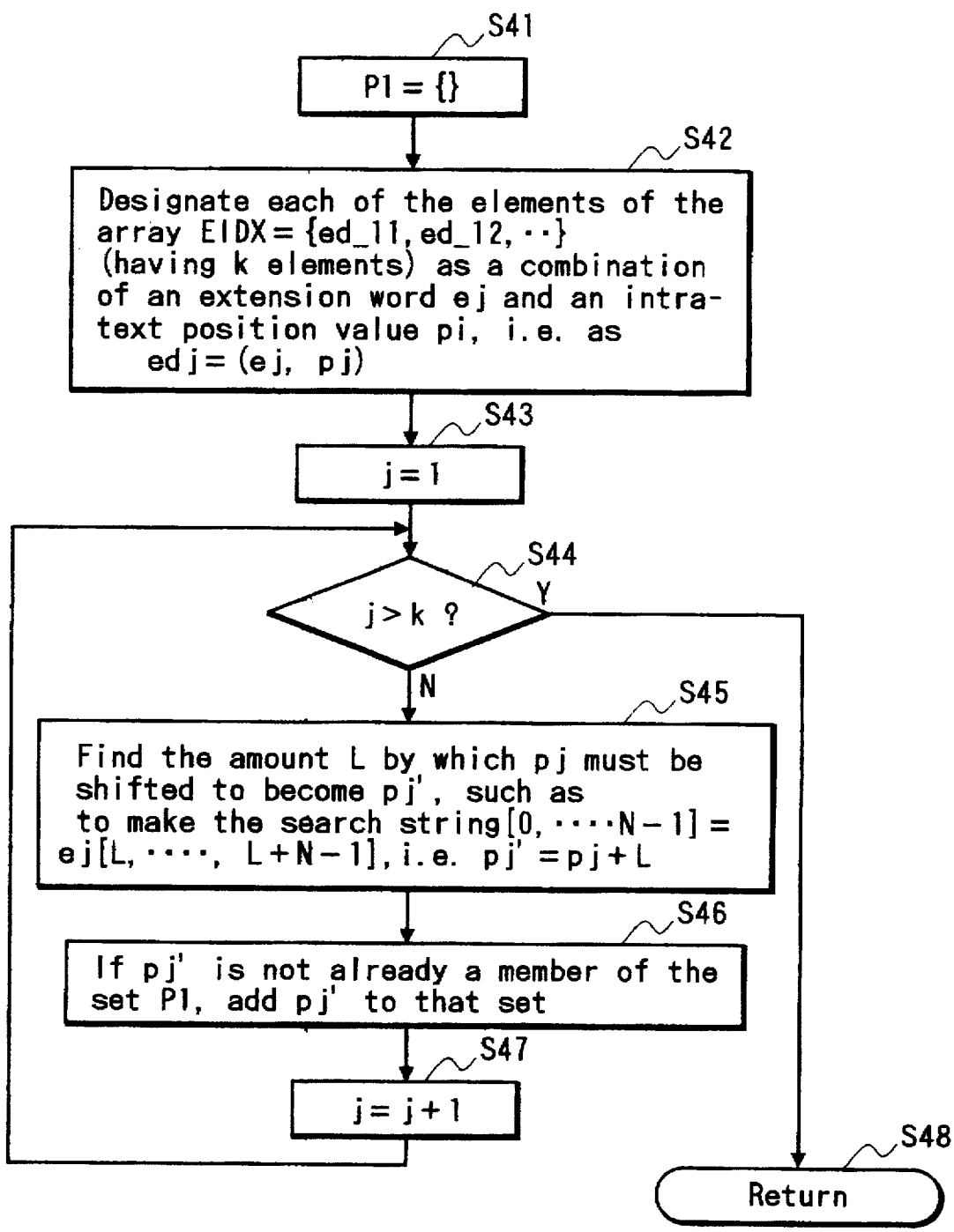
FIG. 17 is a flow diagram showing the contents of a fourth step in the flow diagram of FIGS. 14A, 14B, whereby each of the text position values of the search string are obtained for those occurrences where the search string is contained within respective text position elements.

FIG. 17 is a flow diagram showing details of the contents of step S4 of the flow diagram of FIGS. 14A, 14B. As shown, in a step. S42, each of the text position elements (edj) of the set EIDX is expressed in the form (ej, pj) i.e. as a combination of a specific extension word and a text position value of that extension word. In a step S45, the amount of offset L between the initial character of the extension word ej and the search string is derived, to thereby obtain a text position value pj' for the search string. These steps are executed successively for each of the text position elements of the set EIDX. As a result, the processing of step S4 derives the text position values for each occurrence of the search string within a text position element. Hence, if the search string is a dictionary word, each occurrence of the search string has been obtained at this stage. In that case, a "yes" decision is made in step S5 (e.g. after searching the dictionary list and finding the search string registered therein), the set of text position values obtained is outputted, and the search processing is terminated.

Figure 18:
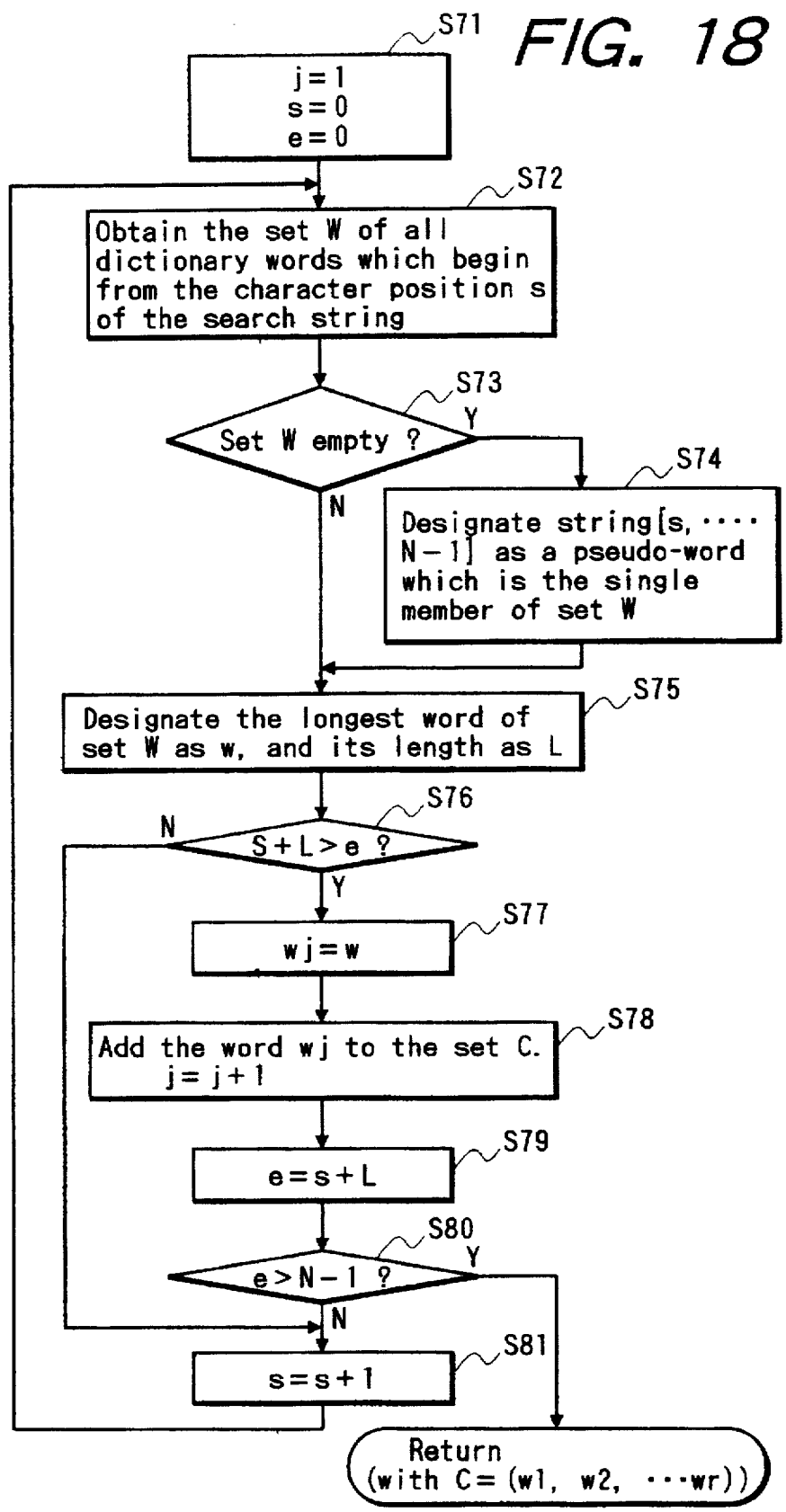
FIG. 18 is a flow diagram showing the contents of a step in the flow diagram of FIGS. 14A, 14B, whereby a sequence of cover words which constitutes the search string is obtained.

FIG. 18 is a flow diagram showing details of the contents of step S7 of the flow diagram of FIGS. 14A, 14B of this embodiment. As shown, the character positions of the search string are successively examined, by using a counter variable s. For each character, the set W of dictionary words which begin from that character position (i.e. extending towards the end of the search string) is found. As described hereinabove, it is possible that the search string may terminate in a string which is not a dictionary word, i.e. it may be found that the set W is empty. That condition is detected in step S73, whereupon in step S74 the terminating string portion is designated as the only member of the set W (in spite of the fact that it does not constitute a dictionary word, i.e. is a pseudo-word).

The longest word w of the set W is then found, in step S75, and its length is designated as L. A step S76 is then executed, to find if that longest word w extends, within the search string, beyond the position to which any previous longest word (beginning from a preceding character) has extended. If so, then in step S77 that word w is added to the set C of cover words for the search string. Otherwise, processing proceeds to the next character of the search string.

It can thus be understood that, the final member wr of the set C is either a dictionary word, or a pseudo-word which is an initial partial character string of a dictionary word.

Figure 19:
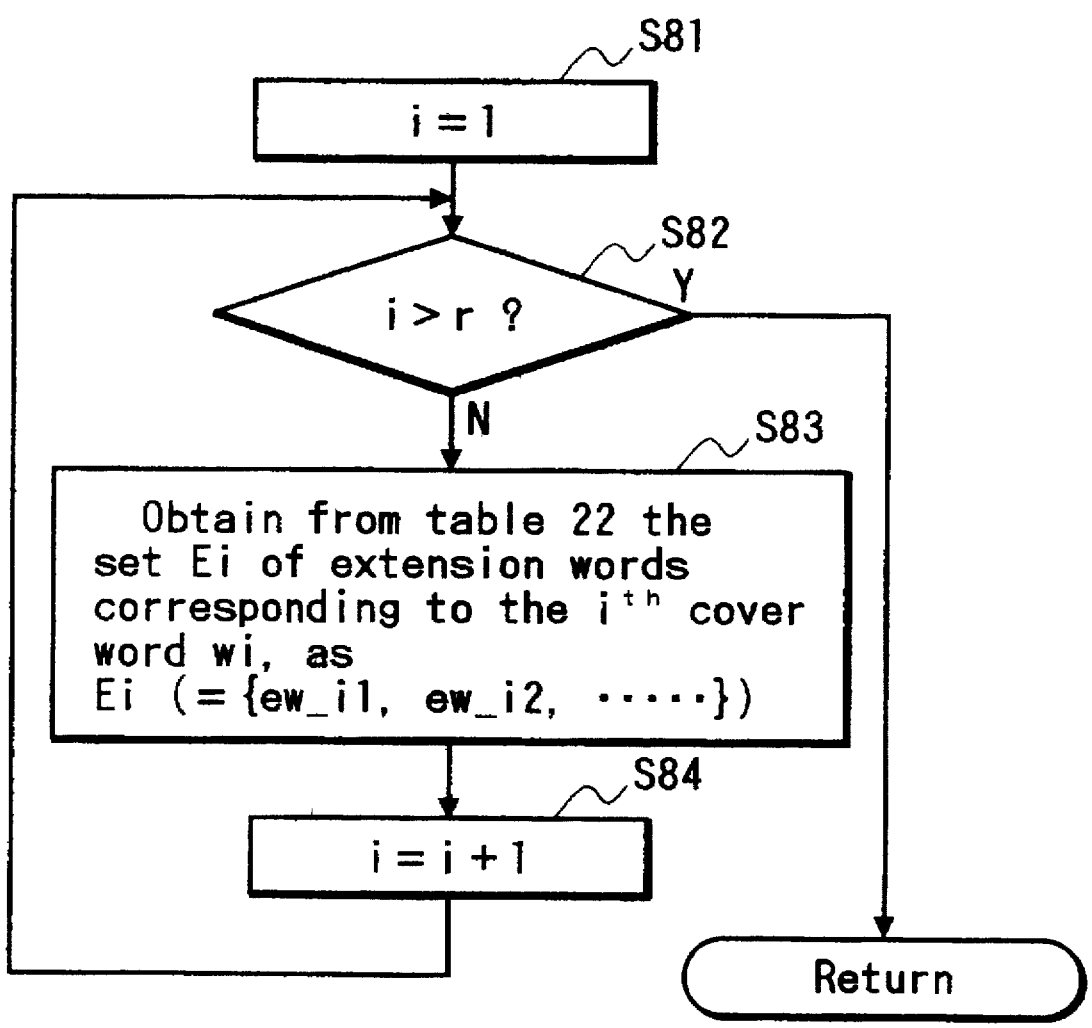
FIG. 19 is a flow diagram showing the contents of a step in the flow diagram of FIGS. 14A, 14B, whereby respective sets of extension words corresponding to the cover words are obtained.

FIG. 19 is a flow diagram showing details of the contents of step S8 of the flow diagram of FIGS. 14A, 14B of this embodiment. As shown, each of the cover words of set C is examined, sequentially, in a step S83. In that step, the set of extension words corresponding to a cover word (i.e. the set of extension words which each contain that cover word as a partial character string) is obtained, by looking up the extension word correspondence table 22 to find the entry corresponding to that cover word. For the $i^{th}$ cover word of the set C, the corresponding set of extension words is designated as Ei (={ew_i1, ew_i2, ... }.

Figure 20:
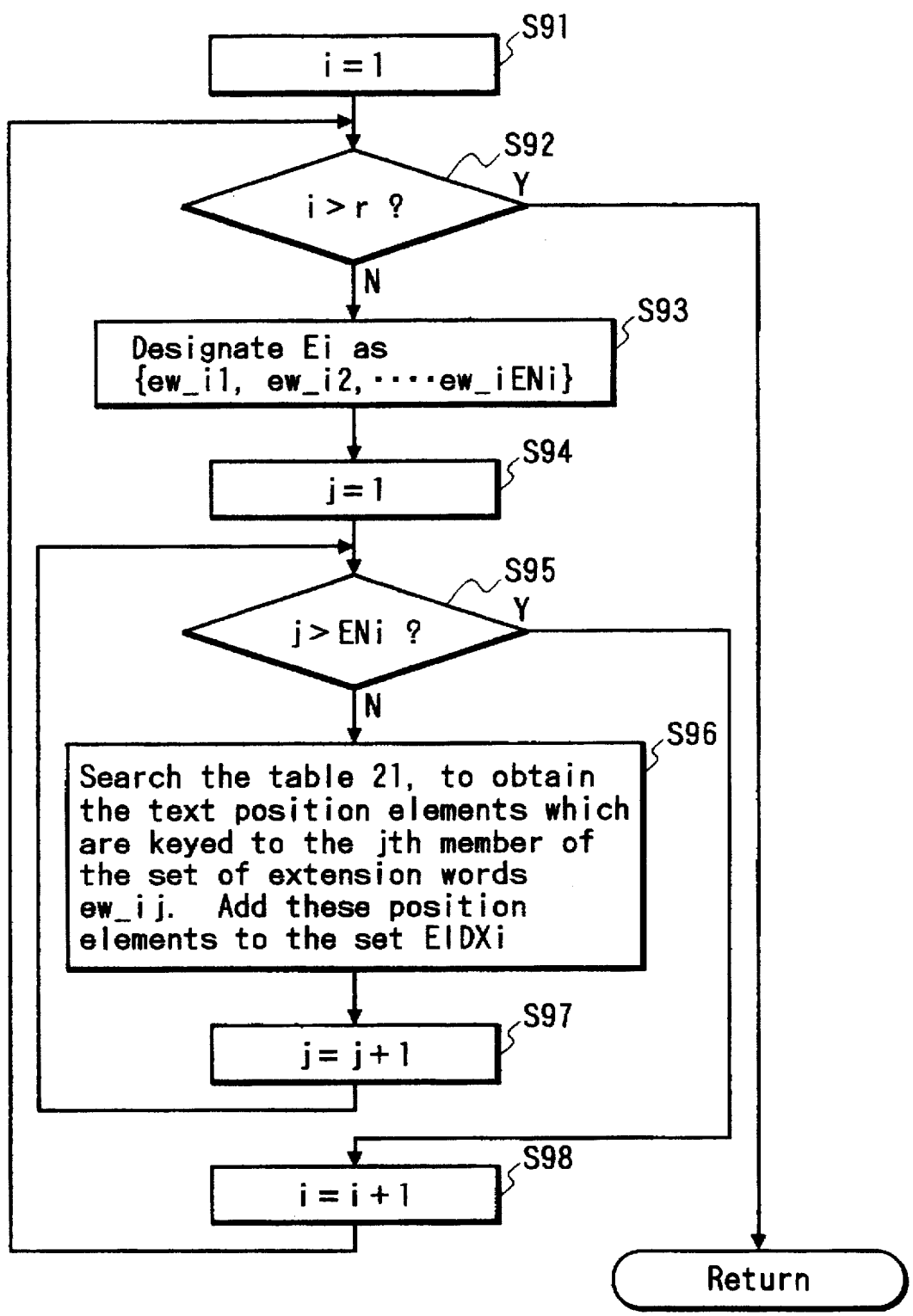
FIG. 20 is a flow diagram showing the contents of a step in the flow diagram of FIGS. 14A, 14B, whereby respective sets of text position elements corresponding to the extension words derived by the flow diagram of FIG. 19 are obtained.

FIG. 20 is a flow diagram showing details of the contents of step S9 of the flow diagram of FIGS. 14A, 14B. As shown, the number of extension words corresponding to the $i^{th}$ cover word, i.e. number of members in the set Ei, is designated as ENi in step S93. A step S96 is repetitively executed, for each such set Ei. A counter variable j is used to successively select each of the extension words of set Ei, and in step S96, the array of text position elements corresponding to the $j^{th}$ extension word of the set Ei is obtained, by accessing the entry corresponding to that extension word in the text position table 21. That array of text position elements is added to a set EIDXi of respective arrays of text position elements for the extension words of set Ei. Thus, upon completion of ENi repetitions of step S96, all of the text position elements which contain the ith cover word are contained in the set EIDXi. These operations are then repeated for the set of extension words which correspond to the next cover word in the aforementioned set C, by incrementing the value of the counter i, in step S98.

Respective arrays of text position elements EIDX1, EIDX2, etc. are thereby successively obtained, corresponding to respective cover words, and are sequentially added to a complete set EIDX. In that way, the final state of EIDX consists of all of the arrays of text position elements for each of the sets of extension words which respectively correspond to the cover words of the set C.

Figure 21:
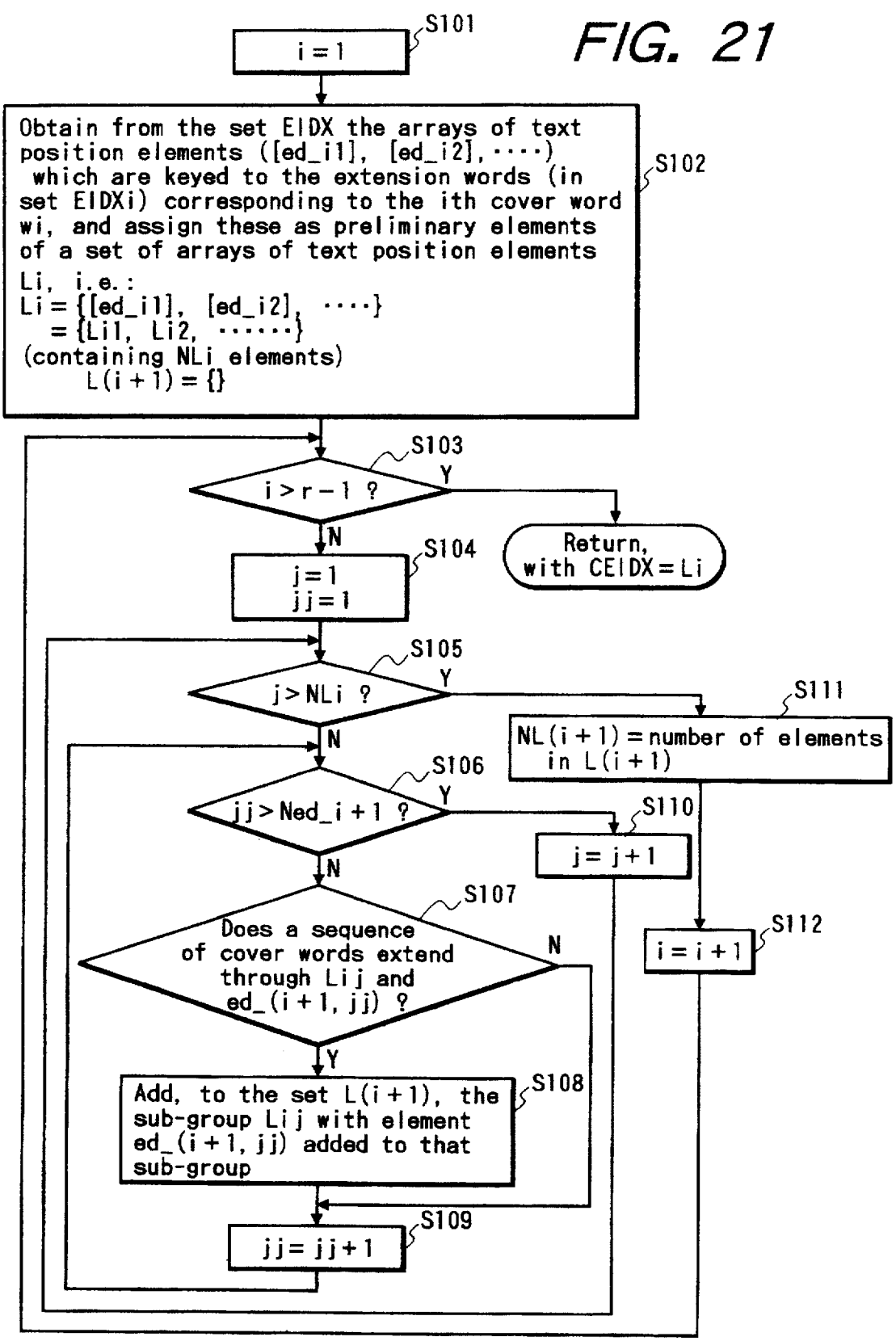
FIG. 21 is a flow diagram showing the contents of a step in the flow diagram of FIGS. 14A, 14B, whereby groups of sequential text position elements are derived, each group containing the sequence of cover words.

FIG. 21 is a flow diagram showing details of the contents of step S10 of the flow diagram of FIGS. 14A, 14B. Firstly, the value of i (used as a counter which corresponds to respective ones of the set C of cover words w1, w2, ... ) is initialized at 1. Next, in step S102, the complete set of arrays ([ed_i1], [ed_i2], ... ) of text position elements for the extension words of the first cover word (w1) is obtained from the aforementioned set EIDX. These arrays of text position elements are then designated as preliminary members of a set Li.

Thereafter, a counter variable j (used to specify successive members of set Li) and counter variable jj (used to specify successive members of the set of text position elements of the next cover word of set C) are initialized to 1. After testing the values of these counter variables, a step 107 is executed, to find if any text position element in the set Li and the text position element for the succeeding cover word, which are currently respectively selected, are either consecutive or sequentially overlapping, and if so, might form part of a sequence of text position elements within which the search string occurs. If such a linkage is found between the pair of text position elements, that pair is added as an element (sub-set) of the set L(i+1), in step S108.

The basic operation can be understood from the simple example of FIG. 23, in which it is assumed, for ease of description that:
(a) there is a total of 3 cover words (w1, w2, w3) in set C,
(b) each cover word has four corresponding extension words, and
(c) each of the extension words has an array of corresponding text position elements which has only a single member. Thus for example, for the first of the four extension words which correspond to the first cover word w1, the corresponding array of text position elements [ed_11] has a single member, which is designated as ed_11.

The first execution of step S107 is illustrated by the "first stage" processing shown in the example of FIG. 23. First the text position element ed_11 of the set Li is compared with each of the text position elements ed_21 to ed_24 for the second cover word w2, then that operation is similarly performed for each of the other members of set Li. The preliminary linkages thus found are illustrated by the broken-line arrow indications in FIG. 23. It is assumed in that example that three such linkages are found, for the initial state of set Li, so that the set L(i+1) is assigned three sub-sets, i.e. arrays, as shown.

On completion of that process, i is incremented by 1, so that the set L(i+1) becomes the updated set Li. The above process is then repeated, to find linkages between any member of set Li and the text position elements of the third cover word (w3), as illustrated by the "second stage" operation in FIG. 23. In that example, two linkages are found, so that the final result is that two sets of text position elements have been found, i.e. (ed__11, ed__23, ed__31) and (ed__12, ed__21, ed__34) which are assigned as arrays of the set CEIDX.

Figure 22:
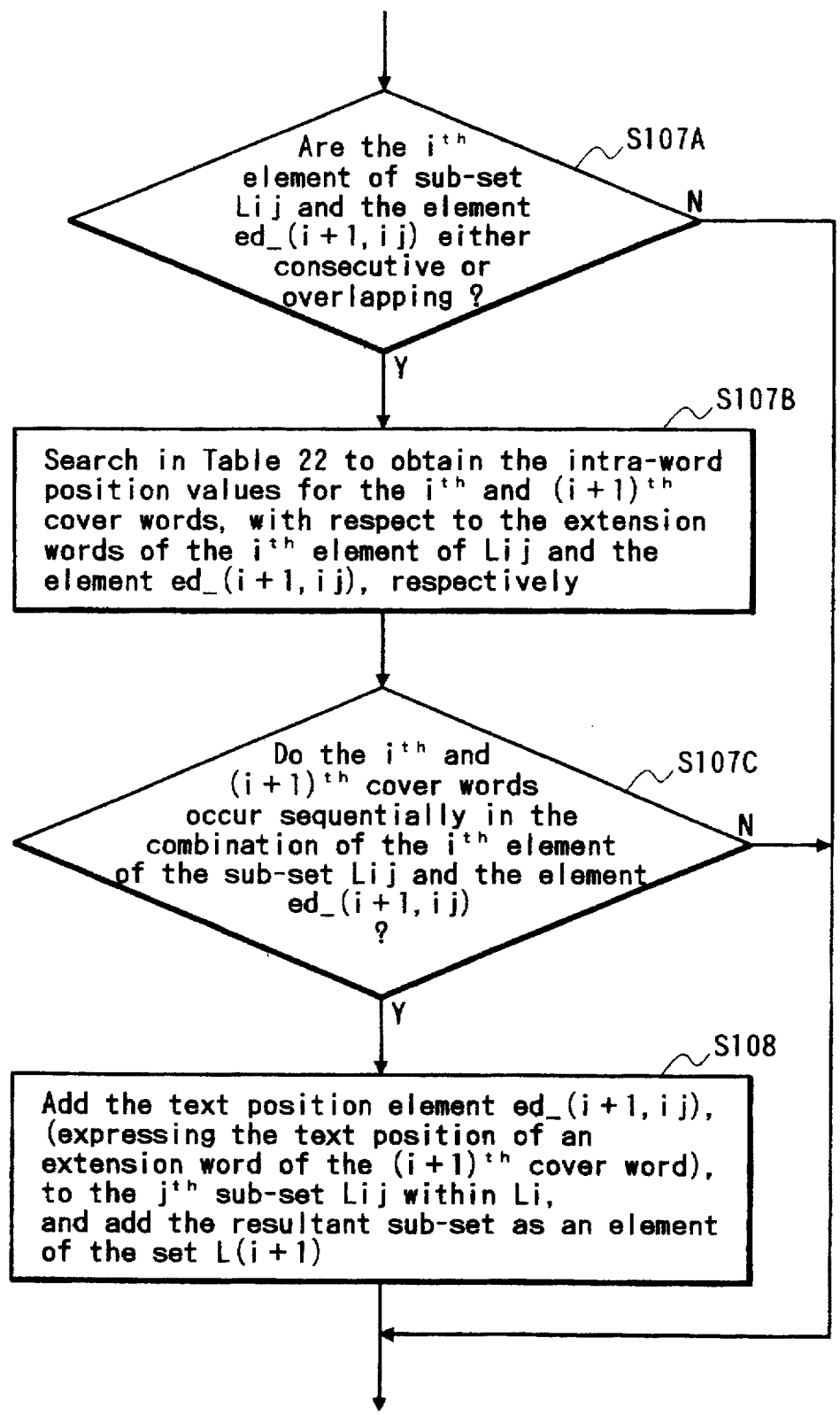
FIG. 22 is a flow diagram showing details of the operation of the flow diagram of FIG. 21.

The operations performed in step S107 are shown in greater detail, as the set of steps S107A to S107C in FIG. 22. As shown, after finding a pair of text position elements (corresponding to a pair of sequential cover words of set C) which satisfy the necessary conditions for "possibility of linkage continuity" (i.e. the text position elements occur sequentially) in step S107A, it is necessary to search in the extension word correspondence table 22 to find the respective positions at which the two cover words appear within the text position elements. One of these text position elements is the ith member of a sub-set within set Li, while the other is a text position element which contains the succeeding cover word. For example, referring to the "second stage" operation shown in FIG. 23, if it has been found that the text position elements ed__23 (which is the second text position element of a sub-set in set Li) and ed__31 are sequential, in step S107A, then it is necessary to find the position of the second cover word w2 within the text position element ed__21 and the position of the third cover word within the text position element ed__31.

Step 107C is then performed, to find whether that pair of cover words actually appear in the requisite sequence within the pair of text position elements. If so, then the text position element ed__31 is added to the sub-set (ed__11, ed__23), to obtain what in this case is a final sub-set of Li, as illustrated by the full-line arrow indications in the "second stage" processing of FIG. 23.

It can thus be understood that upon completion of the processing shown in FIG. 21, operating on all of the text position elements which were obtained in step S9, the final contents of the set Li will consist of sub-sets of sequential text position elements, with the search string extending within each of these sub-sets, and with the first element of each sub-set containing the initial character of the search string. The final contents of L(i) are designated as the set CEIDX, whose members are designated as {CED1, CED2, ... } in step S10 of FIGS. 14A, 14B. For example, the sub-sets [ed__11, ed__23, ed__31] [ed__12, ed__21, ed__34] in the example of FIG. 23 might constitute the elements CED1, CED1 of the set CEIDX. Hence, by extracting the respective first text position elements of CED1, CED2, etc., and obtaining from the extension word correspondence table 22 the respective positions of the first cover word w1 within each of these first elements, the set Q of text position values of the search string is obtained, in step S11.

It can thus be understood that with the first text search apparatus embodiment described above it becomes possible to find, for any arbitrary character string which appears within the object text, all of the positions where that character string appears, with complete reliablity of searching. If the search string is a dictionary word, then the highest speed of searching will be attained, since it is not necessary to execute the steps of the secondary search processing (steps S7 to S12 in FIGS. 14A, 14B).

With the embodiment described above, a high speed of text searching is achieved due to the fact that the extension word correspondence table is of the form exemplified by table 22 in FIG. 12A, i.e. all [extension word/intra-word position value] combinations are provided for every possible partial character string of each of the extension words. However this requires a relatively large amount of data to be stored as the extension word correspondence table. It is possible to modify the first text search apparatus embodiment described above, to provide a compromise between high speed of searching and a moderate amount of data storage capacity, by using an extension word correspondence table of the form illustrated by table 22' in FIG. 12B, (again for the case of the object text example of FIG. 2). In that case the extension word correspondence table registers all [extension word/intra-word position value] combinations corresponding to each dictionary word (i.e. each individual character and each multi-character word that is registered in the dictionary list). It can be seen that when such an extension word correspondence table is used, the search speed attained when searching for a dictionary word will be identical to that attained when using an extension word correspondence table of the form illustrated in FIG. 12A, i.e. only the primary search processing will be be required. When searching for any other character string, the secondary search processing described above will be utilized, i.e. the search string will be processed as a sequence of cover words, so that the search speed will be accordingly reduced. However in some applications, this may be an appropriate compromise between the requirements for high speed and moderate storage capacity.

Alternatively, it is possible to modify the first text search apparatus embodiment by using an extension word correspondence table of the form illustrated by table 22 in FIG. 12C. In this case the extension word correspondence table only registers all of the (extension word/intra-word position value) combinations corresponding to each dictionary word that is a single character. It can thus be understood that the storage requirements for the extension word correspondence table will be substantially reduced. However with such a text search apparatus, the primary search processing described hereinabove will only be applied in those cases when the search string is a single character. Any other search string will be processed by the secondary search processing described above, so that the average search speed will be lowered.

Figure 24:
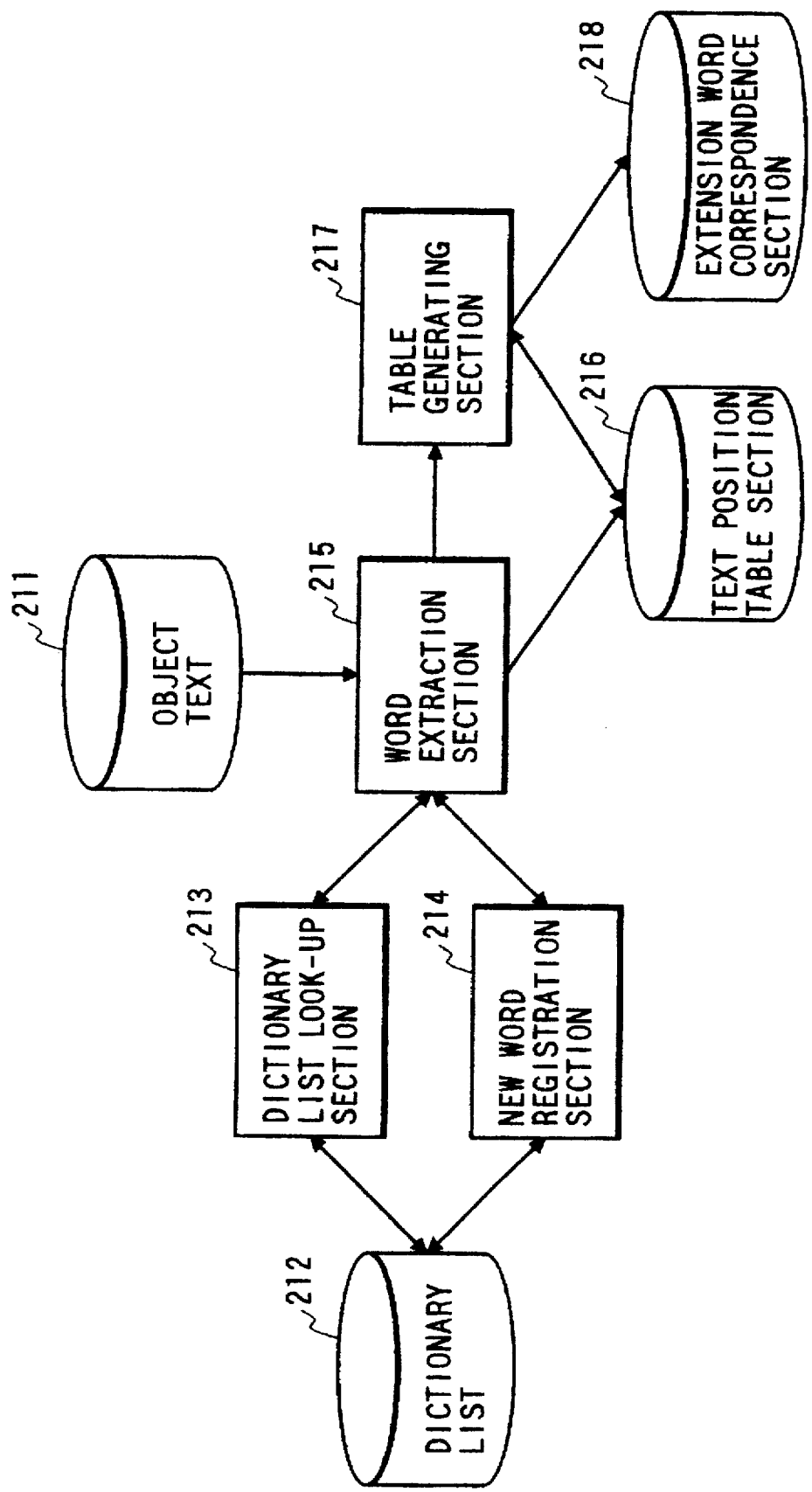
FIG. 24 is a general block diagram of a first embodiment of an apparatus for generating an index file for use in the first embodiment of a text search apparatus.

Embodiments of an apparatus for generating an index file of a text search apparatus according to the present invention, i.e. an index file made up of tables such as the extension word correspondence table 22 and text position table 21 of the first text search apparatus embodiment described above, will be described in the following. FIG. 24 is a conceptual block diagram of the overall configuration of the apparatus. Prior to generating the index file, a dictionary list 212 is prepared. That can consist of an arbitrary list of words, e.g. obtained from a standard dictionary or specialized dictionary. The dictionary list is stored in an electronic data storage medium, and can be accessed by a dictionary list look-up section 213 and a new word registration section 214, which are each linked to a word extraction section 215. As described above, the contents of the dictionary list should be augmented, if necessary, with any unregistered character strings which occur in the object text, prior to generating the text position table contents. The search object text 211 is also stored in an electronic data storage medium, and can be accessed by the word extraction section 215. Character strings extracted by the word extraction section 215 are supplied to a table generating section 217 and to a text position table section 216. In the case of the first text search apparatus embodiment described above, the text position table section 216 consists of one text position table 21, which is stored in an electronic data storage medium, and that condition will be assumed in the following description. Similarly, an extension word correspondence section 218 will be assumed to consist of a single extension word correspondence table 22 as described above, which is stored in an electronic data storage medium, with the contents of that table 22 being derived by the table generating section 217.

Although for ease of understanding the dictionary list look-up section 213, new word registration section 214, word extraction section 215 and position information generating section 217 are shown as separate sections of the apparatus of FIG. 24, it will be understood that in practice these functions can be implemented by a suitably programed computer, by executing the algorithms described hereinafter.

Figure 25:
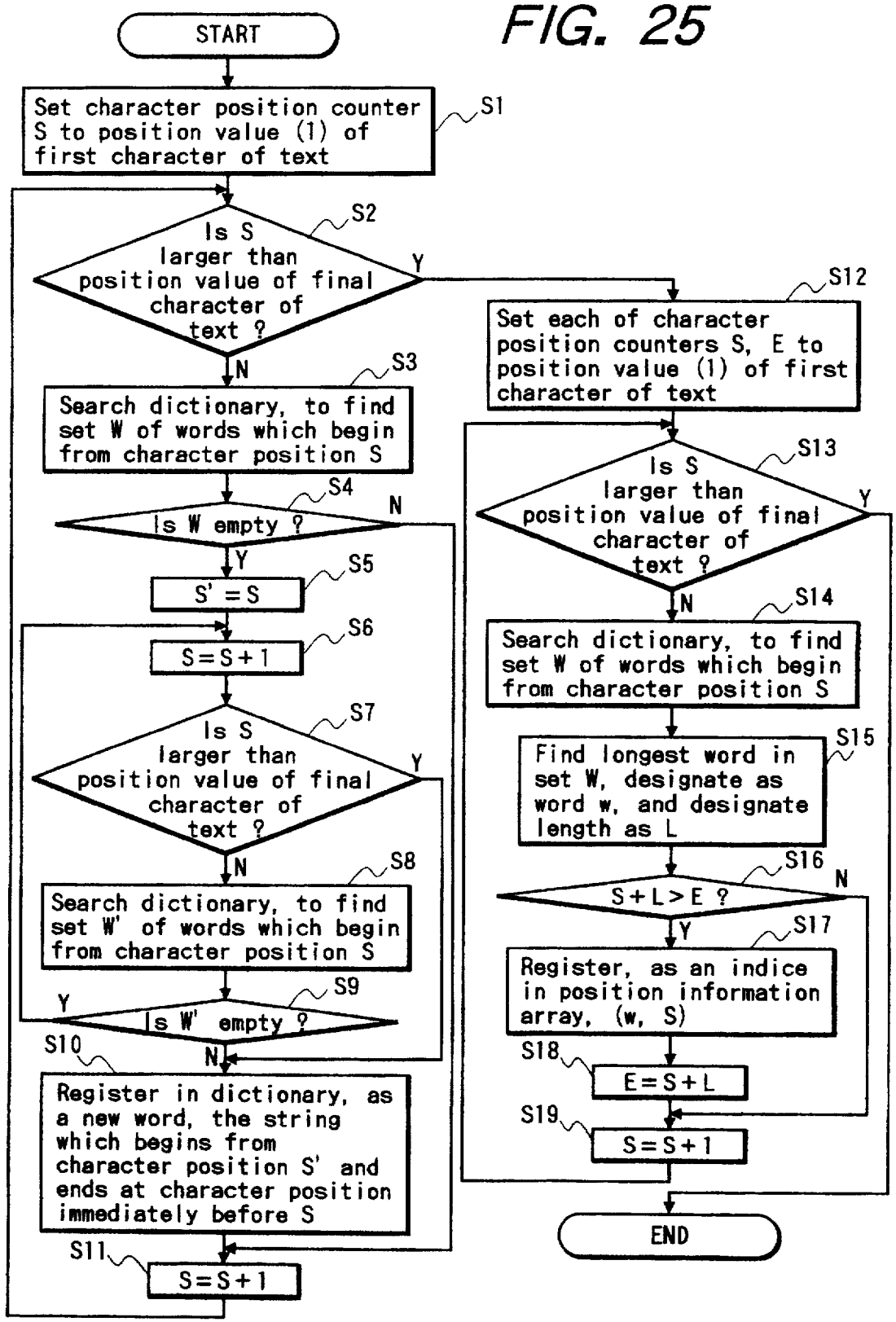
FIG. 25 is a flow diagram of an algorithm executed by the first index file generating apparatus embodiment, to generate a text position table.
Figure 26:
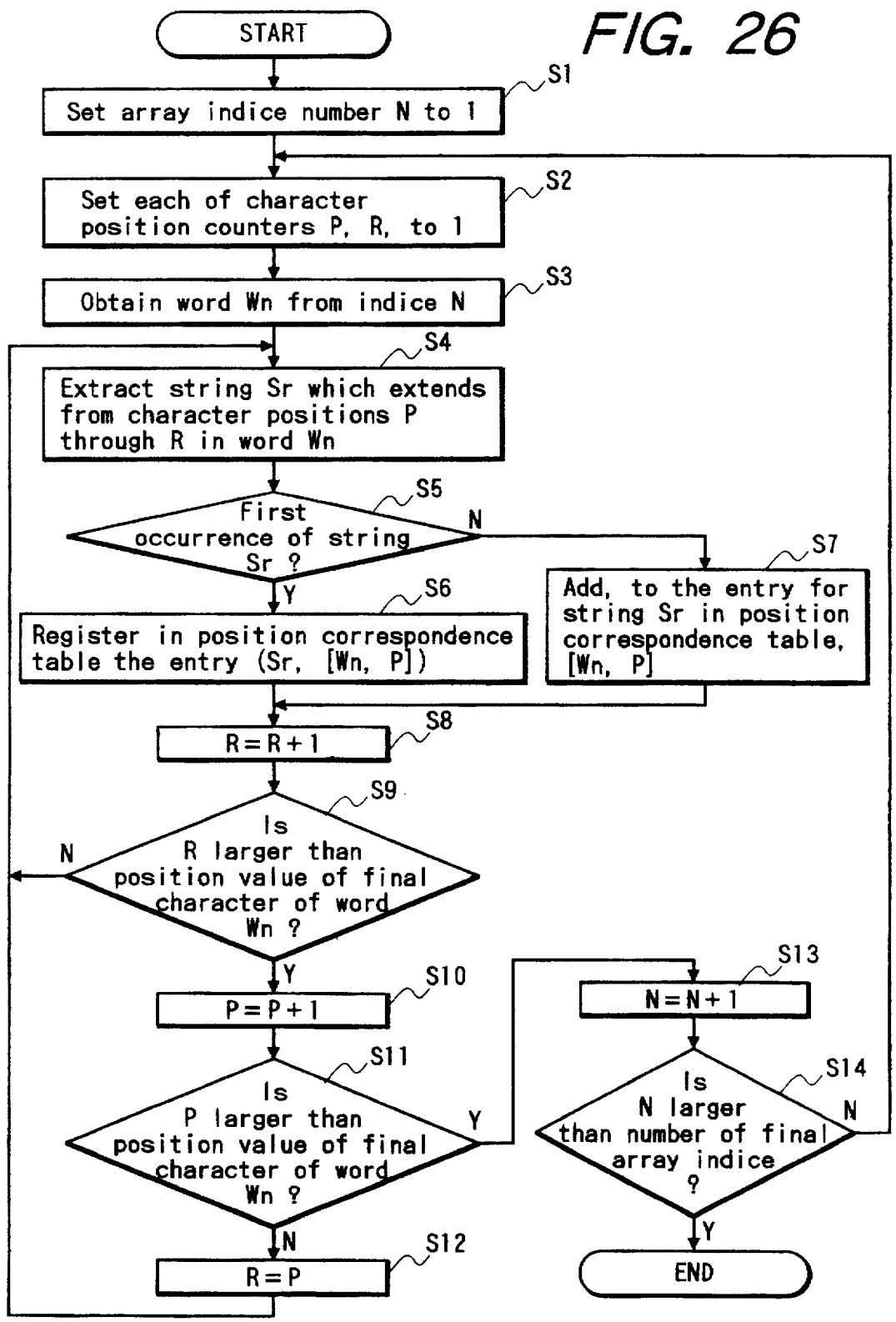
FIG. 26 is a flow diagram of an algorithm executed by the apparatus of FIG. 24, to generate an extension word correspondence table.

The algorithms executed by a first embodiment of the index file generating apparatus are shown in the flow diagrams of FIGS. 25 and 26. The algorithm shown in the flow diagram of FIG. 25, for generating the extension text position table 21, will be described first. In FIG. 25, for brevity, the object text is referred to as the text, the text position elements as indices, and the dictionary list as the dictionary. Successive character positions within the object text, starting from the initial character, are assigned respective values of a counter variable S, The series of steps S1 to S11 in FIG. 25 are executed to ensure that, for every character position within the object text, at least one word (consisting of one or more characters) begins from that character position and is registered in the dictionary list. In that way it is ensured that, during a subsequent text search, a condition will not be encountered whereby the set of dictionary words which begin from a character position is empty.

The series of steps S12 to S19 in FIG. 25 are executed to select, for each character position in the text, the maximum-length word with respect to that character position, which extends beyond any preceding words. The respective text position elements, to constitute the text position table 21, are thereby generated.

More specifically, the operation is as follows. After initially executing steps S1, S2, step S3 is executed to find the set W of dictionary words which extend from the first character of the object text. If such a word is found, i.e. the set W is not empty, step S11 is executed, and the above process is repeated for the second character of the object text. However if the set W is found to be empty in step S4 (i.e. even the single character at position S1 in the object text has not been registered in the dictionary list), then a variable S' is set equal to the character count value S, S is advanced by 1 (in step S6), and then (in step S8) the set of words W' which extend from the second character position of the object text is obtained.

In step S9, a decision is made as to whether the set W' is empty. If that set is not empty, (i.e. at least the character which is located at position S is registered in the dictionary list) then the character at position S' is registered in the dictionary list as a new word. If the set W' is empty, then the character counter S is advanced to the next character position, and steps S7 to S9 are repeated.

It can thus be understood that the loop of steps S6 to S9 will be sequentially executed a plurality of times, if a string of characters is encountered for which neither the string nor any of its individual characters are registered in the dictionary list. As a result, that string will be registered in the dictionary list as a new word.

In the case of the sample text "theeditorwonit", the following operations are executed. It will be assumed in the following description that the dictionary list has at least the contents shown in FIG. 10, prior to beginning the operations After S has been set to 2 (i.e. to the position of text character "h") in step S11, after the first execution of steps S2 to S10, the set of dictionary words "he" and "heed" which begin from the character "h" will thereafter be found in step S3. A "yes" decision is thereby obtained in step S4, then S is increased to 3, and the above operations are repeated for character position "e", and so on in succession for each of the character positions of the object text.

If it were to be assumed that the dictionary list contains the word "on" but not "w' or "won", then when step S3 is executed with the value of the character counter S having reached 10, (i.e. corresponding to the character position "w" in the text), the set W would be found to be empty in step S4, so that S' would be set as 10. S would then be set to 11, in step S6, and in step S8 the set of words W' would be found to be the single word "on", so that a "no" decision would be made in step S9. Step S10 would therefore then be executed to register the character (w) which corresponds to position S', as a new word in the dictionary list.

The above operations of steps S2 to S11 are cyclically executed until it is found in step S2 that the final character of the object text has been processed.

The process of determining the extension words, and their respective arrays of text position elements is as follows, again assuming the initial contents of the dictionary list are at least as shown in FIG. 10.

The character position counter S, and a second character position counter E, are each set to the position (1) of the first character of the object text, in step S12. Proceeding through step S13, step S14 is executed, in which the set of words W extending from the first character position of the object text is obtained, i.e. the single-word set "the" for the above example. The longest word w of that set (in this case, again "the") is then found, and in step S16 a decision is made as to whether the sum of the character counter value S and the length L of word w (i.e. the value 1+3=4) is greater than the character counter value E (which is 1). If it is greater, as in this case, then this indicates that word w is to be used as an extension word of a text position element, and in step S17 the combination of word w and its text position value S are registered in table 21 (i.e. as an element of the array of text position elements corresponding to that extension word). In FIG. 25 it is assumed that the position (S+L−1) of the final character of word w is also registered as part of that text position element, however as described above it is only necessary to specify the extension word (or an identifier for the extension word) in conjunction with the text position value of either the initial character or of the final character of that extension word, as a text position element.

The value of the counter E is then set to (S+L), i.e. to 4, and counter S is then advanced to 2, corresponding to the character "h" of the object text. Steps S13 to S19 are then repeated for that character. In this case, the longest word of the set W is found to be "heed", for which a corresponding text position element is registered in table 21 in step S17, since it is found that (S+L)=6, which is greater than E. E is then set to (2+4)=6.

(If however it is found in step S16 that (S+L) is not greater than E, then the value of E is left unchanged, the character counter S is advanced to the next character position, and steps S13 to S19 again executed.)

The third and fourth executions of the loop of steps S12 to S19, for this text example, are as follows 3rd Execution: S and E are initially 3 and 6. The maximum-length word is "e". (S+L)=4, so that occurrence of "e" is not selected as an extension word of a text position element.

4th Execution: S and E are initially 4 and 6. The maximum-length word is "editor". (S+L)=10, so that (editor, 4) "is selected as a text position element.

The fifth through twelfth executions of the loop are similarly executed. The final executions are as follows:

13th Execution: S and E are initially 13 and 13. The maximum-length word is "it". (S+L)=15, so that (it, 13) is selected as a text position element.

14th Execution: S and E are initially 14 and 15. The maximum-length word is "t". (S+L)=15, so that "t" is not selected as an extension word of a text position element.

As a result, the words "the", "heed", "editor", "won" and "it", with their respective positions in the text, will be successively registered as text position elements in the text position table 21.

This first embodiment of an index file generating apparatus also executes an algorithm of the form shown by the flow diagram of FIG. 26, to generate the extension word correspondence table 22 of the index file of the first text search apparatus embodiment. The extension word correspondence table is referred to simply as the position correspondence table in FIG. 26, and it is assumed that the respective entries (i.e. arrays of text position elements corresponding to respective extension words) in the text position table 21, generated as described above, have been assigned respective numbers which are referred to as indice numbers. In the first step, a counter variable N is set to the indice number (1) of the first entry in the text position table (step S1). Each of two character position counters P and R is then set to 1, and the extension word Wn of that first entry is obtained (step S3). The character string Sr which extends between the character positions corresponding to P and R of that extension word is then found. At the first execution of step S4, that string will consist of a single character, e.g. the first character "t" of the example text "theeditorwonit". If it is found in step S5 that this is the first occurrence of that string within the object text, then a new entry of the form (Sr, [Wn, P]) is then made in the extension word correspondence table 22, i.e. (t, [the, 1]). That is to say, the character string, the extension word of which the string is a partial character string, and the. position of the string within that extension word, respectively constitute the entry for that character string in the extension word correspondence table 22.

R is then incremented by 1, and the above operations are repeated for the first two characters of the object text, i.e. "th", and the corresponding entry made in the extension word correspondence table, i.e. (th, [the, 1]), and similarly for the first 3 characters, i.e. (the, [the, 1]).

When R has reached 4, then this is larger than the position value (3) of the final character of the word Wn ("the"), so that P is then incremented by 1 in step S10. R is then made equal to P, and the above operations which were executed for the first character "t" of the object text are executed for the second character "h", so that the entry (h, [the, 2]) is made in the extension word correspondence table. The entry for the string "he" is then generated, then P is incremented by 1 in step S10, R is made equal to P, and then the entry for the third character "e" of the object text is registered, in the succeeding execution of step S6, as (e, [the, 3]).

It is then found in step S11 that P is larger than the final position value (3) of the first word (the), and so the counter N is incremented in step S13, and the above operations are then repeated for each of the character strings constituting the next extension word, i.e. "heed". In this case, it will be found in step S5 that the character "h" has already occurred in scanning the object text, so that step S7 is executed, to add the information concerning that second occurrence to the previously generated entry for "h" in the extension word correspondence table. That is to say, the entry in table 22 for that character string is updated to become:

h: [the, 2], [heed, 1]).

The above operations are executed for each of the words in the text position table, to specify the position (or positions), within these words, of each character or character string which occurs in the object text.

A second embodiment of an apparatus for generating an index file for use in a text search apparatus according to the present invention is as follows. This embodiment has the conceptual system configuration shown in FIG. 24, and utilizes the same algorithm as the first embodiment for generating the extension word correspondence table, but differs from the first embodiment in that when an unknown character string is encountered, the respective characters of that string are individually registered as new words in the dictionary list, rather than registering the entire string as a new word.

Figure 27:
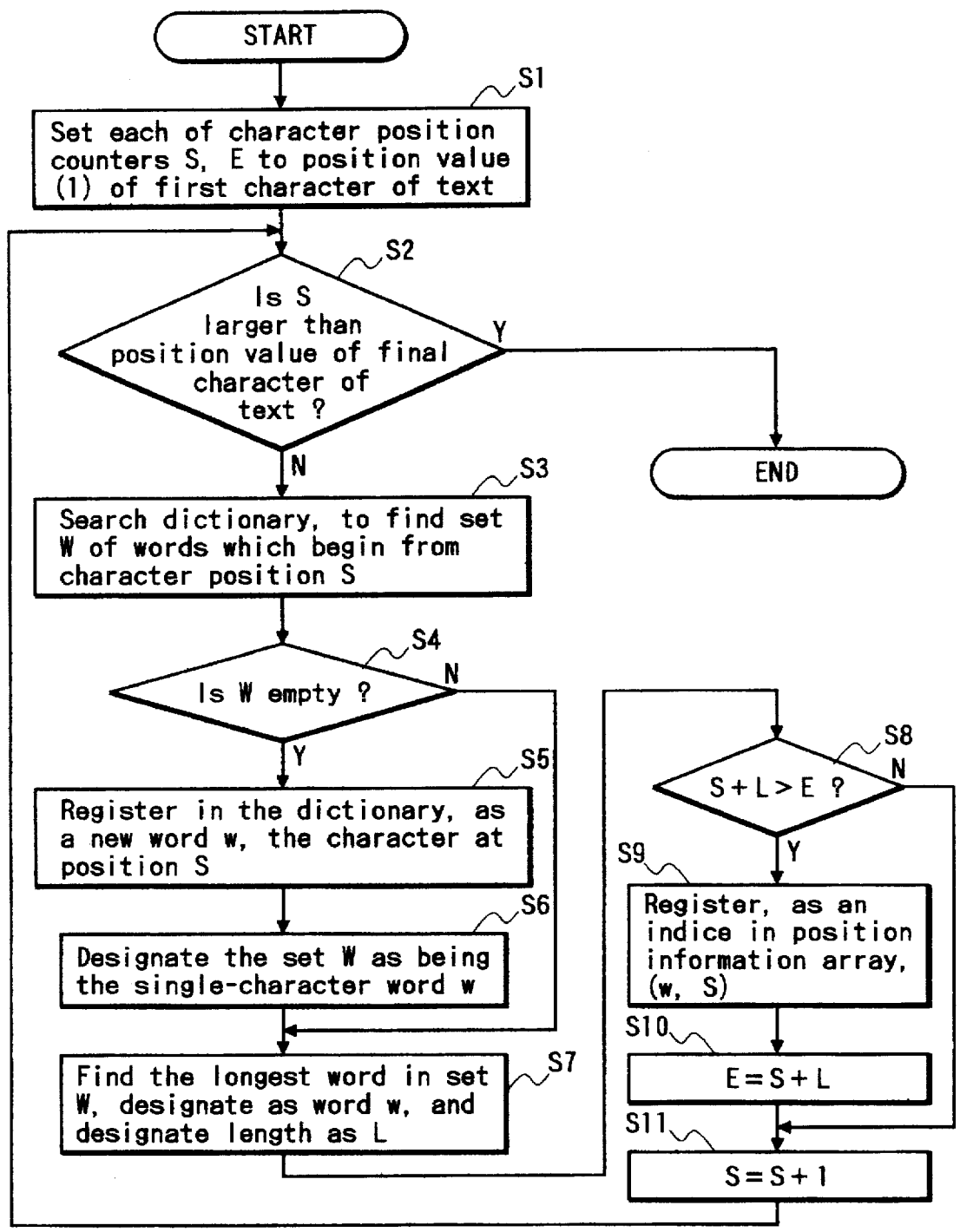
FIG. 27 is a flow diagram of an algorithm executed by a second embodiment of an index file generating apparatus, to generate a text position table.

That algorithm is shown in the flow diagram of FIG. 27, with the text position elements again being referred to as indices. In this case, rather than first scanning each of the text character positions to register any new characters or character strings in the dictionary list, then again scanning the text character positions to determine the words to be entered in the text position table, a single sequential scanning operation is executed to achieve both of these functions. For ease of description, it will be assumed that the aforementioned sample text "theeditorwonit" is to be used, with the dictionary list having the contents shown in FIG. 10, except that the character "w" and word "won" will be assumed to have been initially omitted from the dictionary list.

Firstly, two character counter variables S and E are each initialized to 1, then after judging whether scanning of the object text has been completed (step S2), the set W of words which extend from the first character position is found. That set contains the word "the", so that a "yes" decision is made in step S4, and step S7 is then executed in which the longest word ("the") of the set W is determined, as word w. The length L of that word and the current value of character counter S are then added and compared with the value of E (step S8). If (S+L) is not greater than E, then S is advanced to the next character position (step S11) and the cycle is repeated. If (S+L) is greater than E, then the word w is selected to be used as an extension word, and the word and its intra-text position are registered as a entry in the text position table in step S9. E is then set to (S+L), before incrementing S in step S11. It is assumed in FIG. 27 that the position (S+L−1) of the final character of word w is also registered in the text position table.

Thus in the case of the sample text, in the first cycle, i.e. first execution of the steps S2 to S11, "the" is registered as an extension word in the text position table (i.e. a first text position element of the array of text position elements for that word is registered) and E is set to (S+L)=(1+3)=4.

In the second cycle (S=2), the word "heed" is obtained in step S7, and since E is 4 and (S+L) is 6, that occurrence of "heed" is registered as a text position element in step S9.

In the third cycle (S=3), the single character "e" is obtained, however E is 6 and (S+L) is 4, so that (S+L) is not greater than E.

In the fourth cycle (S=4), the word "editor" is obtained in step S7, and since E is 4 and (S+L) is 10, that occurrence of "editor" is registered as a text position element in step S9.

Fifth through ninth cycles are similarly executed.

In the tenth cycle, since the character "w" is not listed in the dictionary list, a "yes" decision is made in step S4. As a result, step S5 is executed in which the character "w" is registered as a new word in the dictionary list. That character is then taken (in step S7) as the only member of the set W of words extending from the character position 10. Since (S+L) is 11 and E is 10, a text position element (w, 10) is registered in the text position table, in step S9.

In the eleventh cycle, the word "on" is obtained in step S7, and since E is 11 and (S+L) is 13, a text position element (on, 11) is registered in the text position table.

The remainder of the text is similarly processed, in subsequent twelfth through fourteenth cycles. As a result, respective text position element arrays keyed to the extension words "the", "heed", "editor", "w" "on" and "it" will be registered in the text position table. In addition, the dictionary list is modified by adding "w" as a new word.

It can thus be understood that with this embodiment, the text characters are successively scanned in a single pass, to generate the respective text position elements to be registered in the text position table 21. If a character is encountered which is not registered in the dictionary list, the character is then registered in the dictionary list. If a string of characters is encountered which are not separately listed in the dictionary list, then the apparatus will register these characters individually in the dictionary list, as respective new dictionary words.

With the first embodiment of a text search apparatus described hereinabove, as can be understood from the example of the extension word correspondence table 22 shown in FIG. 12, if all of the partial character strings of each extension word are registered in that table, then it will be necessary to store a large amount of data if the size of the object text is large. A second embodiment of a text search apparatus will be described in the following, which enables that problem to be alleviated while ensuring a high speed of searching, and so is suitable for application to processing large volumes of text. The basic operation of the second embodiment is similar to that of the first embodiment described above. However the second embodiment utilizes an index file (basically consisting of a text position table section and an extension word correspondence table section, shown in FIG. 7, as for the first embodiment) which enables a high speed of processing, and whereby any arbitrary character string can be located in the object text, but whereby it becomes unnecessary to store all of the partial character strings of the extension words. Before describing the second embodiment of a text search apparatus, the essential principles of the index file of that embodiment will be described.

A number of different tables are utilized in the extension word correspondence table section of this embodiment, however for the purpose of describing the basic principles these can be considered as being a set of three tables, which will be referred to as tables 1, 2 and 3. Considering any specific character which occurs in the object text, a section in table 1 (as illustrated in FIG. 28A) contains a list of all of the extension words which have that specific character as the initial character. A section in table 2 (illustrated in FIG. 28B) contains a list of all of the extension words which have that specific character as the final character. A section in table 3 (illustrated in FIG. 28C) contains a list of all extension words which contain that specific character at a position other than the initial character position and/or the final character position. (Such words of course may contain that character also at the initial character position and/or the final character position).

That section in table 3 is divided into a number of sub-sections, i.e. a first sub-section containing a list of all extension words in which the specified character is the second character of each word, a second sub-section containing a list of all extension words in which the specified character is the third character of each word, and so on. Each sub-section continues up to the longest extension word(s) within which the character occurs in the last-but-one character position. It can thus be understood that there need be no duplication of the information that is provided in tables 1 and 2.

Similar sections (each divided into sub-sections as described above) are provided in table 3 for all of the characters which appear in the object text.

The principles can be understood by assuming for example that "enjoyable" is one of the extension words. In that case, if "enjoy" is the search string, it occurs as a prefix portion of that extension word, i.e. "enjoyable" is a prefix extension word of the string "enjoy. Each of such prefix extension words are found when searching the section of table 1 in which extension words beginning with "e" are listed. Conversely, if "able" is the search string, then when the section of table 2 listing words which end in "e" is searched, all words which have "able" is a suffix portion (i.e. all of the suffix extension words of the string "able") will be found. If "nj" is the search string, then extension words such as "enjoyable" will be found when searching the section of table 3 which lists those extension words having "n" as the second character, for example, i.e. those extension words for which the search string has an intra-word position value of 2. Such a word will be referred to as a two-way extension word of the search string.

Thus for example the word "editor" is a prefix extension word with respect to the string "edit", and is a suffix extension word with respect to the string "tor". In addition, "editor" is a two-way extension word with respect to the string "dit".

It can hence be understood that by using such a set of three tables, it becomes possible to find all of the extension words within which an arbitrary search string occurs as a partial character string, and the respective intra-word position values. Hence, the functions provided by the extension word correspondence table 22 of the first text search apparatus embodiment can be implemented.

A second basic feature of the index file of the second text search apparatus embodiment is as follows. When a search string occurs within a number of different extension words, then to find the sequential positions where the search string occurs in the object text, it is first necessary to obtain the respective arrays of text position elements which are keyed to these extension words. That is illustrated in FIG. 29, in which an example of a text position table 300 is shown. That table provides similar information to the text position table 21 of FIG. 11, but expresses each array of text position elements as an extension word in conjunction with an array of text position values of that extension word. It will be assumed that the search string is the dictionary word "edit", and that each occurrence of that search string within the object text lies within one of the extension words which are shown, i.e. credit, creditor, editor, editorial, or editorship. Based on the respective arrays of text position values of these extension words, from table 300, (and the intra-word position values of the search string within these) a corresponding set of five arrays of text position values for the search string are obtained as shown. The five arrays of text position values thus obtained must then be merged into a single array. When doing so, it is necessary to eliminate any duplicated values, such as the value 68 in this example. That is to say, since the search string begins from the third character position within the extension word "credit", the second member of the corresponding array of text position values for the search string is 68. However the search string also begins from the first character position of the extension word "editorial", which also has a text position value of 68. This shows that "credit" and "editorial" partially overlap, at one occurrence of each of these words within the object text, resulting in a duplicated text position value for the search string "edit".

After performing that merging processing, the resultant array must then be sorted into a sequence of successively increasing values, to obtain the final array of text position values for the search string, as illustrated in FIG. 29.

If the number of extension words which contain the search string is large, then the amount of processing time required to execute such merging and sorting processing can become substantial, and this represents an obstacle to achieving a high search speed.

With the index file of the second embodiment, therefore, the extension words are divided into two categories, i.e. a class of extension words referred to in the following high occurrence words (each of which occurs in the object text, keyed to a text position element, a number of times which is higher than a predetermined threshold value) and a class of extension words referred to as low occurrence words (each of which occurs, in the object text, a number of times which does not exceed the aforementioned threshold value). In the case of the extension words which have been classified as high occurrence words, the text position elements which are keyed to a high occurrence word are expressed, within a single corresponding entry in a text position table of the second embodiment, as an array of text position values which successively increase magnitude, as for the example of the text position table 300 of FIG. 29.

However in the case of the extension words which have been classified as low occurrence words, the words are divided into a plurality of groups, according to some arbitrarily determined criteria, with the text position elements within a group having successively increasing text position values. For example, sets of ten successive words, from the entire set of low occurrence words arranged in dictionary sequence, can be designated as respective groups, with corresponding group numbers assigned thereto, and with each word assigned an intra-group position number indicating its position with the corresponding group.

The text position table for the low occurrence words has the basic configuration shown in the example of FIG. 30. Each entry in the table will be assumed to consist of a group number, the first word (in the dictionary sequence) of the group, and the array of text position elements which are keyed to respective words of that group. In the text position table array example of FIG. 30, the group having group number 1 has as its initial member the word "ace". In the array of text position elements for group 1, "ig11" signifies the intra-group number of the word that is a member of group 1 and occurs first (out of all of the members of that group) within the object text. The text position value of that occurrence is indicated as "p11". Similarly, "ig12" is the intra-group number of the word of group 1 which occurs next within the object text, at a position expressed by the text position value "p12".

The advantage obtained can be understood from the following example. If the extension words "editor", "editorial", and "editorship" of the example of FIG. 29 were in fact low-occurrence words, within such a group, then the text position elements of these words would occur within the array of text position elements for the group, in the sequence {(editorial, 68), . . . (editorial, 84), . . . (editorship, 120), . . . (editor, 276) . . . }. In that case, if the search string is "edit", It becomes unnecessary to perform merging and sorting processing of separate arrays of text position values, to obtain the set of sequential text position values [68, 84, 120, 276] for that search string. "edit", in the example of FIG. 29. It can thus be understood that such a feature enables an increase in average search speed to be achieved.

The aforementioned tables 1, 2 and 3 which are used to implement the extension word correspondence table functions in this embodiment will be described more specifically, referring first to table A of FIG. 31, which illustrates in more detail the contents of table 1 of FIG. 28A. The table of FIG. 31 relates each of the high occurrence words having a specific character as its initial character to respective word numbers (i.e. the high occurrence word numbers), with each word number pointing to a corresponding array of text position values within a text position table, and with the high occurrence words being listed in dictionary sequence. In FIG. 31, the "*" symbol indicates an arbitrary character. The set 301 consists of entries for all high occurrence words which begin with "a", these words having the successive word numbers from 1 to 45 in the dictionary sequence. Similarly, set 302 consists of entries for all high occurrence words which being with "b", these words having the successive word numbers from 46 to 67 in the dictionary sequence. For example if the search string begins with the letter "a", then section 301 of the table of FIG. 31 would be searched, to find each high-occurrence word having the search string as a prefix portion. (When such an extension word is found, the intra-word position value of the search string will of course be 1).

Similarly in FIG. 32, the contents are shown of table B, which relates each of the high occurrence words having a specific character as its final character to respective ones of the aforementioned dictionary sequence word numbers, with the words being listed in inverse dictionary sequence. As used herein, the term "inverse dictionary sequence" signifies a sequence in which the words would be arranged if the character order within each word were to be inverted, and the resultant inverted words arranged in dictionary sequence. Thus if for example the final character of the search string is "b", then the section of the table which lists those words ending in "b" is searched, to find each high-occurrence word in which the search string appears as a suffix portion. When such an extension word is found, the system then obtains the intra-word position of the search string within that extension word. Designating the number of characters of the extension word as M, and the number of characters of the search string as N, the apparatus obtains the intra-word position value as (M−N+1).

A similar pair of tables to those of FIGS. 31 and 32 are provided for the low occurrence words. However in that case, rather than identifying each word by a word number, each word is identified by a combination of a group number and an intra-group number as described above.

FIG. 33 illustrates the configuration of the single-character intra-word position table, i.e table C, whose basic function has been described above referring to table 3 of FIG. 28C. However table C applies to both the high occurrence words and low occurrence words. As shown, a first section of the table relates to the character "a". Within that section, a first sub-section (i.e. set of entries) relates each of the extension words which has the character "a" as its second character, to either:

(a) the corresponding dictionary sequence high occurrence word number (if that extension word is a high occurrence word) or (b) the corresponding combination of a group number and intra-group number (if that extension word is a low occurrence word).

Thus, each entry point, to either a specific corresponding array of text position elements (in the case of a high occurrence word) or to one or more text position elements within the array of text position elements corresponding to the group number (in the case of a low occurrence word), in the text position table section.

A second sub-section of the first section of the Table C of FIG. 33 relates each of the extension words having "a" as the third character to a corresponding word number or group number/intra-group number combination. Respective sub-sections are similarly provided for each of successive character positions.

A second section of that table C relates to the character "b", in a similar manner to that described for the section relating to the character "a", and similar sections are similarly provided for each of the other characters which occur in the object text.

Figure 34:
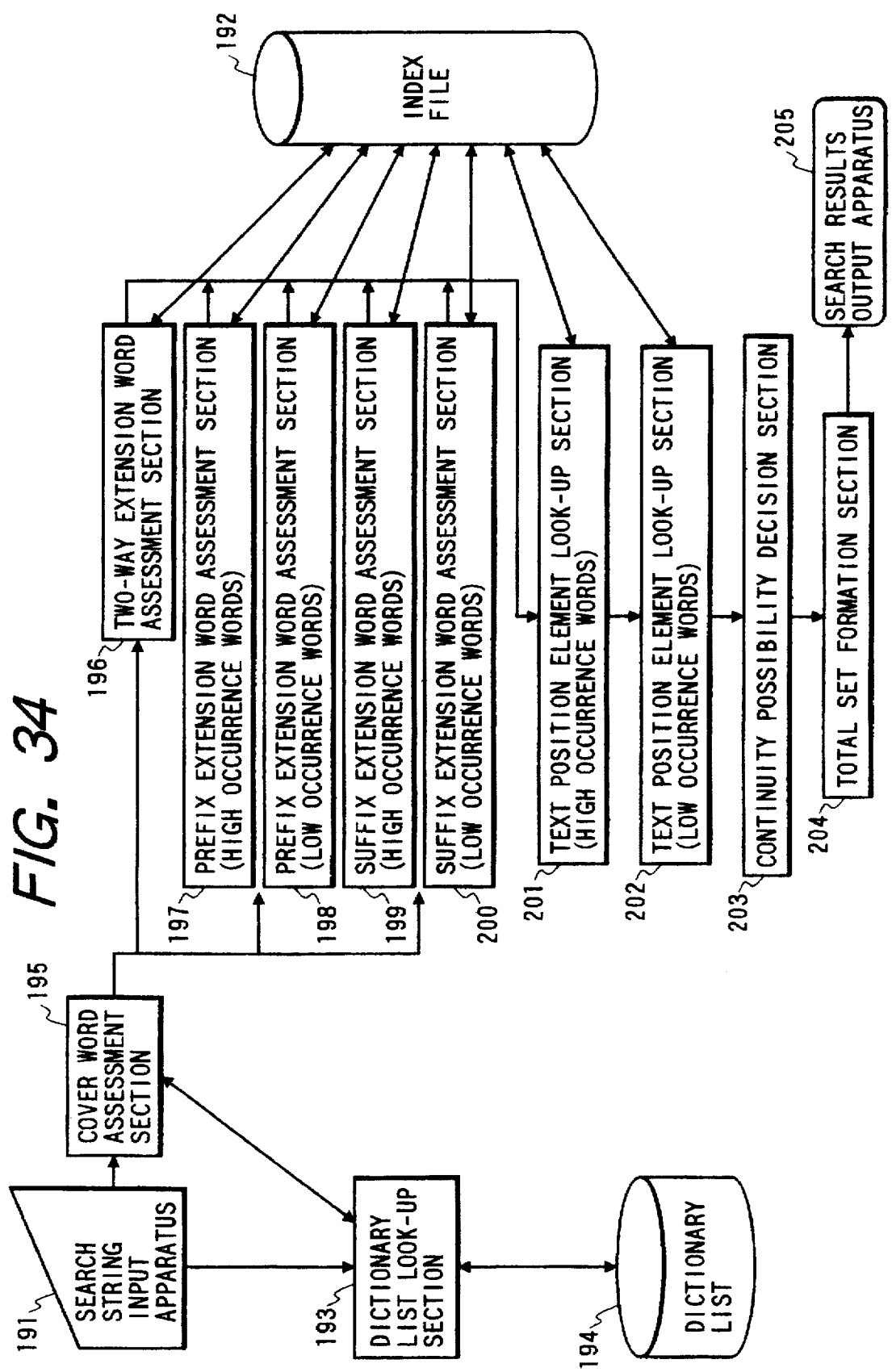
FIG. 34 is a general block diagram of the second embodiment of a text search apparatus according to the present invention.

FIG. 34 is a general system block diagram of the second text search apparatus embodiment. In FIG. 34, the functions of the search string input apparatus 191, dictionary list look-up section 193, dictionary list 194, cover word assessment section 195, continuity possibility decision section 203, and total set formation section 204 are substantially identical in function to the search string input apparatus 41, dictionary list look-up section 43, dictionary list 44, cover word assessment section 45, continuity possibility decision section 48, and total set formation section 49 respectively, of the first text search apparatus embodiment described above. However in this embodiment, the functions performed by the extension word assessment section 46 of the first text search apparatus embodiment, i.e. to obtain from the text position table section within the index file 192 the respective arrays of text position values of each of the extension words which have been found to contain the search string, are implemented in combination by a two-way extension word assessment section 196, a prefix extension word assessment section 197 (high occurrence words), a prefix extension word assessment section 198 (low occurrence words), a suffix extension word assessment section 199 (high occurrence words) and a suffix extension word assessment section 200 (low occurrence words). In addition, the functions of the text position element look-up section 47 of the first text search apparatus embodiment are implemented by a combination of a text position element look-up section 201 (high occurrence words) and a text position element look-up section 202 (high occurrence words).

The two-way extension word assessment section 196 serves to obtain (by using the extension word correspondence table section of the index file 192) the set of extension words which each contain the search string as a partial character string, other than as a prefix portion or suffix portion, and the respective intra-word position values of the search string with respect to each of these extension words. (Here, the term "search string" refers to the original search string, when section 196 is utilized during the primary search processing, and to one of the cover words, when section 196 is used during the secondary search processing). The prefix extension word assessment section 197 (high occurrence words) serves to obtain the set of high occurrence words in which the search string occurs as a prefix portion. The search string has an intra-word position value of 1, with respect to each of such extension words. The prefix extension word assessment section 198 (low occurrence words) serves to obtain the set of low occurrence words in which the search string occurs as a prefix portion. Similarly, the suffix extension word assessment section 199 (high occurrence words) serves to obtain the set of high occurrence words in which the search string occurs as a suffix portion. The suffix extension word assessment section 200 (low occurrence words) serves to obtain the set of low occurrence words in which the search string occurs as a suffix portion.

The text position element look-up section (high occurrence words) 201 serves to obtain from the text position table section of the index file 192 the array of text position elements which correspond to an extension word, when the extension word is a high occurrence word, while the text position element look-up section (low occurrence words) 202 serves to obtain from the text position table section of the index file 192 the array of text position elements which correspond to the group number of an extension word which is a low occurrence word, and to extract from that array (based on the intra-group number of the extension word) the text position elements which specify the positions of that extension word in the object text.

If the various intra-text positions of a set of cover words have been obtained in the preceding process, rather than those of the original search string, then the continuity possibility decision section determines those sequences of text position elements of extension words (corresponding to respective cover words) within which the search string occurs, to thereby obtain those positions at which the search string occurs within the text such as to extend between two or more sequentially occurring extension words.

The total set formation section 204 serves to operate on the text position information which has been obtained in the preceding operations, to obtain the complete array of values specifying successive positions of the search string within the text. In the case of position information obtained for the original search string, the total set formation section 204 applies the intra-word position of the search string within each of the extension words for which text position elements have been obtained, to thereby obtain respective positions of the search string within the text. In the case of position information obtained based on sequences of cover words, (i.e. during the secondary search processing) the total set formation section 204 applies the intra-word position of the leading cover word of each sequence within the corresponding extension word, and the position of the search string within each such leading cover word, to obtain respective positions of the search string within the text, in a similar manner to that described above for the first text search apparatus embodiment. All of the text position values thus obtained for the search string are sorted by the total set formation section 204 into an array of sequentially increasing values, which is supplied to the search results output apparatus 205.

Figure 35:
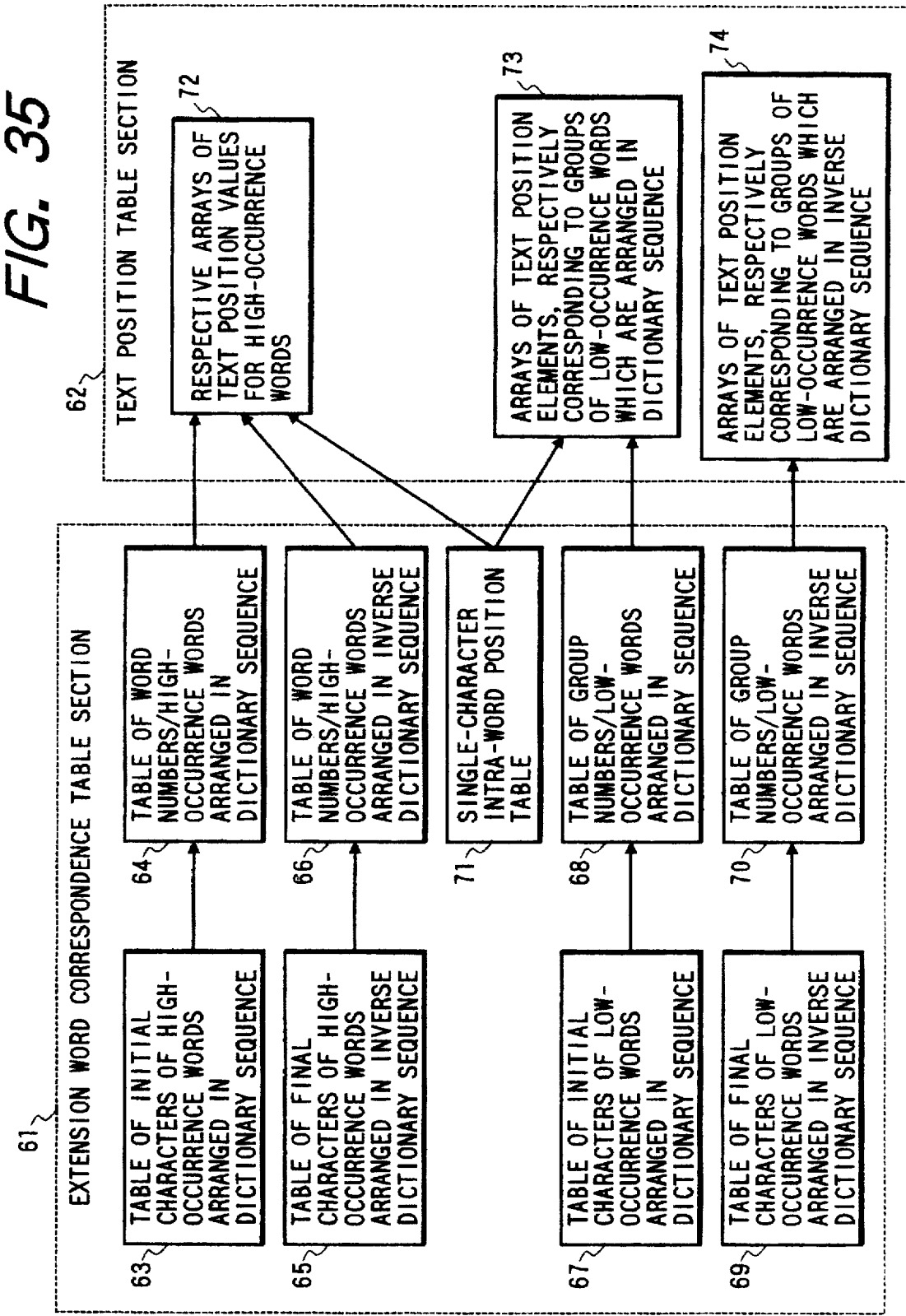
FIG. 35 is a general block diagram illustrating the configuration of the index file utilized in the second text search apparatus embodiment.

A specific example of such an index file, for use with the second embodiment of a text search apparatus, will be described in the following, referring first to the conceptual block diagram of the index file which is shown in FIG. 35. This consists of a text position table section 62, and an extension word correspondence table section 61, which respectively correspond in function to the sections 31 and 32 of the index file 42 of FIG. 7, described above.

In FIG. 35, the text position table section 62 consists of a text position table 72 of high occurrence words, a text position table 73 of dictionary sequence low occurrence words and a text position table 74 of inverse dictionary sequence low occurrence words. The table 72 is similar to the text position table of the first text search apparatus embodiment described above, i.e. being of the form of the table 300 shown in FIG. 29, but only contains text position value arrays corresponding to respective high occurrence words. The table 73 is of the form described above referring to FIG. 30, while the table 74 is of similar form, but contains entries for groups of low occurrence words arranged in inverse dictionary sequence.

The extension word correspondence table section 61 consists of a table 63 of initial characters of dictionary sequence high occurrence words, a table 64 of word numbers/dictionary sequence high occurrence words, table 65 of final characters of inverse dictionary sequence high occurrence words, a table 66 of word numbers/inverse dictionary sequence high occurrence words, a single-character intra-word position table 71, a table 67 of initial characters of dictionary sequence low occurrence words, a table 68 of group numbers/dictionary sequence low occurrence words, a table 69 of final characters of inverse dictionary sequence low occurrence words, and a table 70 of group numbers/inverse dictionary sequence low occurrence words. Information is transferred between these and between the extension word correspondence table section 61 and the text position table section 62 as indicated by the arrow lines in FIG. 35. The table 64 is basically of the form described above referring to FIG. 31, while the table 66 is basically of the form described above referring to FIG. 32. The table 68 of dictionary sequence low occurrence words and the table 70 of inverse dictionary sequence low occurrence words respectively perform similar functions for the low occurrence words to those performed for the high occurrence words by the tables 64 and 66. However instead of pointing to a specific array of text position values for one extension word, each entry in the table 68 points to one or more text position elements within an array of text position elements (in the text position table 73 of dictionary sequence low occurrence words), with that array corresponding to a specific group of low occurrence words that are arranged in dictionary sequence, as described above referring to FIG. 30. Similarly, each entry in the table 70 of inverse dictionary sequence low occurrence words points to one or more text position elements within an array of text position elements (in the text position table 74 of inverse dictionary sequence low occurrence words) with that array corresponding to a specific group of low occurrence words that are arranged in inverse dictionary sequence.

The single-character intra-word position table 71 is basically of the form described above referring to FIG. 33. If a result obtained by searching in table 71 represents a high occurrence word, then that result points to one of the arrays of text position values in the text position table 72 of high occurrence words. If a result represents a low occurrence word, then as described above referring to FIG. 30, the effect is to point to one or more text position elements within an array of text position elements in the text position table 73 of dictionary sequence low occurrence words (i.e. the array which corresponds to the group to which the low occurrence word belongs).

Each high occurrence word is identified by a dictionary sequence high occurrence word number and an inverse dictionary sequence high occurrence word number, respectively specified in the table 64 of dictionary sequence high occurrence words and the table 66 of inverse dictionary sequence high occurrence words. Similarly, each low occurrence word is identified by a dictionary sequence low occurrence word number and an inverse dictionary sequence low occurrence word number, respectively specified in the table 68 of dictionary sequence low occurrence words and the table 70 of inverse dictionary sequence low occurrence words.

FIGS. 44A, 44B show a specific example of the single-character intra-word position table 71. As shown, this consists of a set of sections which relate to the respective characters which occur in the object text, with each section consisting of one or more sub-sections, i.e. a sub-section listing the extension words which have the corresponding character as the second character, a sub-section listing the extension words which have the corresponding character as the third character, and so on, up to the longest extension word which has that character at the position immediately before the final character position, as described above referring to FIG. 28C and FIG. 33. Each entry in the table consists of a character, an intra-word position value of the character, an extension word which contains the character at that position, and the dictionary sequence high occurrence word number of that word (if it is a high occurrence word) or the combination of (group number, intra-group number) if the word is a low occurrence word.

FIG. 45 shows a specific example of the text position table 72 of high occurrence words. As shown, each entry consists of a dictionary sequence high occurrence word number, the corresponding extension word, and an array of the respective text position values for that extension word within the table 72. Each entry in the table 72 can thus be referenced from the extension word correspondence table section 61 by means of the corresponding dictionary sequence high occurrence word number. The entries are arranged in dictionary sequence, with the word numbers successively increasing in magnitude.

FIG. 37 shows an example of the table 64 of dictionary sequence high occurrence words, corresponding to the text position table 72 of FIG. 45. As shown, each high occurrence word is linked to a corresponding dictionary sequence high occurrence word number. FIGS. 39A, 39B show the corresponding example of the table 66 of inverse dictionary sequence high occurrence words, in which each high occurrence word is linked to the corresponding inverse dictionary sequence high occurrence word number and also to the corresponding dictionary sequence high occurrence word number. For example, in the table 64, the high occurrence word "bloc" has the dictionary sequence high occurrence word number 17. In the table 66, that same word has the the inverse dictionary sequence high occurrence word number 12. However as shown in the right-side column in FIGS. 39A, 39B the word "bloc" is also identified in table 66 by its serial number within the table 64, i.e. the dictionary sequence high occurrence word number 17. Hence, each entry in the table 66 points to a corresponding entry in the text position table 72.

In the extension word correspondence table section 61 shown in FIG. 35, the table 63 of initial characters of dictionary sequence high occurrence words is a table in which characters which occur in the object text are arranged in dictionary sequence, each character being coupled with the dictionary sequence high occurrence word number of the first extension word of the set of extension words (in Table 64) which begin with that character. An example of the table 63 of initial characters of dictionary sequence high occurrence words is shown in FIG. 36. Here, for example, the first of the set of extension words which begin with the character "b" has the dictionary sequence high occurrence word number 13. The first word of the set of extension words which begin with the next character in the dictionary sequence, (i.e. the word "can") has the dictionary sequence high occurrence word number 20. Thus by searching the table 63 of initial characters of dictionary sequence high occurrence words, it is found that the set of high-occurrence extension words which begin with the character "b" have the range of dictionary sequence high occurrence word numbers 13 to 19.

It can be understood that the table 63 can be utilized to rapidly find, for a specific search string, a range of dictionary sequence high occurrence word numbers in table 64 which must be examined, i.e. the range of high occurrence words which begin with the same character as does the search string. Hence, the search speed can be substantially increased by looking up the table 63 before looking up the table 64, since it becomes unnecessary to search all of the entries in the table 64 when obtaining the high occurrence words which are prefix extension words of the search string.

In the extension word correspondence table section 61, as shown by the example of FIG. 38, the table 65 of final characters of inverse dictionary sequence high occurrence words is a table in which characters which occur in the object text are arranged in dictionary sequence, each character being coupled with the inverse dictionary sequence high occurrence word number of the first extension word (in Table 66) of the set of high occurrence words which each end with that character. For example, in the table 66 of high occurrence words listed in inverse dictionary sequence, the first of the set of extension words which ends with the character "m", i.e. "cm", has the inverse dictionary sequence high occurrence word number 62. The first word of the set of extension words which begin with the next character in the inverse dictionary sequence, i.e. "n", has the inverse dictionary sequence high occurrence word number 66. That information is provided by the table 65, i.e. by searching the table 65, it is found that the set of high-occurrence extension words which end with the character "m" have the range of inverse dictionary sequence high occurrence word numbers 62 to 66 in the table 66.

It can thus be understood that, similarly to the table 63 described above, the table 65 can be utilized to rapidly find, for a specified search string, the range of inverse dictionary sequence high occurrence word numbers whose respective words must be examined, to obtain the high occurrence words which are suffix extension words of the search string.

Examples of the text position tables 73 and 74 of the text position table section 62 (of FIG. 35) are shown in FIGS. 46 and 47 respectively. The table 73 is basically of the form shown in FIG. 30 and described hereinabove. As can be understood from the preceding description of FIG. 35, the function of the table 73 is to provide all of the text position values of each low occurrence word which is a prefix extension word (as specified from table 68) or a two-way extension word (as specified from table 71) of the search string. The function of the table 74 is to provide all of the text position values of each low occurrence word which is a suffix extension word of the search string.

In the table 73, each entry in the table relates a group number (of a group of low occurrence words in the table 68) to the word number (more specifically, the dictionary sequence low occurrence word number) of the initial word of that group, and to the array of text position elements which are keyed to the words of that group. Each text position element is expressed by a combination of a number which identifies a low occurrence word (i.e. the intra-group position number which specifies the sequence position of that word within the group) and a text position value of that word. Each array thus specifies the successive positions at which the various members of the group occur within the text. FIG. 46 shows a partial example of table 73, in which "word number" signifies the dictionary sequence low occurrence word numbers that are specified by table 68. The table 73 shows for example that the words of group 2 occur in the object text as follows. The first position at which the fourth word of the group occurs within the object text is the 69th character position of the text, as indicated by the sequence position of the element (4, 69) within the array of text position elements for group 2. Similarly, the final position at which the first word in the group appears within the object text is at character position 981 of the text, as indicated by the position of the element (1, 981) within the array of text position elements for group 2.

Thus, if the (group number/intra-group number) of a low occurrence word is specified, then it becomes possible to find each of the successive positions at which that word occurs throughout the object text, without the need to perform array merging or sorting operations. Even if the low occurrence words which each contain the search string should occur within more than one group, the number of necessary merge/sort operations can be substantially reduced.

FIG. 47 shows an example of the text position table 74 of inverse dictionary sequence low occurrence words, in the text position table section 62 of FIG. 35. In this example, each entry in the table consists of a group number corresponding to a group of low occurrence words which are listed in the table 70 of inverse dictionary sequence low occurrence words, the number of the initial word of the group (that number being an inverse dictionary sequence low occurrence word number, specified from table 69), that initial word, and the array of text position elements for the group. In that array, the extension words are represented by their respective intra-group numbers, i.e. each text position element is expressed as a combination of the intra-group number of a low occurrence word and the text position value of that word. For example FIG. 47 shows that the words of group 7 appear within the object text as follows. The first position at which the second word of the group occurs within the object text (i.e. occurs as an extension word) is the 31st character position of the text, as indicated by the sequence position of the element (2, 31) within the array of text position elements for group 7. Similarly, the final position where the ninth word in the group occurs in the text is at character position 962, as indicated by the sequence position of element (9,962) within the array of text position elements for group 7.

Within the table 68 of dictionary sequence low occurrence words (in the extension word correspondence table section 61 of FIG. 35), the low occurrence words are listed in dictionary sequence, and respectively assigned the aforementioned dictionary sequence low occurrence word numbers. FIG. 41 shows a partial example of the table 68, corresponding to the example of the text position table 73 of dictionary sequence low occurrence words described above. As shown, each entry in the table 68 consists of a dictionary sequence low occurrence word number, the corresponding low occurrence word, and the number of the group to which the word is assigned. Although the intra-group numbers are shown in FIG. 41, this is only for ease of understanding, since in practice the intra-group number of any low occurrence word can easily be calculated by the system, based on the difference between the dictionary sequence low occurrence word number of the word and the dictionary sequence low occurrence word number of the first word of the corresponding group.

The table 70 of inverse dictionary sequence low occurrence words contains the same set of low occurrence words as the table 68, but arranged in inverse dictionary sequence, these being assigned sequential numbers, i.e. the aforementioned inverse dictionary sequence low occurrence word numbers. FIG. 43 shows an example of the table 70, corresponding to the example of the text position table 74 described above. As shown, each entry in the table 70 consists of an inverse dictionary sequence low occurrence word number, the corresponding low occurrence word, and the number of the group to which that word is assigned. In FIG. 43, for example, the low occurrence word "appeal" has the inverse dictionary sequence low occurrence word number 65, is assigned to group 6, and has the intra-group number 7, i.e. is identified as the word (6, 7), with respect to the groups of table 70.

In the extension word correspondence table section 61, the table 67 of initial characters of dictionary sequence low occurrence words is a table in which the characters which occur in the object text are listed in dictionary sequence, each character being coupled with the dictionary sequence low occurrence word number of the first word (in Table 68) of the set of low occurrence words which each begin with that character. FIG. 40 shows a specific example of the table 67. For example, in the table 67, the first of the set of extension words which begin with the character "p" (i.e. "panic") has the dictionary sequence low occurrence word number 63. The first word of the set of low occurrence words (in table 68) which begin with the next character in the dictionary sequence, "q", (i.e. "quadratic") has the dictionary sequence low occurrence word number 68. Thus by accessing the table 67 it can be found that the set of low-occurrence extension words in the table 68 which begin with the character "p" have the range of dictionary sequence low occurrence word numbers from 63 to 67.

Thus, by utilizing table 67, a high speed of table look-up operations can be achieved when locating low-occurrence words within table 68 which have the search string as a prefix portion, for the same reasons as described above for tables 63, 64.

Also in the extension word correspondence table section 61, the table 69 of final characters of inverse dictionary sequence low occurrence words is a table in which the characters which occur in the object text are arranged in inverse dictionary sequence, each character being coupled with the inverse dictionary sequence low occurrence word number of the first extension word (in the table 70) of the set of low occurrence words which end with that character. FIG. 42 shows a specific example of the table 69. For example, in the example of the table 70 shown in FIG. 43, the first of the set of low occurrence words which ends with the character "l" in table 70 i.e. "appeal" has the inverse dictionary sequence low occurrence word number 65. The first of the set of low occurrence words which end with the next character in the dictionary sequence, i.e. "m", (the word "gram") has the inverse dictionary sequence low occurrence word number 71. That information is provided by the table 69, i.e. by accessing the table 69 it can be found that the set of low-occurrence extension words in Table 70 which end with the character "l' have the range of inverse dictionary sequence low occurrence word numbers from 65 to 70.

Thus, by utilizing table 69, a high speed of table look-up operations can be achieved when locating low-occurrence words within table 70 which each have the search string as a suffix portion.

It can be understood from the above description that a text search apparatus which utilizes the index file of the second embodiment, will enable each of the functions described for the first text search apparatus embodiment to be performed, while eliminating the need to store all of the partial character strings of the extension words. That is to say, by executing simple table look-up operations on the tables of the extension word correspondence table section 61, it becomes possible to rapidly find all of the extension words (each keyed to one or more text position elements) within which a search string occurs as a partial character string, together with all of the intra-word position values Of the search string within these extension words.

As a result, the data storage capacity requirements are substantially reduced, so that the second embodiment is suitable for searching in large-volume texts. As with the first embodiment, the second text search apparatus embodiment enables all of the positions of occurrence to be found for any arbitrary character string which occurs in the object text, with no possibility of a search failure, even if the search string does not appear in the dictionary list.

Moreover, if the search string occurs only within extension words which occur relatively infrequently within the object text (i.e. low occurrence words), then the operations of merging and sorting of these text position elements can be substantially reduced by comparison with the first embodiment, leading to a further increase in search speed.

Figure 48A:
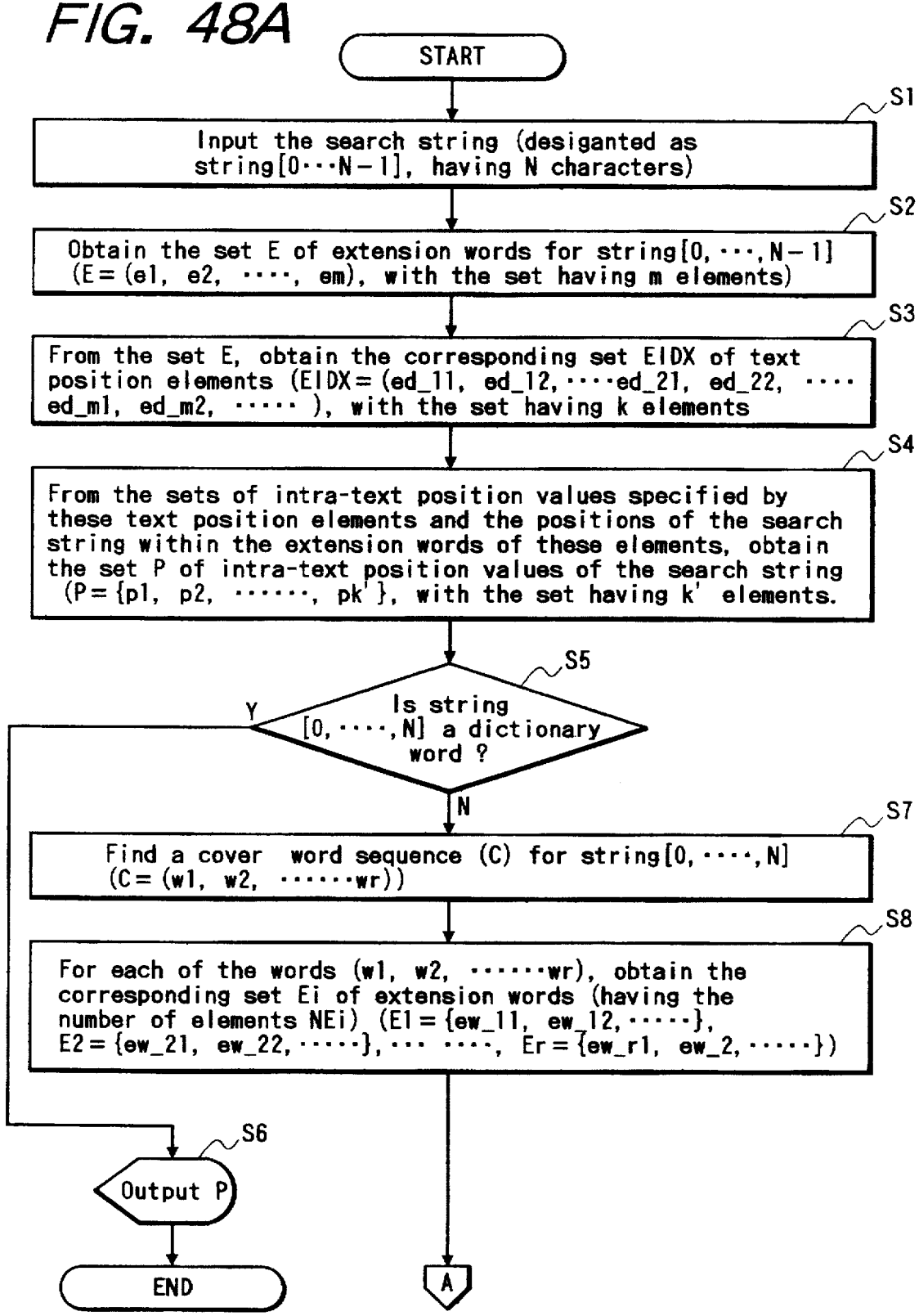
FIGS. 48A, 48B constitute a flow diagram of an algorithm executed by the second text search apparatus embodiment to perform a text search.
Figure 48B:
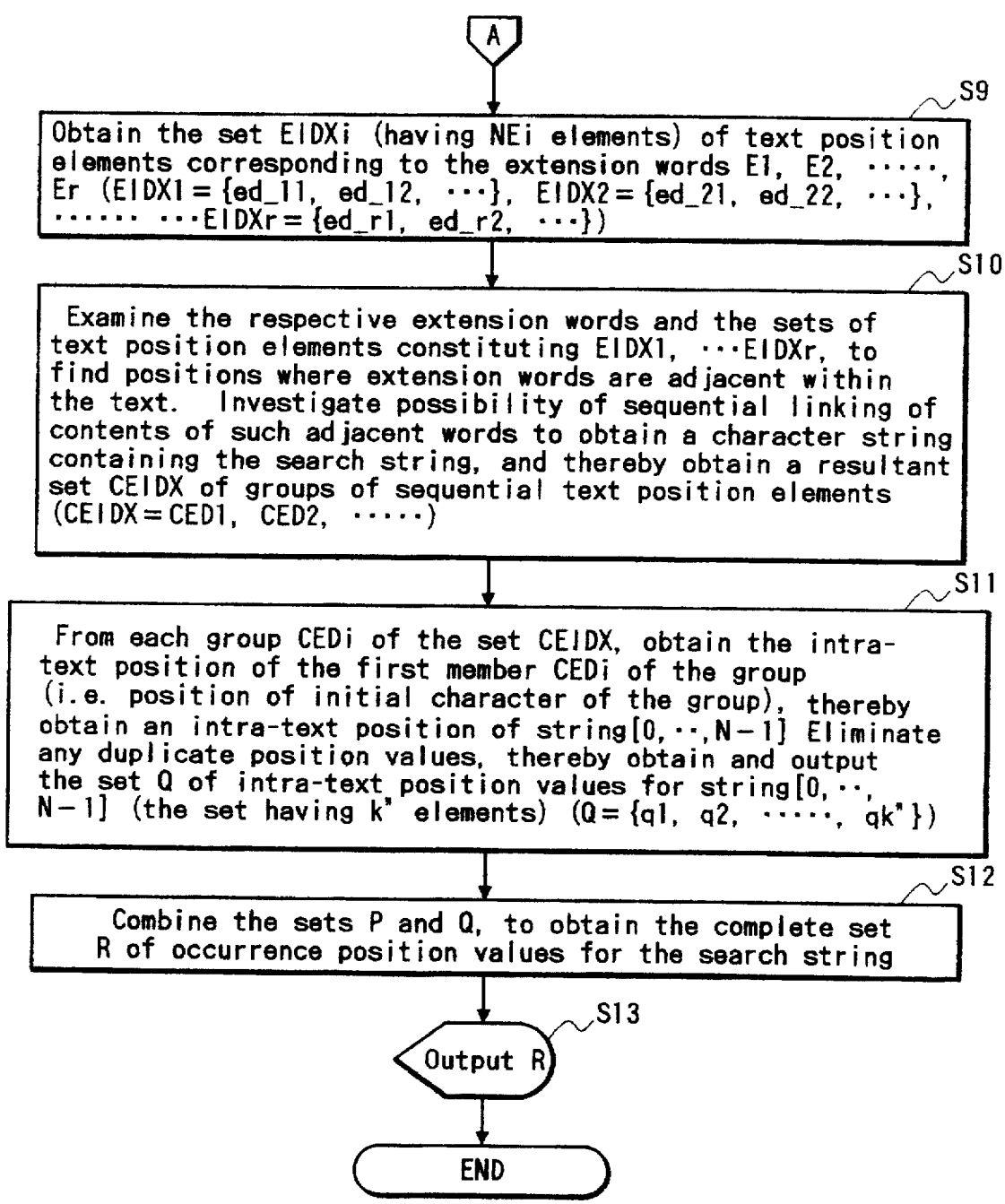

The processing executed by the second text search apparatus embodiment during a search operation is shown in the flow diagram of FIGS. 48A, 48B. The basic functions performed by the steps in that diagram are identical to those of FIGS. 14A, 14B of the first text search apparatus embodiment. However the contents of various steps in the flow diagram of FIGS. 48A, 48B differ from those of the corresponding steps in FIGS. 14A, 14B, due to the differences between the index file of the second embodiment and that of the first embodiment. The respective steps of the flow diagram of FIGS. 48A, 48B will be described in the following.

Figure 49:
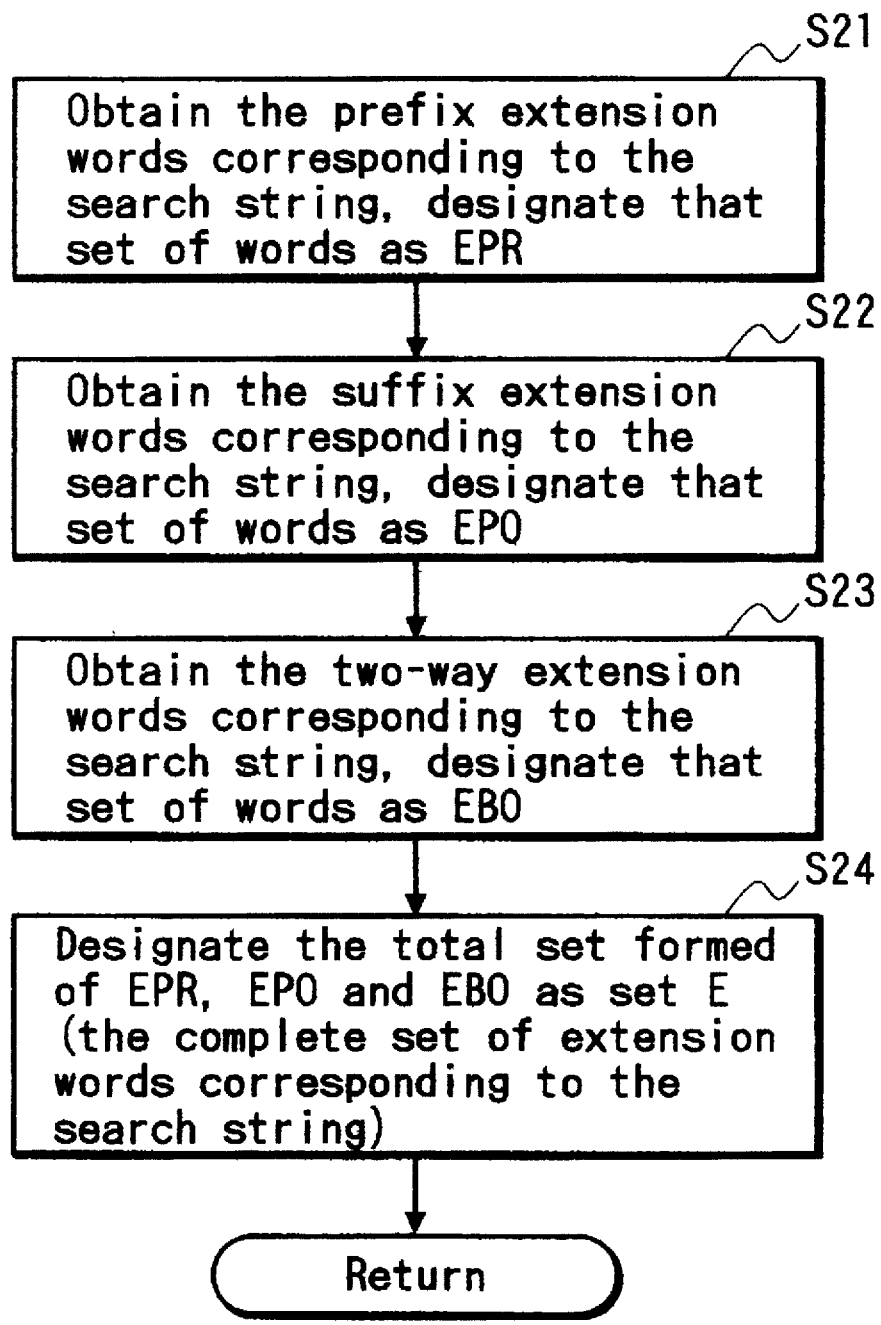
FIG. 49 is a flow diagram showing the contents of a second step in the flow diagram of FIGS. 48A, 48B.

Referring first to FIG. 49, the contents of step S2 in FIGS. 48A, 48B are shown, as a series of four successive steps S21 to S24. In step S21, the set EPR of prefix extension words corresponding to the search string is obtained, in step S22, the set EPO of suffix extension words corresponding to the search string is obtained, and in step S22 the set of two-way extension words EBO corresponding to the search string is obtained. These are combined into a total set E of all of the extension words which contain the search string as a partial character string. That set of words may of course include the search string itself.

Figure 50:
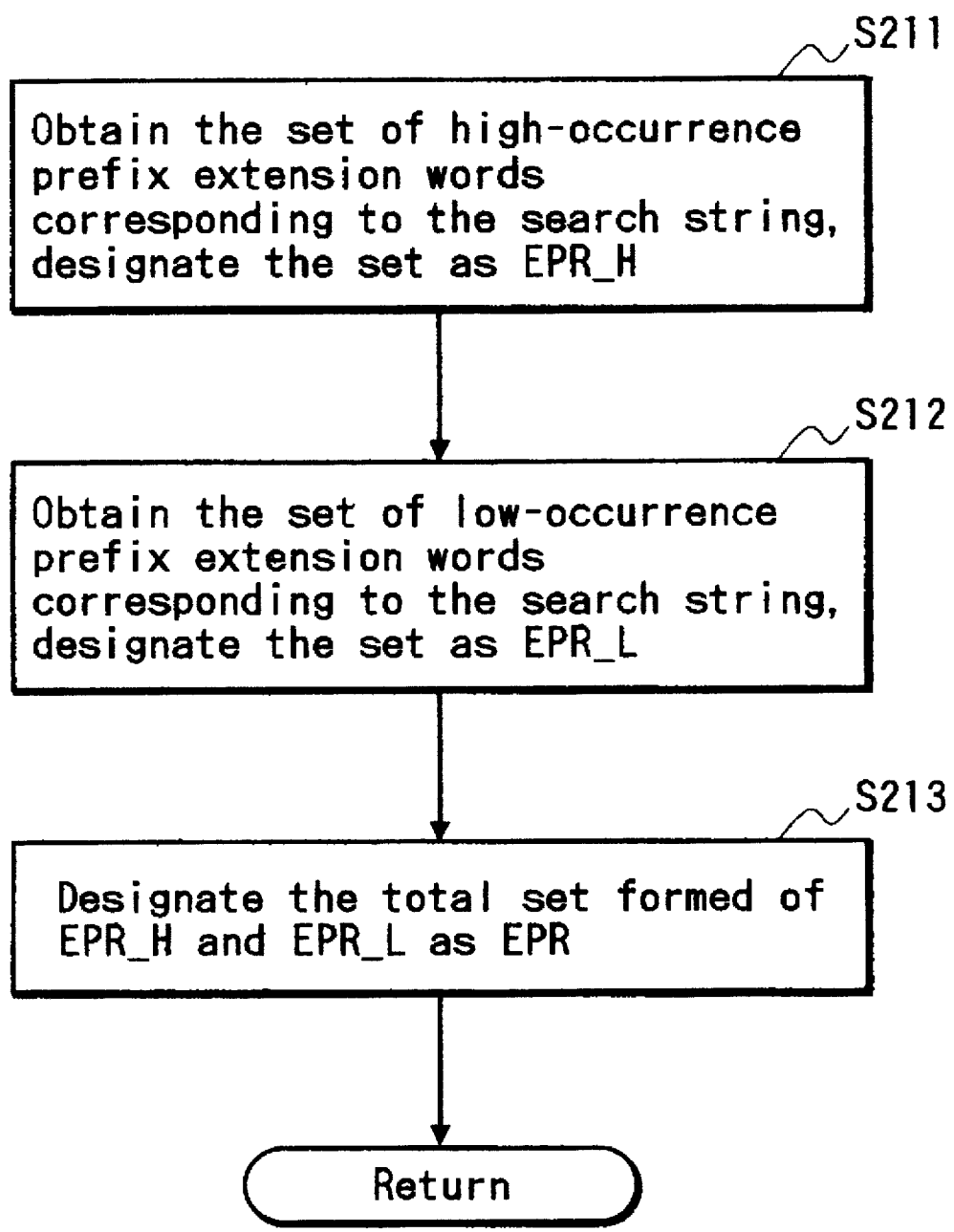
FIG. 50 is a flow diagram showing the contents of a first step in the flow diagram of FIG. 49, executed to obtain all of the extension words having the search string as a prefix portion.

FIG. 50 shows the contents of step S21 in FIG. 49, as three successive steps S211 to S213. First in step S211 the prefix extension word assessment section (high occurrence words) 197 of the text search apparatus obtains the set of high occurrence words which are prefix extension words of the search string, then in step S212 the prefix extension word assessment section (low occurrence words) 198 obtains the set of low occurrence words which are prefix extension words of the search string, and in step S213 the two sets thus obtained are combined as the total set EPR of prefix extension words.

There are various possible methods of obtaining the sets of words EPR-H and EPR-L of FIG. 50. To obtain the set EPR-H, for example, an algorithm could be used whereby successive high occurrence words listed in the table 64 of dictionary sequence high occurrence words are sequentially examined (starting from the first word which has the same initial character as that of the search string) to find the first high occurrence word which is a prefix extension word of the search string, then further searching is executed to find the first subsequent word (in the dictionary sequence) which is not a prefix extension word of the search string. The range of high occurrence words which are prefix extension words of the search string, i.e. the set EPR_H, could thereby obtained.

However performing such sequential table look-up operations is an obstacle to achieving a high search speed. For that reason, the extension word assessment sections 197, 198, 199 and 200 of this embodiment of the text search apparatus preferably each execute an algorithm such as that shown in the flow diagram of FIGS. 52A, 52B, which is executed by the prefix extension word assessment section 197 (high occurrence words) to very rapidly obtain the dictionary sequence high occurrence word numbers of the set EPR_H of high occurrence words which are prefix extension words of the search string.

Such a procedure can be easily implemented as a program routine which operates on arrays of elements. For that reason, the search string is expressed as an array of N elements, representing successive characters of the string, and is designated as string[0, ... N-i], with individual characters of the string being designated as string[0], ... string [N-i] respectively. The dictionary sequence high occurrence word number of the first word in a range of prefix extension words (in table 64) will be is assigned as the first value of a variable WNS.

The basic principles of the algorithm shown in FIGS. 52A, 52B will be described referring to FIG. 51. This shows a portion of an example of the table 64 of high occurrence words listed in dictionary sequence, specifically, the range of high occurrence words which each begin with "c" in the example. It will be assumed that the search string is "ch". It is thus necessary to find each of the high occurrence words which begin with "ch", i.e. the prefix extension words of "ch". Firstly, the high occurrence word numbers of the range of words in table 64 which begin with "c" is obtained, from the table 63 of initial characters of dictionary sequence high occurrence words. These numbers define the range A shown in FIG. 51. It is then necessary to locate, within that range A, the range of words which begin with "ch", that being indicated as range B in FIG. 51. In this case the initial value of the variable WNS will be 95, while that of a variable WNE is assigned as the high occurrence word number of the first word which follows range A, in the dictionary sequence, i.e. the number 204 in this example. Firstly, the number of the word which is approximately midway between WNS and WNE (rounded down to the nearest integer value, if necessary) is obtained, i.e. 149, and assigned as the first value of a variable which is called pivot1. The corresponding word is then examined, to find if it is a prefix extension word of the search string, and if so, whether it is the first prefix extension word of the search string (in the dictionary sequence) in table 64. If it is neither of these, then a judgement is made as to whether the current value of pivot1 is located before or after the search string, in the dictionary sequence. Based on that judgement, the value of pivot1 is updated, and the above operations repeated.

Cyclic repetitions of these operations will rapidly converge to obtain the high occurrence word number of the first extension word (in table 64) which begins with the search string. The position within table 64 of the first word of range B in FIG. 51 can thereby be quickly obtained.

The position of the first word (in the dictionary sequence) which follows range B can be similarly obtained. This is done by changing the final character of the search string to the next character in the dictionary sequence, assigning that to a string variable which is called pivot', and then performing similar operations to those described above to find the first word in table 64 which is a prefix extension word of pivot'. In the example of FIG. 51, assuming the search string is "ch", pivot' would be established as "ci", whose first prefix extension word is "cinder".

However it would of course be equally possible to use variations of the above processing. The essential point is that it is made unnecessary to sequentially search through the words which have the same initial character as the search string (and which may consist of a large number of words), in order to locate the range of words in table 64 which are prefix extension words of the search string.

Figure 52A:
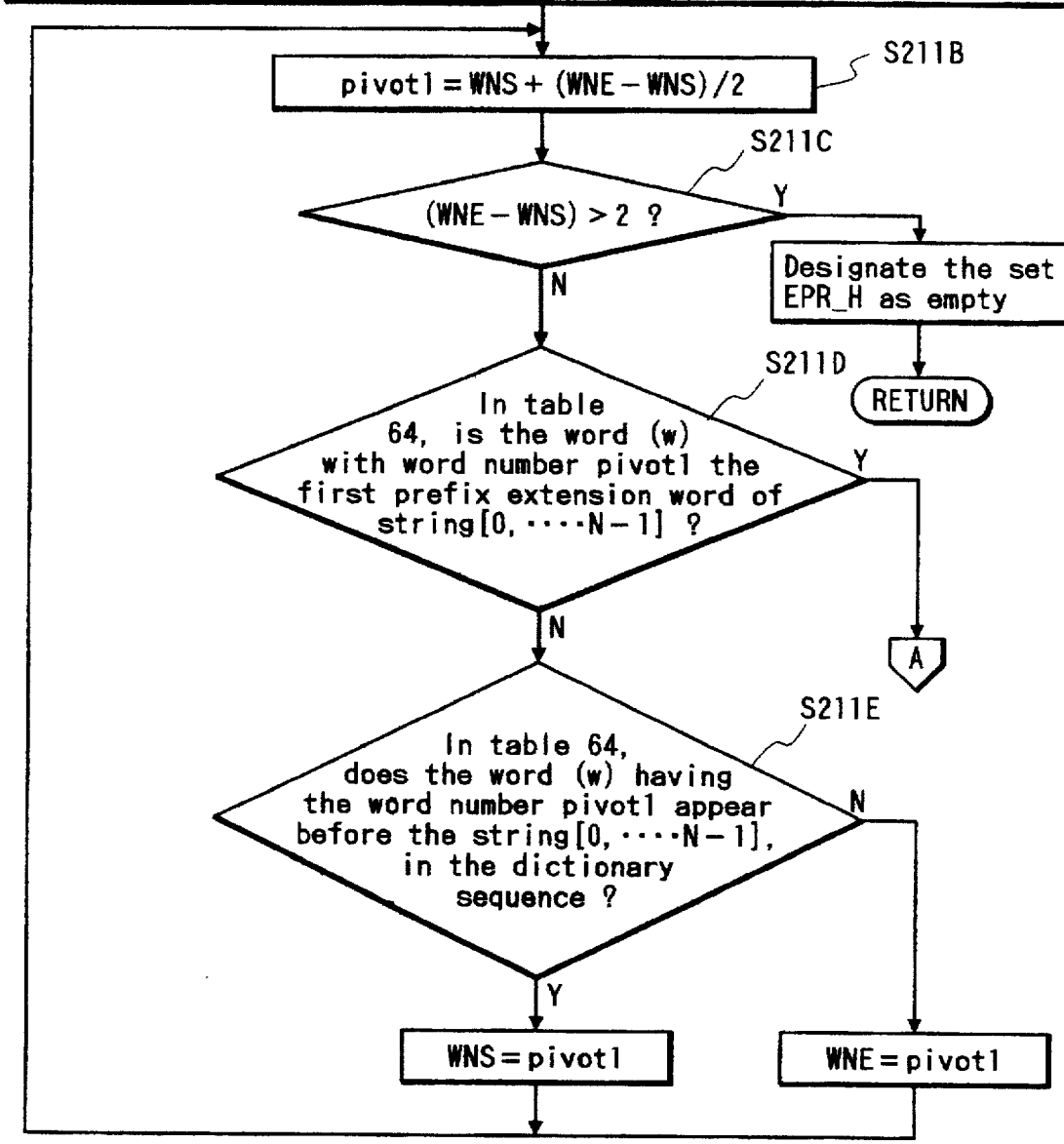

The operation shown in FIG. 52A is as follows. In a first step S211A, the table 63 is searched to obtain the range of dictionary sequence high occurrence word numbers of the set of high occurrence words which each begin with the same initial character as the search string, and the first of these numbers is designated as the initial value of WNS. The word number of the first word of the set of high occurrence words which each begin with the next character (in the dictionary sequence) after the initial character of the search string, is then obtained from table 63, and assigned as the initial value of the variable WNE. In addition, string' is assigned as the character string is obtained which is produced by changing the final character of the search string to the next character in the dictionary sequence.

The word number which is midway between WNS and WNE (rounded down to the nearest integer value, if necessary) is then obtained in step S211B, and is assigned as the initial value of pivot1.

In step S211C, a decision is made as to whether it has been found that there is no prefix extension word of the search string in table 64, i.e. if the set EPR_H is empty.

If it is not, decision step S211D is then executed to judge whether the high occurrence word having the word number pivot1 is the first prefix extension word of the search string, within the list of high occurrence words in table 64. If it is, then further steps (shown in FIG. 52B) are executed to find the word number of string'.

If it is found in step S211D that the word having the word number pivot1 is not the first high occurrence word that is a prefix extension word of the search string, then a decision step S211E is executed, to find whether the word having the word number pivot1 appears before the search string in the dictionary sequence. If the decision is "yes", then the value of WNS is changed to that of pivot1, otherwise the value of WNE is changed to that of pivot1, and then step S211B is repeated. This has the result of setting the new value of pivot1 to the approximate midpoint of either the upper half or the lower half of the previous search range (WNS-WNE).

Finally, either the value of pivot1 becomes that of the dictionary sequence high occurrence word number of the search string itself (i.e. if the search string is classified as one of the high occurrence words), or a condition is reached at which WNS is the word number of the word which immediately precedes (in the dictionary sequence of table 64) the first high occurrence word that is a prefix extension word of the search string, while pivot1 has attained the value of the word number of that first word which is a prefix extension word of the search string. In either case, a "yes" decision is reached in step S211D.

Figure 53:
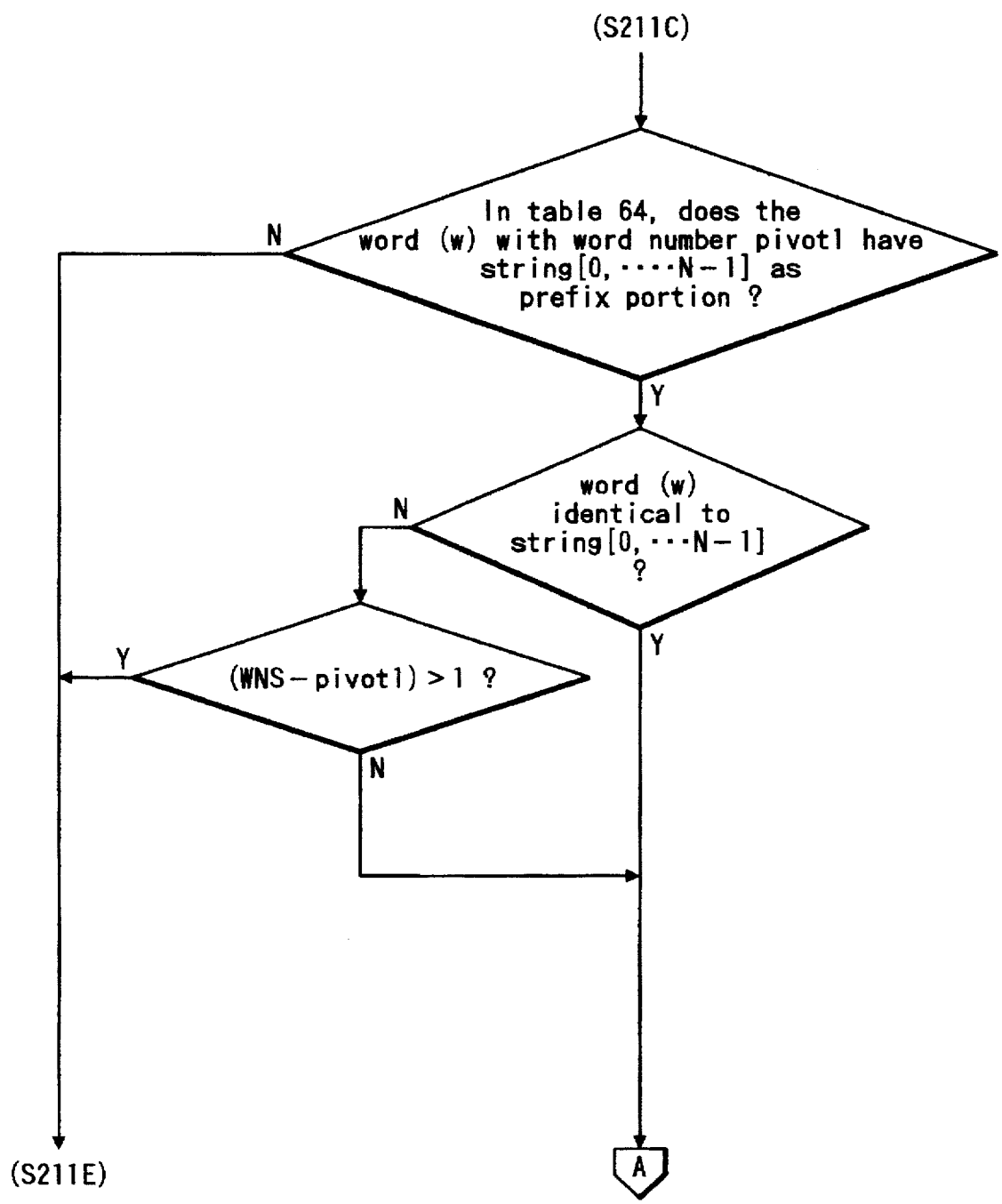
FIG. 53 is a flow diagram showing the contents of a step in the flow diagram of FIGS. 52A, 52B, for detecting whether a specific word is the first of a set of listed high occurrence words which each begin with the search string.

The contents of step S211D are shown in FIG. 53. First a decision is made as to whether the word which has the word number specified by pivot1 is a prefix extension word of the search string. Specifically, a decision is made as to whether that word contains at least N characters, and if so, as to whether the first N characters of that word are identical to those of the search string. If the answer to both of these decision is "yes", then a decision is made that the word whose word number is specified by pivot1 is the search string itself. If the answer is "no", then a decision is made as to whether the difference between the current values of WNS and pivot1 is greater than 1. If it is, then this indicates that the word, although it is a prefix extension word of the search string, is not the first prefix extension word, and operation then proceeds to step S211E.

Similar operations to those shown in FIG. 52A are executed in the flow diagram portion of FIG. 52B, to find the first high occurrence word which has string' as a prefix portion, i.e. to find the first high occurrence word following the range of high occurrence words (in table 64) which are prefix extension words of the search string. In this case the value of a variable called pivot2 is successively changed until it becomes equal to the word number of the first high occurrence word (in the dictionary sequence) which is a prefix extension word of string'.

The range of word numbers in table 64, of high occurrence words which are prefix extension words of the search string, is thereby obtained as {pivot1–(pivot2–1)}, in the final step in FIG. 52B.

Such a method of table look-up enables the search speed of the apparatus to be enhanced, by comparison with a simple sequential table look-up method.

Figure 54A:
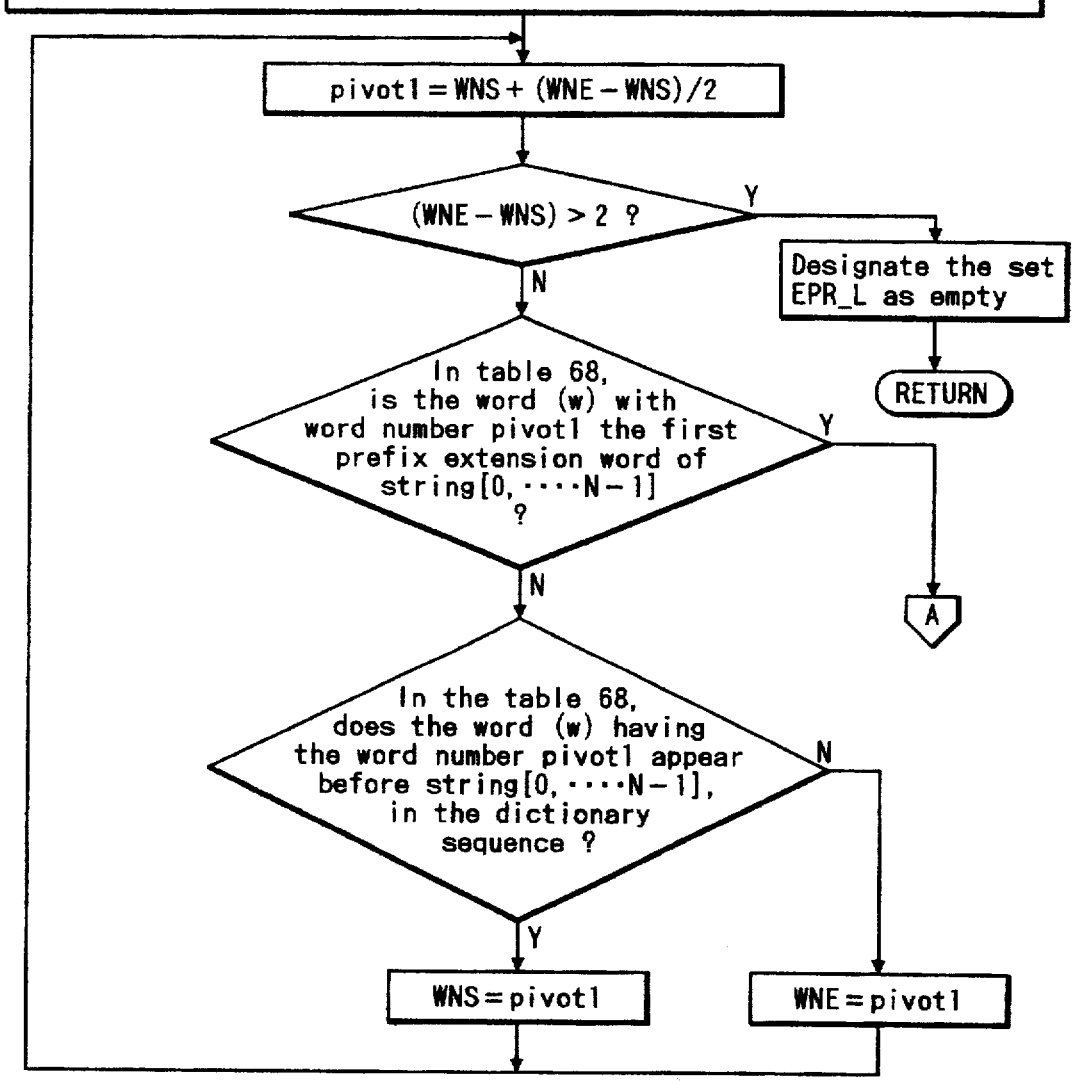
FIGS. 54A, 54B constitute a flow diagram of an algorithm for locating a set of low occurrence words which each have the search string as a prefix portion.
Figure 54B:
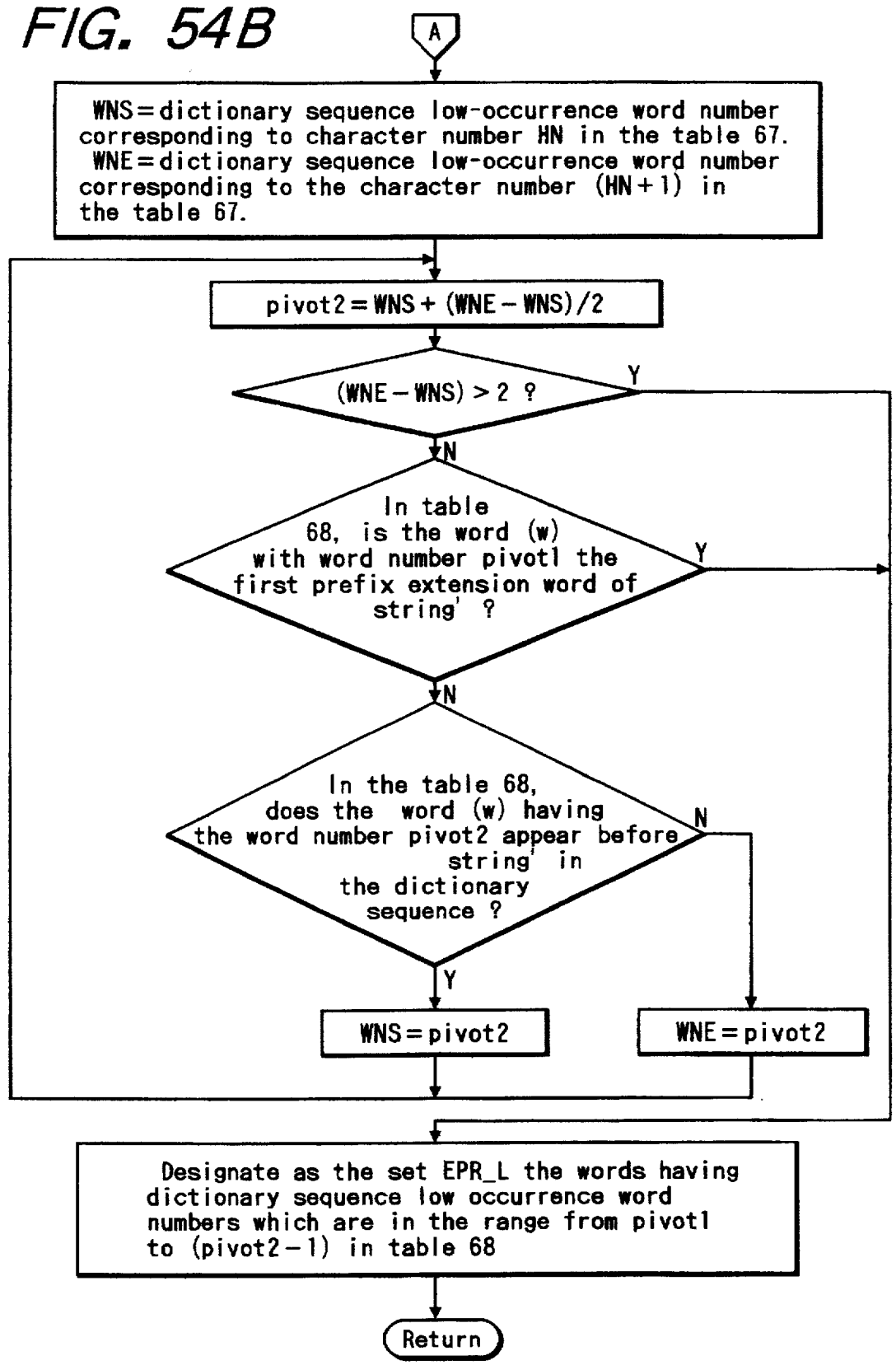

FIGS. 54A, 54B show the flow diagram of the algorithm corresponding to that of FIGS. 52A, 52B, executed by the prefix extension word assessment section 198 (low occurrence words) for obtaining the dictionary sequence low occurrence word numbers of the set of words EPR-L which are prefix extension words of the search string, i.e. the contents of step S212 in FIG. 50. The operation is similar to that described for FIGS. 52A, 52B.

FIG. 55 shows the contents of step S22 in FIG. 49, consisting of the successive steps S221, S222 and S223, for obtaining the complete set EPO of suffix extension words of the search string.

Figure 56A:
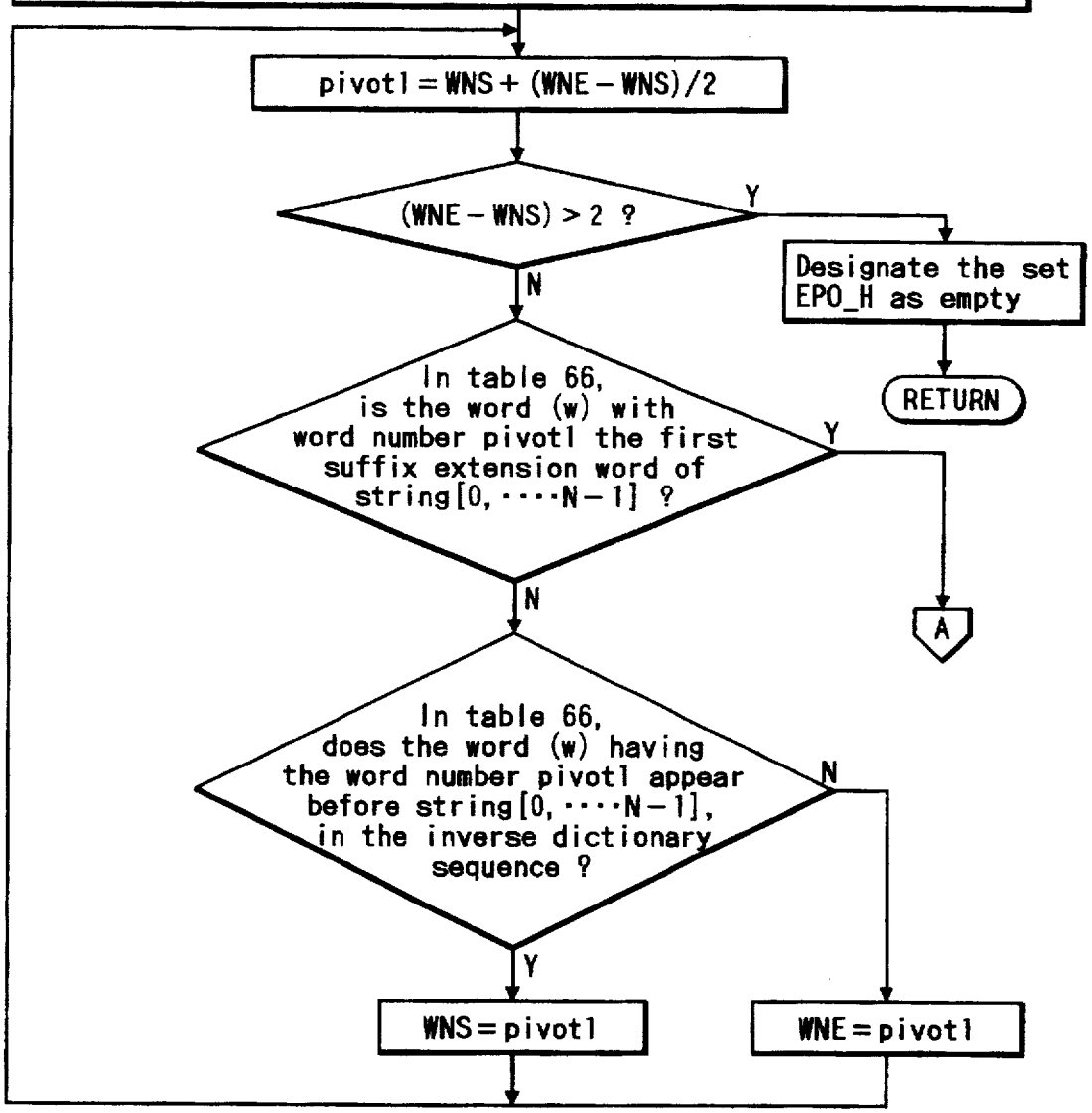
FIGS. 56A, 56B constitute a flow diagram of an algorithm for locating a set of high occurrence words which each have the search string as a suffix portion.
Figure 56B:
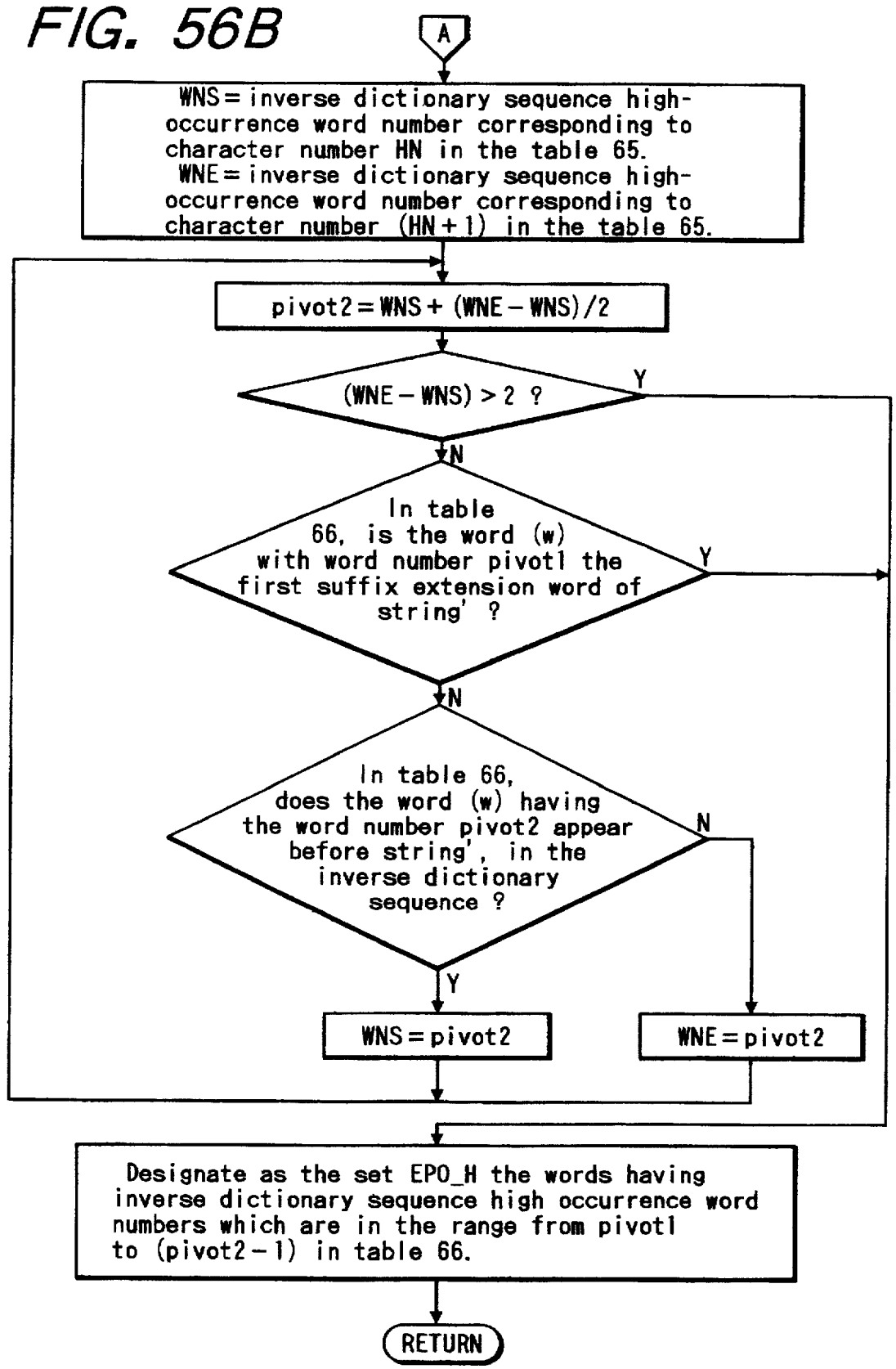

FIGS. 56A, 56B constitute a flow diagram of the contents of step S221 in FIG. 55, i.e. an algorithm which is executed by the suffix extension word assessment section 198 for obtaining the set of high occurrence words EPO-H which are suffix extension words of the search string, by utilizing the table 65 of final characters of inverse dictionary sequence high occurrence words and the table 66 of high occurrence words in inverse dictionary sequence. The operations are similar to those of the flow diagram of FIGS. 52A, 52B. However in this case, the initial value of the variable WNS is set as the inverse dictionary sequence high occurrence word number (in table 66) corresponding to the inverse dictionary sequence final character number HN (obtained from table 65) of the final character of the search string. The initial value of WNE is set as the inverse dictionary sequence high occurrence word number corresponding to the next inverse dictionary sequence final character number after HN. Otherwise, the operation is similar to that described for the flow diagram of FIGS. 52A, 52B, but with decisions being made on the basis of inverse dictionary sequence high occurrence word numbers (of the words listed in table 66) rather than on dictionary sequence high occurrence word numbers. As a final result, the range of high occurrence words EPO_H which are suffix extension words of the search string is specified by the set of word numbers in table 66 extending from the final value of the variable pivot1 to one less than the final value of the variable pivot2.

Figure 57A:
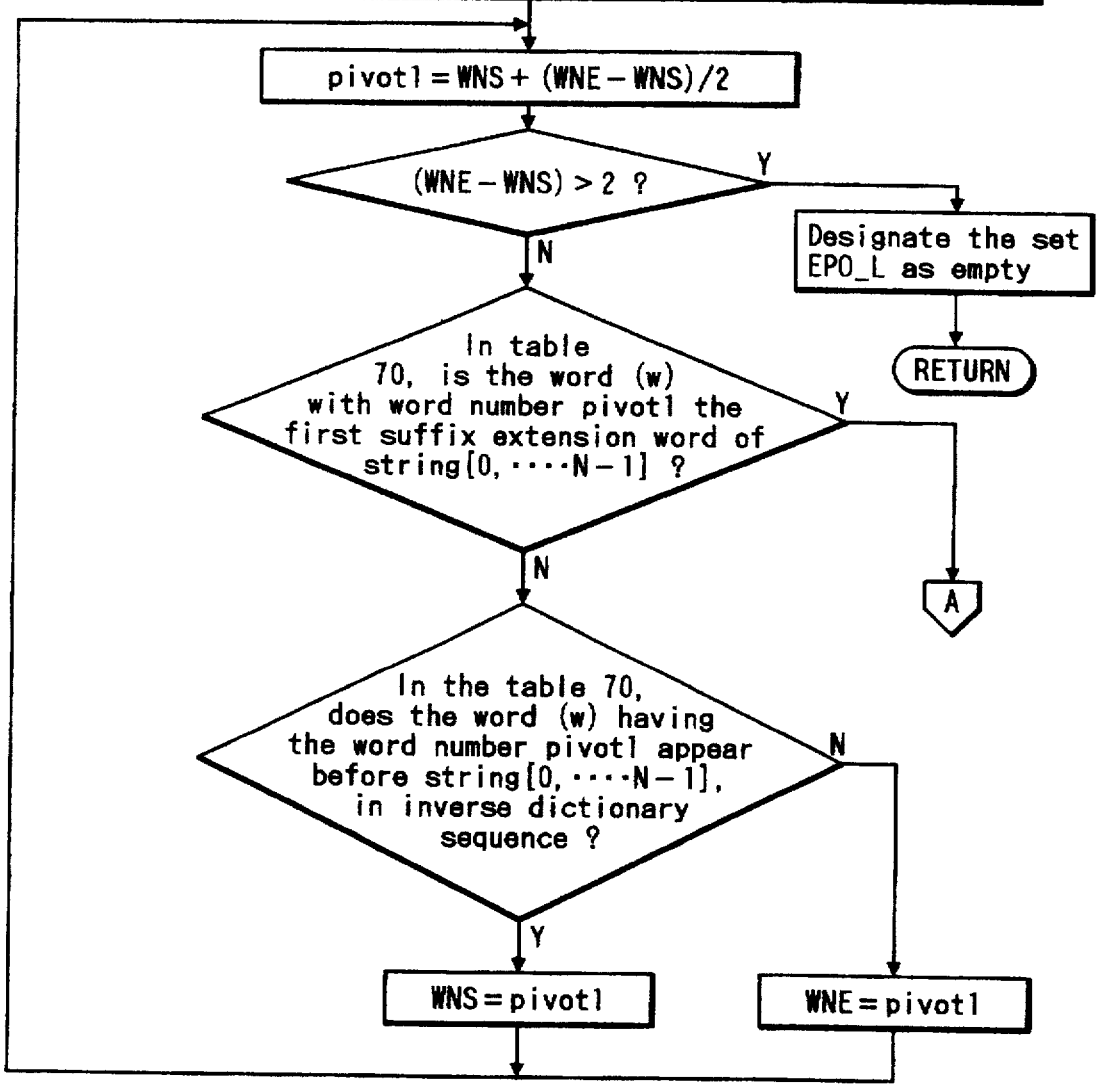
FIGS. 57A, 57B constitute a flow diagram of an algorithm for locating a set of low occurrence words which each have the search string as a suffix portion.
Figure 57B:
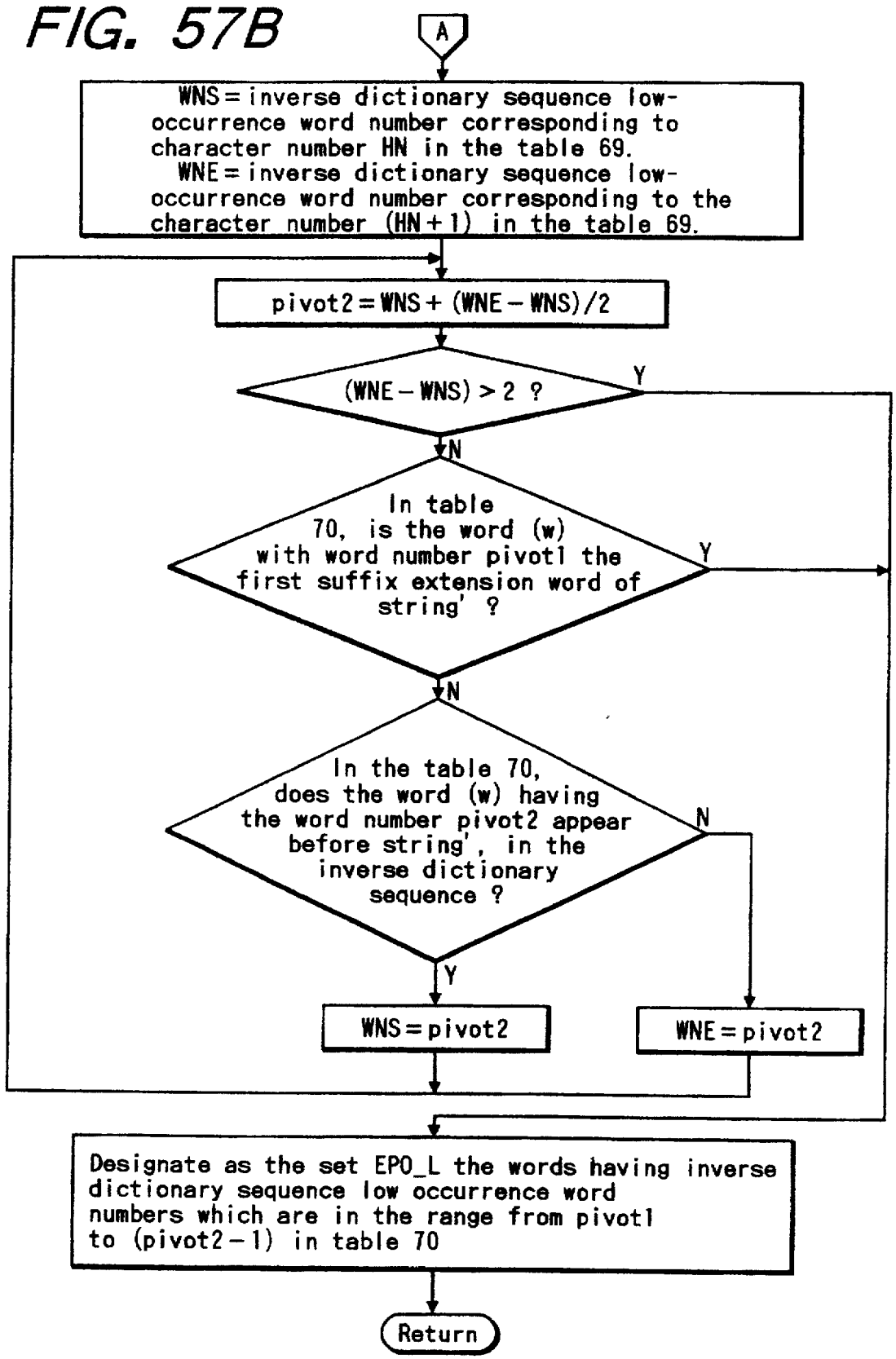

FIGS. 57A, 57B constitute a corresponding flow diagram of the contents of step S222 in FIG. 55, i.e. an algorithm for obtaining the inverse dictionary sequence low occurrence words of the set of words EPO-L, each of which is a suffix extension word of the search string. This is executed by the suffix extension word assessment section 200 (low occurrence words) by using the table 69 of final characters of inverse dictionary sequence low occurrence words and the table 70 of inverse dictionary sequence low occurrence words.

Figure 58:
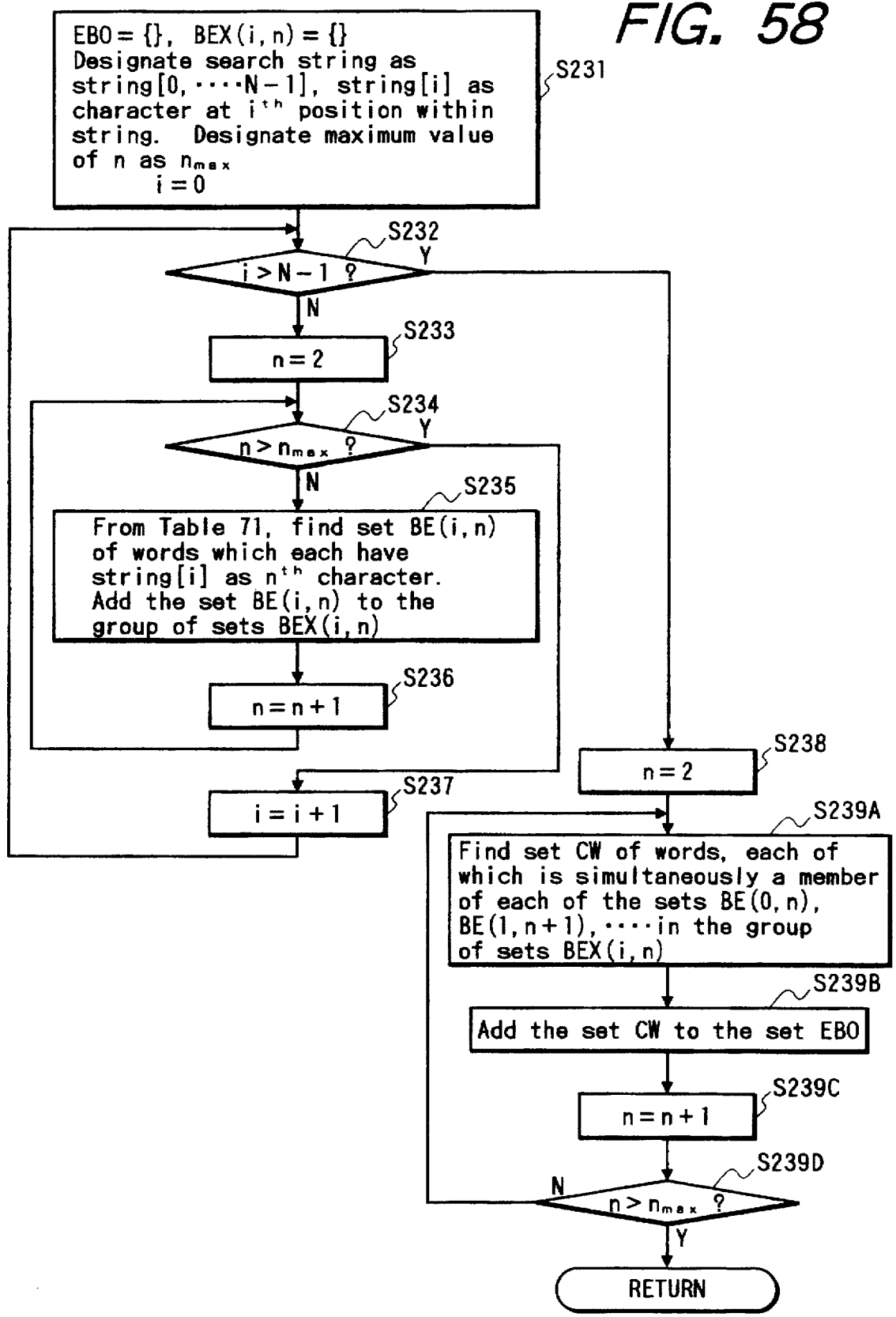
FIG. 58 is a flow diagram showing the contents of a third step in the flow diagram of FIG. 49, for locating all extension words within which the search string occurs as a partial character string, other than as a prefix or a suffix portion.

FIG. 58 is a flow diagram of an algorithm to implement step S23 in FIG. 49, i.e. to obtain the set EBO of all of the two-way extension words of the search string, which is executed by the two-way extension word assessment section 196. In that algorithm, a variable "i" is used to specify character position numbers within the search string, while a variable "n" is used to specify the intra-word position value of the search string within an extension word. For example if the search string begins from the second character position of an extension word, then n takes the value 2. The algorithm is based on cyclic repetitions of a step S235. In a first series of executions of that step, with the variables i and n having respective initial values of 0 and 2, the appropriate section of table 71 is searched to obtain those extension words having the first character of the search string as their second character. That set of words is designated as BE(0, 2). That process is then repeated, to obtain the set BE(0, 3) of extension words which each have the initial character of the search string as their third character, and so on. When the predetermined maximum value of n has been reached, these operations are then repeated to find the set of extension words which each have the second character of the search string as their third character, i.e. the set BE(1, 3), then the set of extension words which each have the second character of the search string as their fourth character, i.e. the set BE(1, 4), and so on.

When these operations have been completed (i.e. the value of i has reached the number N of characters in the search string), cyclic repetitions of a step S239A are executed, to examine the sets of words obtained in the preceding operations, for thereby finding each extension word which is a two-way extension word of the search string. For example, if the search string is "ac", then an extension word is a two-way extension word of that search string if it is simultaneously a member of the set of words which each have "a" as the second character and the set of words which each have "c" as the third character (in which the intra-word position value for the search string is 2), or if it is simultaneously a member of the set of words which each have "a" as the third character and the set of words which each have "c" as the fourth character (in which case the intra-word position value for the search string is 3), and so on. In that way, by successively adding to the set EBO each word which satisfies the above conditions, all of the two-way extension words of the search string are obtained as the final contents of set EBO, together with respective intra-word position values for the search string with respect to these extension words.

Figure 59:
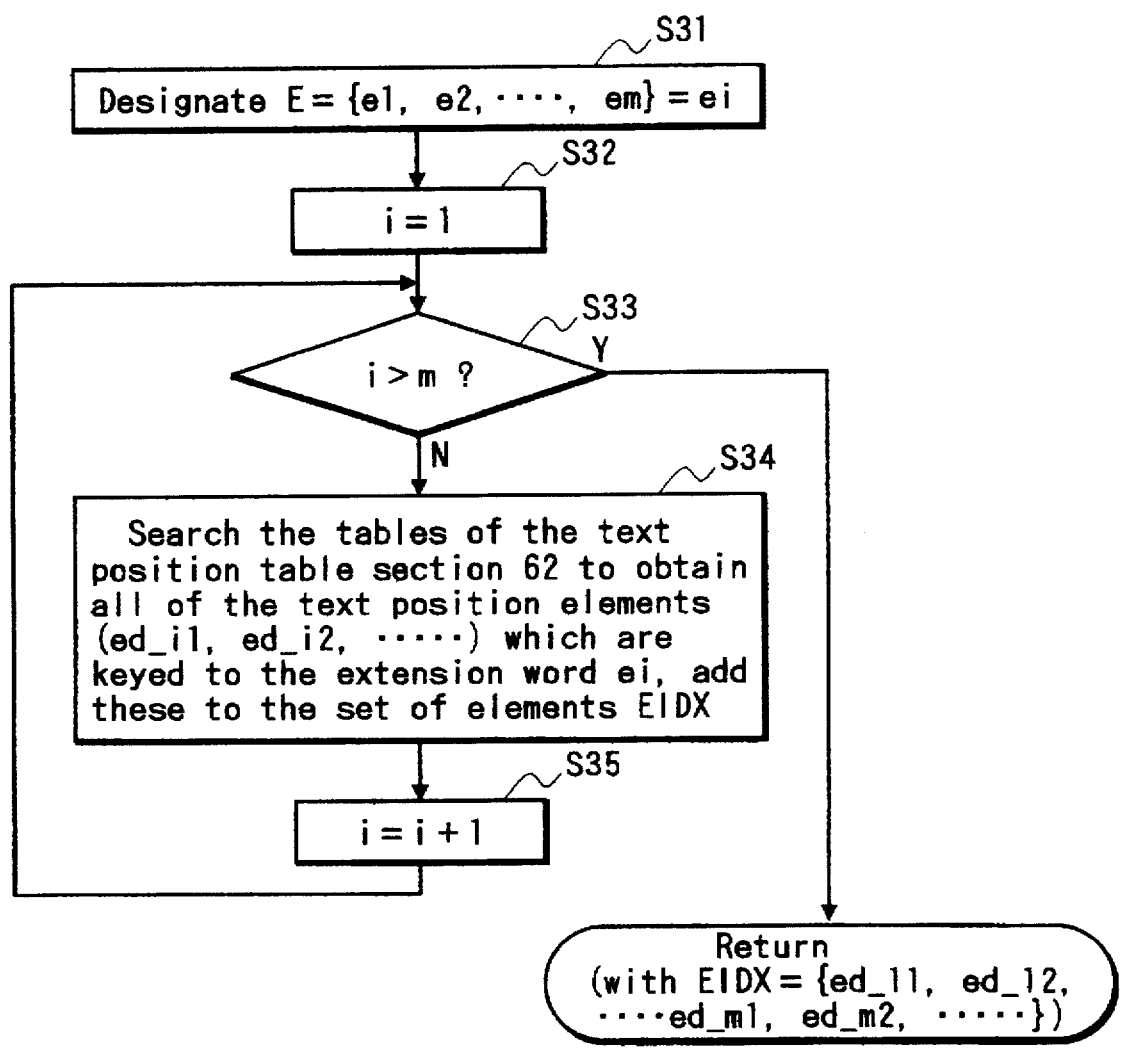
FIG. 59 is flow diagram showing the contents of a third step in the flow diagram of FIGS. 48A, 48B, for obtaining all of the text position elements which each entirely contain the search string.

FIG. 59 is a flow diagram showing the contents of step S3 in the main flow diagram of FIGS. 48A, 48B, for obtaining the set of text position elements EIDX, i.e. for obtaining all of the text position elements corresponding to each of the extension words which have been obtained in step S2 as described above. The operation is similar to the corresponding step described above for the first text search apparatus embodiment. However in step S34, depending upon whether an extension word obtained in step S2 is a high occurrence word or a low occurrence word, the corresponding array of text position elements is obtained from different ones of the tables in the text position table section 62.

Figure 60:
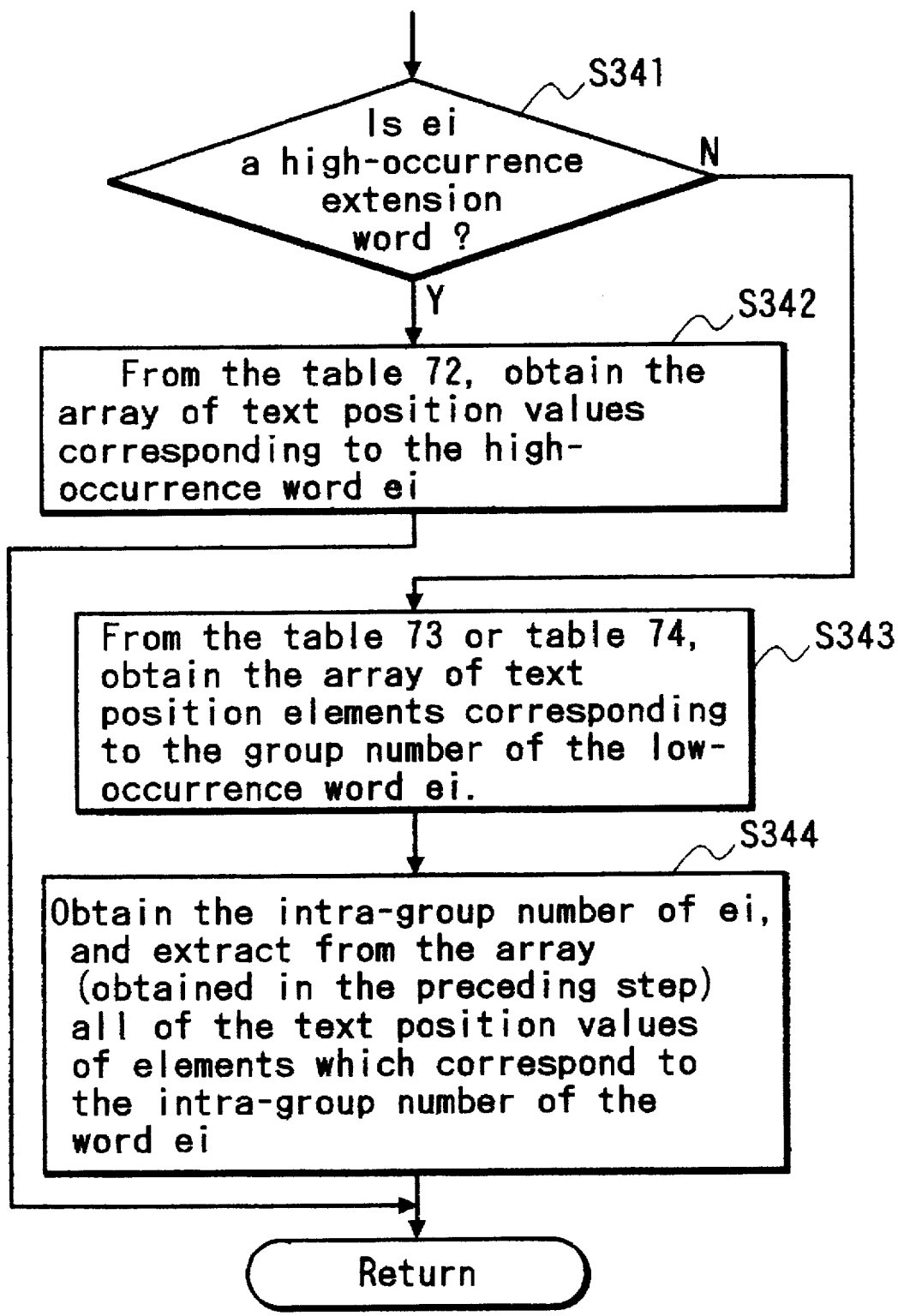
FIG. 60 is a flow diagram showing the contents of a step in the flow diagram of FIG. 59, for obtaining all of the text position elements which are keyed to a specific extension word.

This is shown in the flow diagram of FIG. 60, which illustrates the contents of step S34 in FIG. 59. If an extension word has been obtained from table 64 or 66 of the extension word correspondence table section 61, and so is a high occurrence word, then the corresponding array of text position values is obtained from the table 72 in the text position table section 62. If the extension word has been obtained from table 68, then it is a low occurrence word, and so the array of text position values for that word is obtained (based on the group number and intra-group number specified in table 68 for that low occurrence word) from table 73 in the text position table section 62.

If the extension word is a low occurrence word which has been obtained from table 70 in the extension word correspondence table section 61, then the corresponding array of text position elements is obtained from table 74 in the text position table section 62 (based on the group number and intra-group number specified in table 70 for that low occurrence word).

If the extension word has been obtained from the single-character intra-word position table 71, then it may be either a high occurrence word or a low occurrence word. If it is a high occurrence word, then the array of text position elements corresponding to that high occurrence extension word is obtained from the text position table 72 of the text position table section 62. If the extension word is a low occurrence word then (assuming that group numbers are assigned within table 71 in accordance with those of table 68, in the extension word correspondence table section 61) the array of text position elements corresponding to that low occurrence word is obtained from the table 73 of the text position table section 62, by using the group number and intragroup number specified for that extension word in table 71.

Figure 61:
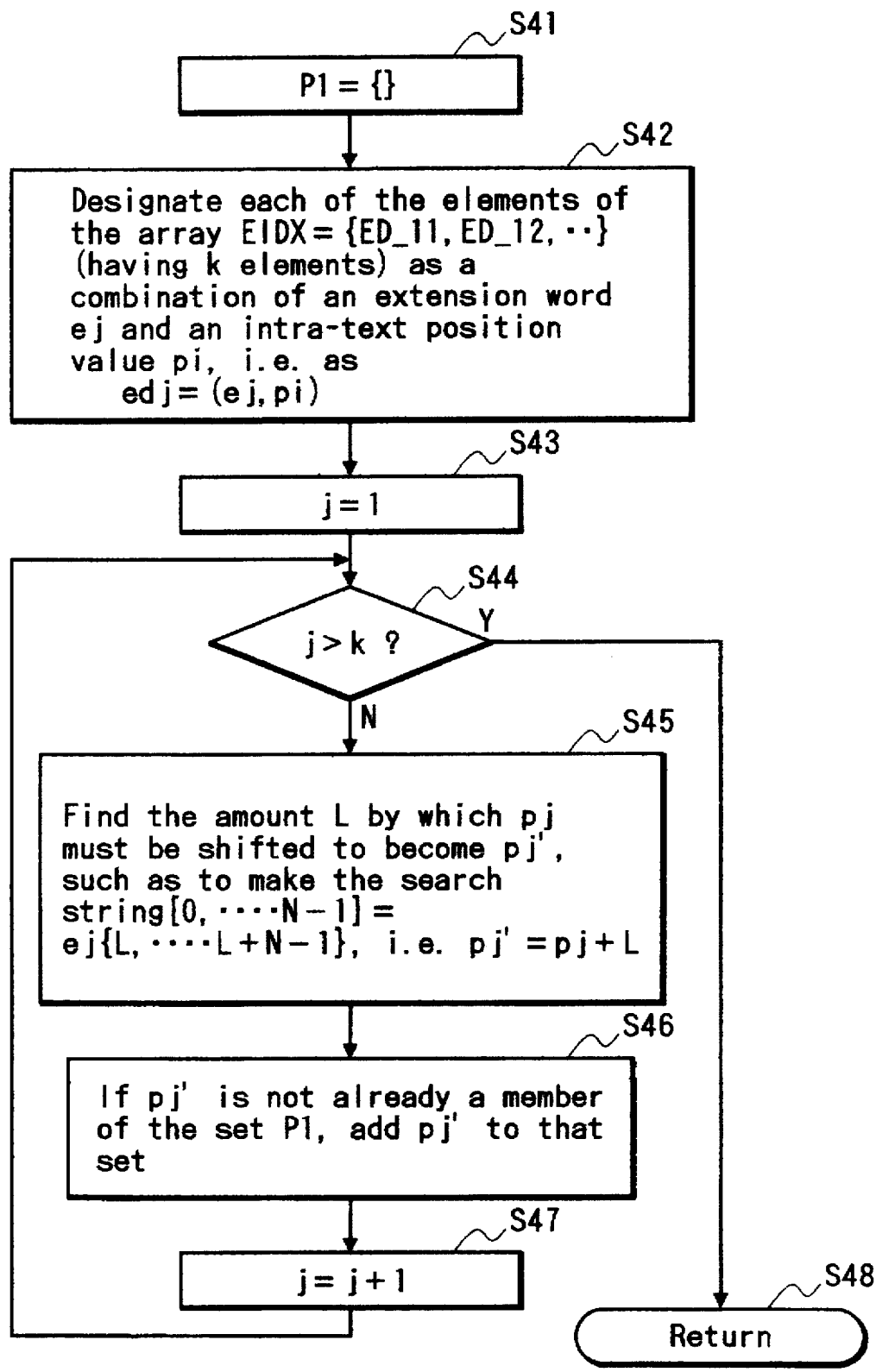
FIG. 61 is a flow diagram showing the contents of a fourth step in the flow diagram of FIGS. 48A, 48B executed to obtain all of the text position values of a search string, for those occurrences where the search string is contained entirely within respective text position elements.

The operation of step S4 in the main flow diagram of FIGS. 48A, 48B is shown in FIG. 61. This is executed by the total set formation section 204, and is basically identical to that of the corresponding step S4 of the first text search apparatus embodiment, so that further description is omitted.

As can be understood from the preceding description, when an extension word is specified by using tables 64, 66, 68, 70 or 71 in the extension word correspondence table section 61 of the second embodiment, the intra-word position value of the search string within that extension word is also specified, i.e. expressing the position at which the first character of the search string appears within the extension word. In the case of an extension word which contains the search string as a suffix portion, the system calculates the intra-word position value of the search string within that extension word by subtracting the number of characters of the search string from the number of characters of the extension word. Since that operation is obvious, it is omitted from the drawings. Thus, all of the information necessary for obtaining the set P of text position values of the search string, in step S4, i.e. the primary search processing has been completed.

At this stage, as described above for the first text search apparatus embodiment, if the search string is a dictionary word, then all the text position values of that word have been obtained. If the search string is not listed in the dictionary list, then steps S7 to S12 in FIGS. 48A, 48B must also be executed.

The contents of step S7 of the main flow diagram of FIGS. 48A, 48B are identical to those of the corresponding step S7 (shown in FIG. 18) of the first text search apparatus embodiment, so that detailed description will be omitted. As described hereinabove, in that step, a set C of cover words is determined which, when arranged in a specific sequence, does not extend beyond the initial and final characters of the search string, and covers all of the character positions of the search string.

The contents of step S8 of the main flow diagram of FIGS. 48A, 48B are identical to those of the corresponding step S8 (shown in FIG. 19) of the first text search apparatus embodiment, so that detailed description will be omitted. As described hereinabove, in that step, respective sets of extension words of each of the cover words are derived, as the set Ei. With the second text search apparatus embodiment, the process of deriving the array of text position elements corresponding to a cover word consists of using the tables 63 to 71 of the extension word correspondence table section 61 to obtain all of the prefix extension words, all of the suffix extension words and all of the two-way extension words of the cover word, as described above for steps S2 to S4 of FIGS. 48A, 48B.

Figure 62:
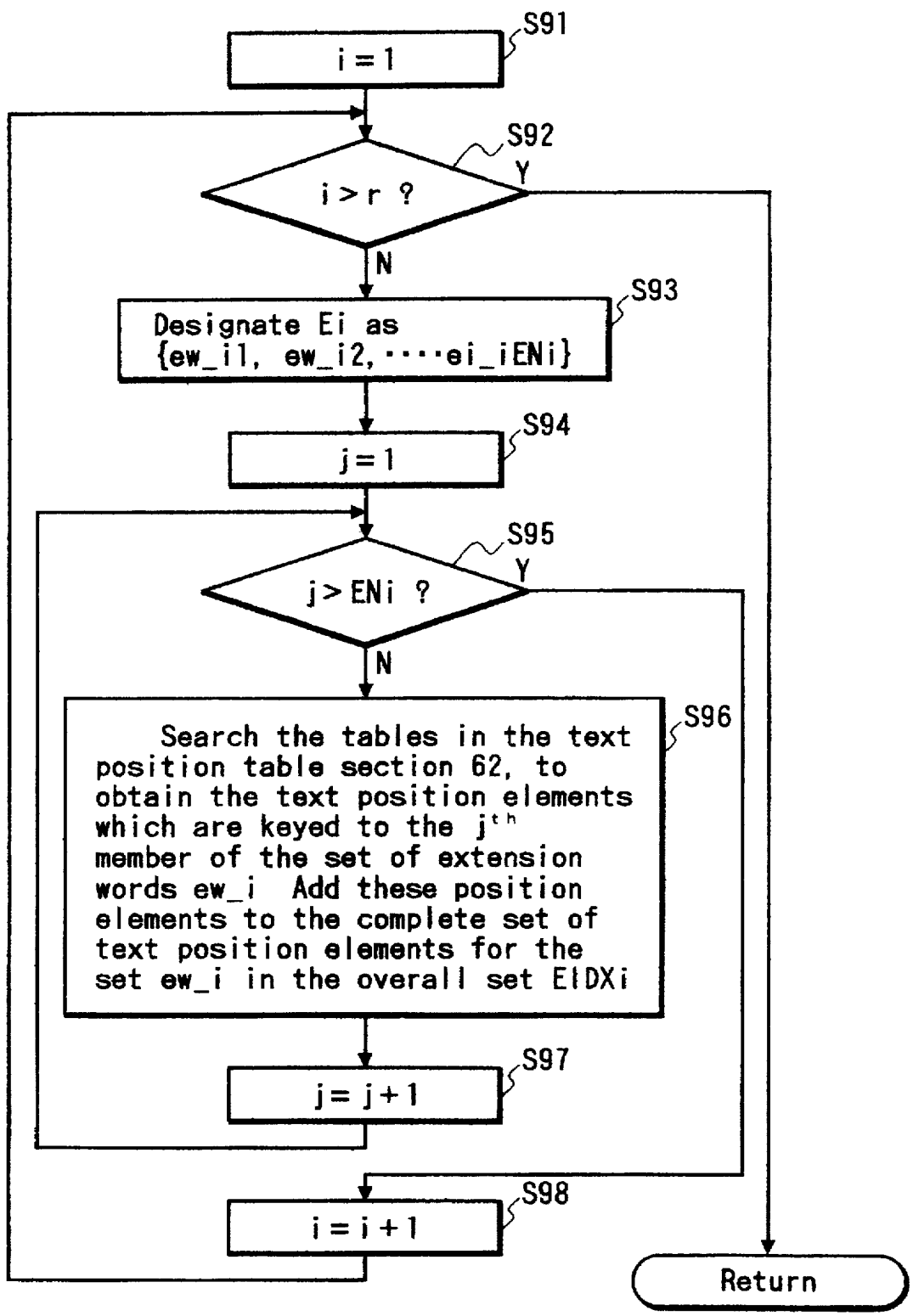
FIG. 62 is a flow diagram showing the contents of a step in the flow diagram of FIGS. 48A, 48B which is executed to obtain respective sets of extension words which correspond to respective ones of a sequence of cover words of the search string, for those occurrences where the search string extends between two or more text position elements.

The contents of step S9 of the main flow diagram of FIGS. 48A, 48B are substantially identical to those of the corresponding step S9 (shown in FIG. 20) of the first text search apparatus embodiment. The corresponding flow diagram for the second text search apparatus embodiment is shown in FIG. 62. As described hereinabove, in that step, the respective arrays of text position elements for each of the extension words of the set Ei are obtained, as the total set EIDXi. With the second text search apparatus embodiment, these text position elements are obtained from the tables 72 to 74 of the text position table section 62, based on the high occurrence word numbers, low occurrence word numbers, and (group number/intra-group position number) combinations that have been obtained from the tables of the extension word correspondence table section 61 in the preceding steps.

The operations of the succeeding steps S10 and S11 in the main flow diagram of FIGS. 48A, 48B are basically similar to those of the corresponding steps S10, S11 described hereinabove for the first text search apparatus embodiment. Respective sequences of extension words of the cover words are obtained, each containing the search string, and corresponding text position values for the search string (each expressing a position where the search string occurs, within the object text, extending within two or more successive extension words) are thereby obtained as the set Q in step S11. However with this embodiment, when executing step S10 of FIG. 48B, the respective arrays (CED1), (CED2), etc. of text position elements that are keyed to the extension words of the set EIDXi are obtained by using the tables 72 and 73, as described hereinabove. Step S11 in FIG. 48B is then executed, to obtain the set Q of text position values of the cover word sequence, and hence of those occurrences of the search string where it extends between a plurality of extension words in the object text.

The sets P and Q are then combined to obtain the complete array of text position values of the search string, as the set R.

In the above description of embodiments it has been assumed for simplicity of description that the search object text is a continuous sequence of characters. In practice a text written in a language such as Chinese of Japanese will generally consist of successive portions (e.g. sentences, delimited by periods) each formed of a continuous sequence of characters. However it will be apparent that the embodiments described above can readily be adapted to process such a text.

As can be understood from the above description, the present invention provides a text search apparatus whereby all of the positions of occurrence of any arbitrary character string within an object text can be obtained, even in a text written in a language which does not insert delimiting spaces between successive words, with complete reliability of searching being achieved, together with a high search speed and moderate data storage requirements.

It will be understood that various modifications to the embodiments described above could be envisaged, which fall within the scope that is claimed for the invention. For example the structure could be modified such as to eliminate the secondary search processing steps, i.e. to provide a simplified form of operation whereby only the text positions of character strings which are registered in the dictionary list can be located.

The basic principles of the invention reside in the use of specific words referred to herein as extension words, with the set of extension words satisfying at least the following basic conditions:

(a) every character position within the object text is covered by at least one extension word, (b) every extension word is registered as a dictionary word, and (c) the set of extension words is smaller than the set of dictionary words.

Each occurrence of an extension word within the object text defines a text position element, with the resultant set of text position elements being used for position reference purposes during a text search. Since the set of extension words is smaller than the total set of dictionary words, the data storage requirements are inherently less than for prior art types of search apparatus index file which utilize text positions of dictionary words for position reference purposes. Furthermore, with a text search apparatus according to the present invention, all of the positions of occurrence within the object text of any arbitrary search string can be reliably obtained.

What is claimed is:

1. A text search apparatus operable for deriving a set of text position values expressing all positions of occurrence of a search string within an object text, said search string being an arbitrarily specified string of characters from a predetermined character set, said object text being formed of a finite number of characters from said character set, the apparatus comprising:

a dictionary list having registered therein a predetermined list of dictionary words or identifiers of said dictionary words, each of said dictionary words being a string of characters from said character set, text position table means comprising a plurality of text position elements each expressing a combination of one of said dictionary words which appears within said object text, or an identifier of said dictionary word, in conjunction with a text position value of said dictionary word, each dictionary word of a text position element in said text position table being an extension word which is a maximum length word within a set of dictionary words each extending from a leading character position of said text position element;

extension word position correspondence table means having registered therein information expressing, for each of respective partial character strings of said extension words, a corresponding set of extension words and respective positions of said partial character string within each of said corresponding extension words, extension word assessment means for obtaining from said extension word correspondence table means a first set of extension words each containing said search string as a partial character string and intra-word position information indicating respective positions of said search string within the words of said first set of extension words, text position element look-up means for obtaining first sets of text position elements from said text position table means, each set of said first sets of text position elements being keyed to a corresponding extension word of said first set of extension words, total set formation means for operating on said first sets of text position elements in conjunction with said intra-word position information, to obtain a first set of text position values of said search string, and cover word assessment means for determining a specific sequence of cover words extending from a leading character to a final character of said search string, each of said cover words other than a final cover word of said sequence being a dictionary word, said final cover word being a dictionary word or a leading partial character string of a dictionary word, wherein said extension word assessment means obtains from said extension word position correspondence table means respective second sets of extension words, said sets corresponding to respective ones of said cover words, and obtains intra-word information expressing respective positions of each of said cover words within each of the extension words of the corresponding one of said second sets, said text position element look-up means obtains from said text position table means, for each extension word of each set of said second sets of extension words, a corresponding second set of said text position elements, said cover word assessment means executes comparison processing of said second sets of text position elements to select groups of sequentially occurring text position elements, each of said groups containing said cover word sequence extending continuously from within a leading text position element of the group, and wherein said total set formation means obtains, based on respective leading text position elements of said groups in conjunction with said intra-word information from said extension word assessment means, a second set of text position values of said search string, and combines said second set with said first set of text position values to obtain a complete set of text position values of said search string.

2. A text search apparatus according to claim 1, wherein said dictionary list is predetermined such that every character position within said object text is covered by at least one of said text position elements.

3. A text search apparatus according to claim 2, further including a table generating apparatus for generating said text position table, said table generating apparatus comprising means for executing a first processing operation of sequentially examining all characters appearing at successive character positions of said object text, to obtain for each of said character positions a set of said dictionary words each beginning from said character position, if said set of dictionary words, beginning from a first specific character position, is found to be empty, sequentially examining characters at successive character positions following said first specific character position, to find a second specific character position from which a set of dictionary words begins which is not empty, registering in said dictionary list as a new dictionary word a string of characters which extends from said first specific character position to a character position immediately preceding said second specific character position, and registering said new dictionary word in conjunction with a character number expressing said first specific character position, as a text position element of an entry in said text position table, and means for executing a second processing operation of sequentially examining characters at successive character positions of said object text, to obtain for each of said character positions a set of dictionary words each beginning from said each character position, selecting as a maximum length word of said set a word of said set which satisfies respective conditions of being the longest word in said set and of extending beyond all dictionary words which begin from any preceding character position, and designating each of said maximum length words as an extension word, and registering each said extension word, in conjunction with a character number expressing the character position from which said extension word begins within said object text, as a text position element in said text position table.

4. A text search apparatus according to claim 2, further including a table generating apparatus for generating said text position table, said table generating apparatus comprising means for sequentially examining all characters appearing at successive character positions of said object text, to obtain for each of said character positions a set of said dictionary words each beginning from said character position, selecting, as a maximum length word of said set, a word of said set which satisfies respective conditions of being the longest word in said set and of extending beyond all dictionary words which begin from any preceding character positions, if said set is found to be empty at a specific character position, registering in said dictionary list a character which appears at said specific character position, and designating said character as constituting said maximum length word, with respect to said specific character position, and designating each of said maximum length words as an extension word, and registering said extension word, in conjunction with a character number expressing the character position from which said extension word begins within said object text, as a text position element in said text position table.

5. A text search apparatus according to claim 1, wherein said extension word correspondence table means comprises a dictionary sequence word table comprising a list of said extension words arranged in dictionary sequence, in conjunction with respective dictionary sequence word numbers of said extension words, said dictionary sequence word numbers successively increasing in magnitude in accordance with positions in the dictionary sequence, an inverse dictionary sequence word table comprising a list of said extension words arranged in inverse dictionary sequence, in conjunction with respectively corresponding ones of said dictionary sequence word numbers, a single character intra-word position table which relates each character of said character set to at least all of said extension words which each contain said character at a position other than a leading character position or a final character position, and which relates said each character to each position at which said character appears within each extension word containing the character, at least within a range of positions extending from a second character position to a character position immediately preceding a final character position within said each extension word, said extension words being registered in conjunction with respectively corresponding ones of said dictionary sequence word numbers, and wherein respective ones of said extension words of said entries in said text position table are assigned respectively corresponding ones of said dictionary sequence word numbers.

6. A text search apparatus according to claim 5, wherein said extension word assessment means comprises prefix extension word assessment means for obtaining from said dictionary sequence word table respective ones of said extension words which have said search string as a prefix portion thereof, suffix extension word assessment means for obtaining from said inverse dictionary sequence word table respective ones of said extension words which have said search string as a suffix portion thereof, and two-way extension word assessment means for obtaining from said inverse dictionary sequence word table respective ones of said extension words which have said search string as a partial character string that is other than a prefix portion or suffix portion.

7. A text search apparatus according to claim 1, wherein said extension word correspondence table means comprises a dictionary sequence word table comprising a list of said extension words or identifiers of said extension words, arranged in dictionary sequence, in conjunction with respective dictionary sequence word numbers of said extension words, said dictionary sequence word numbers successively increasing in magnitude in accordance with word positions in the dictionary sequence, a dictionary sequence initial character table comprising a list of all characters of said character set or identifiers of said characters, in conjunction with respective ones of said dictionary sequence word numbers, with each dictionary sequence word number assigned to a character being the dictionary sequence word number of the leading extension word having said character as the leading character thereof, in said extension word list in said dictionary sequence word table, an inverse dictionary sequence word table comprising a list of said extension words or identifiers of said extension words, arranged in inverse dictionary sequence, in conjunction with respectively corresponding ones of said dictionary sequence word numbers, and in conjunction with respective inverse dictionary sequence word numbers of said extension words, said inverse dictionary sequence word numbers successively increasing in magnitude in accordance with word positions in the inverse dictionary sequence, an inverse dictionary sequence final character table comprising a list of all characters of said character set or identifiers of said characters, in conjunction with respective ones of said inverse dictionary sequence word numbers, with each inverse dictionary sequence word number assigned to a character being that of the leading extension word having said character as the final character thereof, in said extension word list in said inverse dictionary sequence word table, and a single character intra-word position table which relates each character of said character set to at least all of said extension words which each contain said character at a position other than a leading character position or a final character position, and which relates said each character to each position at which said character appears within each extension word containing the character, at least within a range of positions extending from a second character position to a character position immediately preceding a final character position within said each extension word, said extension words being registered in conjunction with respectively corresponding ones of said dictionary sequence word numbers, and wherein respective ones of said extension words of said entries in said text position table are assigned respectively corresponding ones of said dictionary sequence word numbers.

8. A text search apparatus according to claim 7, wherein said extension word assessment means comprises means for obtaining from said dictionary sequence initial character table a first dictionary sequence word number, said first dictionary sequence word number corresponding to a leading character of said search string, and a second dictionary sequence word number, said second dictionary sequence word number corresponding to a character which immediately succeeds said leading character of the search string in said dictionary sequence, prefix extension word derivation means for obtaining from said dictionary sequence word table, from within a range of said extension words listed therein that extends from an extension word corresponding to said first dictionary sequence word number to an extension word corresponding to a dictionary sequence word number which is one less than said second dictionary sequence word number, respective dictionary sequence word numbers of a set of extension words each having said search string as a prefix portion, means for obtaining from said inverse dictionary sequence final character table a first inverse dictionary sequence word number, said first inverse dictionary sequence word number corresponding to a final character of said search string, and a second inverse dictionary sequence word number, said second inverse dictionary sequence word number corresponding to a character which immediately succeeds said final character of the search string in said dictionary sequence, and suffix extension word derivation means, for obtaining from said inverse dictionary sequence word table, from within a range of said extension words listed therein that extends from an extension word corresponding to said first inverse dictionary sequence word number to an extension word corresponding to an inverse dictionary sequence word number which is one less than said second inverse dictionary sequence word number, respective dictionary sequence word numbers of a set of extension words each having said search string as a suffix portion, and two-way extension word derivation means for obtaining, from said single character intra-word position table, respective dictionary sequence word numbers of sets of extension words having respective characters of said search string at specific character positions within said extension words, and for examining said sets to extract respective dictionary sequence word numbers of those extension words which contain said search string as a partial character string other than as only a prefix portion or suffix portion.

9. A text search apparatus according to claim 8, wherein said prefix extension word derivation means comprises means for assigning, as an initial value of a first pointer variable, a dictionary sequence word number which is substantially centrally located within a range of dictionary sequence word numbers extending from said first dictionary sequence word number to said dictionary sequence word number which is one less than said second dictionary sequence word number, and for thereafter successively executing steps of judging whether an extension word corresponding to the dictionary sequence word number specified by said first pointer variable is a leading word of a range of extension words having said search string as a prefix portion, if said extension word is not said leading word of said range of extension words, judging whether said extension word is located before or after said search string within said dictionary sequence, dividing said range of dictionary sequence word numbers into two substantially equal ranges, selecting one of said ranges in accordance with a result obtained by said judging, and assigning as a new value to said first pointer variable a dictionary sequence word number that is substantially centrally located within the selected one of said ranges, and wherein said suffix extension word derivation means comprises means for assigning as an initial value of a second pointer variable, an inverse dictionary sequence word number which is substantially centrally located within a range of inverse dictionary sequence word numbers extending from said first inverse dictionary sequence word number to said inverse dictionary sequence word number which is one less than said second inverse dictionary sequence word number, and for thereafter successively executing steps of judging whether an extension word corresponding to the inverse dictionary sequence word number specified by said second pointer variable is a leading word of a range of extension words having said search string as a suffix portion, if said extension word is not said leading word of the range of extension words having the search string as a suffix portion, judging whether said extension word is located before or after said search string within said inverse dictionary sequence, dividing said range of inverse dictionary sequence word numbers into two substantially equal ranges, selecting one of said ranges in accordance with a result obtained by said judging, and assigning as a new value to said second pointer variable an inverse dictionary sequence word number that is substantially centrally located within the selected one of said ranges.

10. A text search apparatus according to claim 1, wherein said extension word correspondence table means comprises a dictionary sequence high occurrence word table comprising a list of high occurrence words or identifiers of said high occurrence words, arranged in dictionary sequence, in conjunction with respective dictionary sequence high occurrence word numbers of said high occurrence words, said dictionary sequence high occurrence word numbers successively increasing in magnitude in accordance with word positions in the dictionary sequence, said high occurrence words comprising respective ones of said extension words which occur within said object text a number of times which exceeds a predetermined threshold value, an inverse dictionary sequence high occurrence word table comprising a list of said high occurrence words or identifiers of said high occurrence words, arranged in inverse dictionary sequence, in conjunction with respectively corresponding ones of said dictionary sequence high occurrence word numbers, a dictionary sequence low occurrence word table comprising a list of low occurrence words or identifiers of said low occurrence words, arranged in dictionary sequence, said list of low occurrence words being divided into a plurality of first groups of successive low occurrence words in accordance with predetermined criteria, each of said low occurrence words being listed in conjunction with a combination of a first group number which indicates membership of a specific one of said first groups and an intra-group number which is indicates a position of said low occurrence word within said one of the first groups, said low occurrence words comprising respective ones of said extension words which each occur within said object text a number of times which is no greater than said threshold value, an inverse dictionary sequence low occurrence word table comprising a list of low occurrence words or identifiers of said low occurrence words, arranged in inverse dictionary sequence, said list of low occurrence words being divided into a plurality of second groups of successive low occurrence words in accordance with predetermined criteria, each of said low occurrence words being listed in conjunction with a combination of a second group number which indicates membership of a specific one of said second groups and an intra-group number which indicates a position of said low occurrence word within said one of the second groups, and a single character intra-word position table which relates each character of said character set to at least all of said extension words which each contain said character at a position other than a leading character position or a final character position, and which relates said each character to each position at which said character appears within each extension word containing the character, at least within a range of positions extending from a second character position to a character position immediately preceding a final character position within said each extension word, with extension words which are classified as high occurrence words being registered in conjunction with respectively corresponding ones of said dictionary sequence high occurrence word numbers, and with extension words which are classified as low occurrence words being registered in conjunction with respective ones of said combinations of a first group number with an intra-group number or combinations of a second group number with an intra-group number, and wherein said text position table means comprises a first text position table comprising a plurality of table entries corresponding to respective ones of said high occurrence words, said table entries being respectively identified by corresponding ones of said dictionary sequence high occurrence word numbers, each of said table entries comprising the corresponding high occurrence word in conjunction with an array of respective text position values from all text position elements of said high occurrence word, said text position values being arrayed in sequence of increasing magnitude, a second text position table comprising a plurality of table entries corresponding to respective ones of said first groups, said table entries being respectively identified by corresponding group numbers of said first group, each of said table entries comprising the dictionary sequence low occurrence word number of a leading word of the corresponding one of said first groups, in conjunction with an array of of all text position elements of low occurrence words of said first group, each of said text position elements comprising a value indicating a position of a low occurrence word within one of said first groups, in conjunction with a text position value of said low occurrence word, said text position elements being arrayed in sequence of increasing magnitude of text position value, and a third text position table comprising a plurality of table entries corresponding to respective ones of said second groups, said table entries being respectively identified by corresponding group numbers of said second group, each of said table entries comprising the inverse dictionary sequence low occurrence word number of a leading word of the corresponding one of said second groups, in conjunction with an array of of all text position elements of low occurrence words of said first group, each of said text position elements comprising a value indicating a position of a low occurrence word within one of said second groups, in conjunction with a text position value of said low occurrence word, said text position elements being arrayed in sequence of increasing magnitude of text position value.

11. A text search apparatus according to claim 10, wherein said extension word assessment means comprises first prefix extension word assessment means for obtaining from said dictionary sequence high occurrence word table respective ones of said high occurrence words which have said search string as a prefix portion thereof, first suffix extension word assessment means for obtaining from said inverse dictionary sequence high occurrence word table respective dictionary sequence high occurrence word numbers of high occurrence words which have said search string as a suffix portion thereof, second prefix extension word assessment means for obtaining from said dictionary sequence low occurrence word table, for each low occurrence word which has said search string as a prefix portion thereof, a combination of a group number and an intra-group number, said group number specifying one of a plurality of groups of low occurrence words listed in said dictionary sequence low occurrence word table and said intra-group number specifying a position of said each low occurrence word within said one of the groups, second suffix extension word assessment means for obtaining from said inverse dictionary sequence low occurrence word table for each low occurrence word which has said search string as a suffix portion thereof, a combination of a group number and an intra-group number, said group number specifying one of a plurality of groups of low occurrence words listed in said dictionary sequence low occurrence word table and said intra-group number specifying a position of said each low occurrence word within said one of the groups, and two-way extension word assessment means for obtaining from said single character intra-word position table respective dictionary sequence high occurrence word numbers or combinations of a group number and intra-group number, for extension words having said search string as a partial character string other than only as a prefix portion or suffix portion.

12. A text search apparatus according to claim 1, wherein said extension word correspondence table means comprises a dictionary sequence high occurrence word table comprising a list of high occurrence words or identifiers of said high occurrence words, arranged in dictionary sequence, in conjunction with respective dictionary sequence high occurrence word numbers of said high occurrence words, said dictionary sequence high occurrence word numbers successively increasing in magnitude in accordance with word positions in the dictionary sequence, said high occurrence words comprising respective ones of said extension words which occur within said object text a number of times which exceeds a predetermined threshold value, a first dictionary sequence initial character table comprising a list of all characters of said character set or identifiers of said characters, in conjunction with respective ones of said dictionary sequence high occurrence word numbers, with each dictionary sequence high occurrence word number assigned to a character being the dictionary sequence high occurrence word number of the leading high occurrence word, in said list in said dictionary sequence high occurrence word table, having said character as the leading character thereof, an inverse dictionary sequence high occurrence word table comprising a list of said high occurrence words or identifiers of said high occurrence words, arranged in inverse dictionary sequence, in conjunction with respectively corresponding ones of said dictionary sequence high occurrence word numbers and in conjunction with respective inverse dictionary sequence high occurrence word numbers, said inverse dictionary sequence high occurrence word numbers successive increasing in magnitude in accordance with word positions in the inverse dictionary sequence, a first inverse dictionary sequence final character table comprising a list of all characters of said character set or identifiers of said characters, in conjunction with respective ones of said dictionary sequence word numbers, with each dictionary sequence word number assigned to a character being the dictionary sequence word number of the leading high occurrence word, in said list in said inverse dictionary sequence high occurrence word table, having said character as the final character thereof, a dictionary sequence low occurrence word table comprising a list of low occurrence words or identifiers of said low occurrence words, arranged in dictionary sequence in conjunction with respective dictionary sequence low occurrence word numbers which successively increase in value in accordance with word positions in the dictionary sequence, said list of low occurrence words being divided into a plurality of first groups of successive low occurrence words in accordance with predetermined criteria, each of said low occurrence words being listed in conjunction with a combination of a first group number which indicates membership of a specific one of said first groups and an intra-group number which indicates a position of said low occurrence word within said one of the first groups, said low occurrence words comprising respective ones of said extension words which each occur within said object text a number of times which is no greater than said threshold value, a second dictionary sequence initial character table comprising a list of all characters of said character set or identifiers of said characters, in conjunction with respective ones of said dictionary sequence low occurrence word numbers, with each dictionary sequence low occurrence word number assigned to a character being the dictionary sequence word number of the leading low occurrence word, in said list in said dictionary sequence low occurrence word table, having said character as the leading character thereof, an inverse dictionary sequence low occurrence word table comprising a list of low occurrence words or identifiers of said low occurrence words, arranged in inverse dictionary sequence in conjunction with respective inverse dictionary sequence low occurrence word numbers which successively increase in value in accordance with word positions in the inverse dictionary sequence, said list of low occurrence words being divided into a plurality of second groups of successive low occurrence words in accordance with predetermined criteria, each of said low occurrence words being listed in conjunction with a combination of a second group number which indicates membership of a specific one of said second groups and an intra-group number which indicates a position of said low occurrence word within said one of the second groups, a second inverse dictionary sequence final character table comprising a list of all characters of said character set or identifiers of said characters, in conjunction with respective ones of said inverse dictionary sequence low occurrence word numbers, with each inverse dictionary sequence low occurrence word number assigned to a character being the inverse dictionary sequence low occurrence word number of the leading low occurrence word, in said list in said inverse dictionary sequence low occurrence word table, having said character as the final character thereof, a single character intra-word position table which relates each character of said character set to at least all of said extension words which each contain said character at a position other than a leading character position or a final character position, and which relates said each character to each position at which said character appears within each extension word containing the character, at least within a range of positions extending from a second character position to a character position immediately preceding a final character position within said each extension word, with extension words which are classified as high occurrence words being registered in conjunction with respectively corresponding ones of said dictionary sequence high occurrence word numbers, and with extension words which are classified as low occurrence words being registered in conjunction with respectively corresponding ones of said combinations of a first group number with an intragroup number or combinations of a second group number with an intra-group number, and wherein said text position table means comprises a first text position Gable comprising a plurality of table entries corresponding to respective ones of said high occurrence words, said table entries being respectively identified by corresponding ones of said dictionary sequence high occurrence word numbers, each of said table entries comprising the corresponding high occurrence word in conjunction with an array of respective text position values from all text position elements of said high occurrence word, said text position values being arrayed in sequence of increasing magnitude, a second text position table comprising a plurality of table entries corresponding to respective ones of said first groups, said table entries being respectively identified by corresponding ones of said first group numbers, each of said table entries comprising the dictionary sequence low occurrence word number of a leading word of the corresponding one of said first groups, in conjunction with an array of of all text position elements of low occurrence words of said first group, each of said text position elements comprising a value indicating a position of a low occurrence word within one of said first groups, in conjunction with a text position value of said low occurrence word, said text position elements being arrayed in sequence of increasing magnitude of text position value, and a third text position Gable comprising a plurality of table entries corresponding to respective ones of said second groups, said table entries being respectively identified by corresponding ones of said second group numbers, each of said table entries comprising the inverse dictionary sequence low occurrence word number of a leading word of the corresponding one of said second groups, in conjunction with an array of of all text position elements of low occurrence words of said first group, each of said text position elements comprising a value indicating a position of a low occurrence word within one of said second groups, in conjunction with a text position value of said low occurrence word, said text position elements being arrayed in sequence of increasing magnitude of text position value.

13. A text search apparatus according to claim 12, wherein said extension word assessment means comprises means for obtaining from said first dictionary sequence initial character table a first dictionary sequence high occurrence word number, said first dictionary sequence high occurrence word number corresponding to a leading character of said search string, and a second dictionary sequence high occurrence word number, said second dictionary sequence high occurrence word number corresponding to a character which immediately succeeds said leading character of the search string in said dictionary sequence, means for obtaining from said dictionary sequence high occurrence word table, from within a range of said extension words listed therein that extends from an extension word corresponding to said first dictionary sequence high occurrence word number to an extension word corresponding to a dictionary sequence high occurrence word number which is one less than said second dictionary sequence high occurrence word number, respective dictionary sequence high occurrence word numbers of high occurrence words having said search string as a prefix portion, means for obtaining from said first inverse dictionary sequence final character table a first inverse dictionary sequence high occurrence word number, said first inverse dictionary sequence high occurrence word number corresponding to a final character of said search string, and a second inverse dictionary sequence high occurrence word number, said second inverse dictionary sequence high occurrence word number corresponding to a character which immediately succeeds said final character of the search string in said dictionary sequence, means for obtaining from said inverse dictionary sequence high occurrence word table, from within a range of said extension words listed therein that extends from an extension word corresponding to said first inverse dictionary sequence high occurrence word number to an extension word corresponding to an inverse dictionary sequence high occurrence word number which is one less than said second inverse dictionary sequence high occurrence word number, respective dictionary sequence high occurrence word numbers high occurrence words having said search string as a suffix portion, means for obtaining from said second dictionary sequence initial character table a first dictionary sequence low occurrence word number, said first dictionary sequence low occurrence word number corresponding to said leading character of said search string, and a second dictionary sequence high occurrence word number, said second dictionary sequence high occurrence word number corresponding to said character which immediately succeeds the leading character of the search string in said dictionary sequence, means for obtaining from said dictionary sequence low occurrence word table, from within a range of said extension words listed therein that extends from an extension word corresponding to said first dictionary sequence low occurrence word number to an extension word corresponding to a dictionary sequence low occurrence word number which is one less than said second dictionary sequence low occurrence word number, respective ones of said combinations of a first group number and an intragroup number, corresponding to low occurrence words having said search string as a prefix portion, means for obtaining from said second inverse dictionary sequence final character table a first inverse dictionary sequence low occurrence word number, said first inverse dictionary sequence low occurrence word number corresponding to said final character of said search string, and a second inverse dictionary sequence low occurrence word number, said second inverse dictionary sequence low occurrence word number corresponding to said character which immediately succeeds said final character of the search string in the dictionary sequence, and means for obtaining from said inverse dictionary sequence low occurrence word table, from within a range of said extension words listed therein that extends from an extension word corresponding to said first inverse dictionary sequence low occurrence word number to an extension word corresponding to an inverse dictionary sequence low occurrence word number which is one less than said second inverse dictionary sequence low occurrence word number, respective ones of said combinations of a second group number and an intra-group number, corresponding to low occurrence words having said search string as a suffix portion.

14. A text search apparatus according to claim 1, wherein said dictionary list is arbitrarily predetermined.

15. A text search apparatus according to claim 1, wherein said partial character strings in said extension word position correspondence table means comprise respective ones of all partial character strings of said extension words of said set of text position elements.

16. A text search apparatus according to claim 1, wherein said partial character strings in said extension word position correspondence table means comprise respective ones of all of said dictionary words which are individual characters and occur within said object text.

17. A text search apparatus according to claim 1, wherein said partial character strings in said extension word position correspondence table means comprise respective ones of all of said dictionary words which occur within said object text.

18. A text search apparatus according to claim 1, wherein said text position table means comprises a text position table having table entries assigned to respective ones of said extension words, each of said table entries comprising an extension word in conjunction with an array of text position values from all of said text position elements which are keyed to said extension word, said text position values being arranged in sequence of increasing magnitude.

19. A text search apparatus according to claim 1, wherein said cover word assessment means comprises means functioning, for each of successive pairs of said sets of text position elements, with each of said pairs of sets corresponding to a pair of cover words which occur directly sequentially in said specific sequence, to compare each of successive pairs of text position elements taken respectively from said each pair of sets, for thereby judging whether at least a part of said search string occurs within a sequential occurrence of said each pair of text position elements.

* * * * *